United States Patent [19]

Neathway et al.

[11] 4,392,206
[45] Jul. 5, 1983

[54] PRINTER

[75] Inventors: Graham Neathway, Ottawa; Allan Cramp, Stittsville; Albert Hum, Nepean, all of Canada

[73] Assignee: Mitel Corporation, Ontario, Canada

[21] Appl. No.: 133,586

[22] Filed: Mar. 24, 1980

[30] Foreign Application Priority Data

Oct. 31, 1979 [CA] Canada ................................ 338908

[51] Int. Cl.³ .............................................. G06F 11/30
[52] U.S. Cl. ................................ 364/900; 179/1 MN
[58] Field of Search ... 364/200 MS File, 900 MS File; 179/2 DP, 6.02, 5.5, 7.1 TP, 81 R, 84 L, 84 R, 90 AN, 1 MN, 175.24, 175.2

[56] References Cited

U.S. PATENT DOCUMENTS

| | | | |
|---|---|---|---|
| 3,774,175 | 11/1973 | Padgett | 364/900 |
| 3,943,289 | 3/1976 | Sheldon | 179/6.02 |
| 3,980,839 | 9/1976 | Hutcheson | 364/900 |
| 4,013,839 | 3/1977 | Bell | 179/1 MN |
| 4,021,896 | 5/1980 | Bower et al. | 179/6.02 |
| 4,040,023 | 8/1977 | Curtis et al. | 364/900 |
| 4,051,326 | 9/1977 | Badagnani | 172/2 DP |
| 4,053,949 | 10/1977 | Recca et al. | 364/200 |
| 4,110,823 | 8/1978 | Cronshaw | 364/200 |
| 4,121,052 | 10/1978 | Richard | 364/900 |
| 4,125,872 | 11/1978 | Maxwell | 364/900 |
| 4,146,929 | 3/1979 | Troughton et al. | 364/900 |
| 4,184,053 | 1/1980 | Saneyoshi | 179/84 R |
| 4,241,238 | 12/1980 | Strand | 179/5.5 |
| 4,249,036 | 2/1981 | Kutzki | 179/5 R |
| 4,262,283 | 4/1981 | Chamberlain et al. | 179/5 R |
| 4,273,961 | 6/1981 | Blank et al. | 179/5 R |
| 4,304,970 | 12/1981 | Fahey et al. | 179/84 R |

Primary Examiner—James D. Thomas
Assistant Examiner—David Y. Eng
Attorney, Agent, or Firm—Laff, Whitesel, Conte & Saret

[57] ABSTRACT

A printer control system which facilitates monitoring of a telephone line and recognition of a predetermined series of digits as they are being dialed. An alphanumeric display displays the digits printed by a printer and which otherwise would be hidden by the printer until the complete number has been dialed and/or the call terminated. The system automatically monitors a subscriber's line, and provides an alarm when a predetermined sequence of digits have been dialed, allowing the operator to divert his attention to other tasks.

11 Claims, 12 Drawing Figures

FIG. I

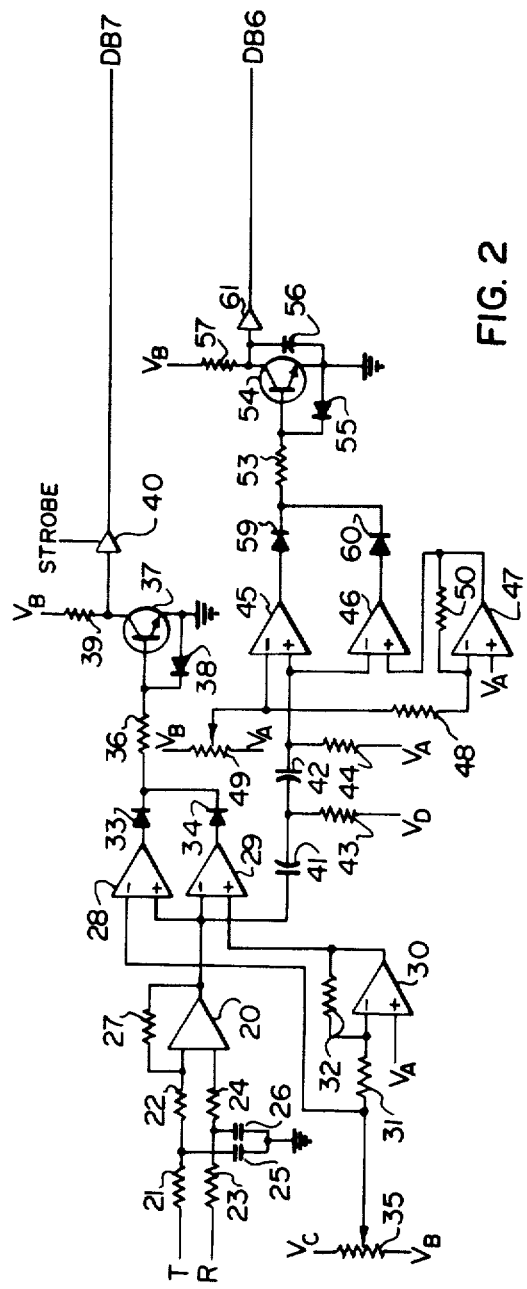
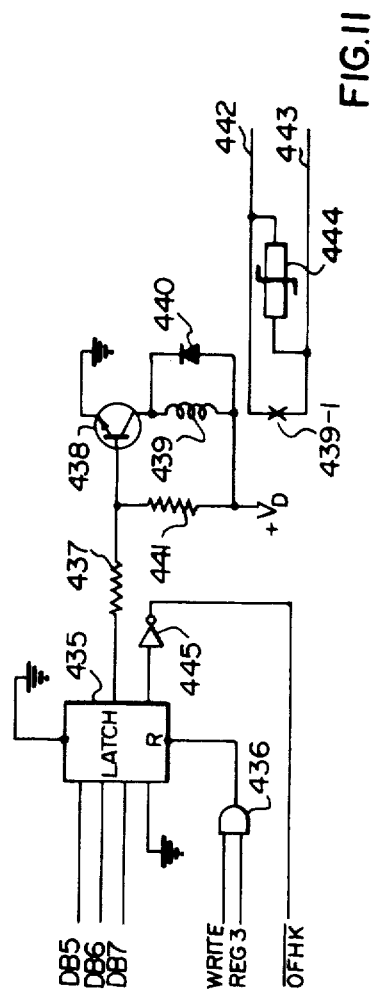
FIG. 2
FIG. 11

PRINTER

This invention relates to a printer control system for connection to a telephone or other telecommunication line whereby certain information concerning a telephone call may be recorded.

DESCRIPTION OF THE PRIOR ART

It is sometimes a requirement for telephone companies or other authorities to monitor telephone lines for the purpose of traffic observing, for detecting of unauthorized telephone calls, for the checking of lines which have been reported as faulty, etc. While teleprinters or other apparatus have been used in the past to monitor one or a plurality of lines, the use of such equipment has generally been limited to the central office, and attachment to a specific telephone line in an easily controlled and portable manner has not been easily or inexpensively done.

Further, it is believed that such equipment has not been able to automatically detect the digits of a predetermined dialed number and provide an alarm or other indication upon detection thereof.

While portable printer mechanisms are believed available which can be connected to a telephone line, such printers would normally print all information relating to a call on a single physical line on a paper roll. For instance, the type of information which typically would be recorded includes the time that a telephone line has its status changed to an off-hook condition, the numbers of the dialed digits carried by the telephone line, an indication as to whether the dialed digits are of tone or rotary character, and the time that the telephone line reverts to an on-hook condition. Further, a code would be printed to indicate whether a call is incoming or outgoing, by monitoring the supervisory status of the line.

This type of printer has a substantial deficiency in that all of the information relating to a single call is printed directly under the printing head of the printer on a single line of the paper passing through the printer. Consequently, it has not been possible to make note of the digits of the number which had been dialed prior to the completion of the call, since the line of print had been hidden opposite the printing hammers until the paper was stepped forward. The stepping of the paper does not occur until after all of the information concerning the call, including the completion of the call, was recorded. Often this is too late to use the information, and the recording becomes of little use.

Consequently, users of such printers have found a substantial deficiency in their operation.

SUMMARY OF THE INVENTION

The present invention, on the other hand, provides means for displaying the dialed digits as they are received. Consequently, it is possible to immediately use the information during the progress of a call, rather than to wait until the call has been completed. This provides substantial advantage to the authorities, particularly where criminal behavior of a telephone user is suspected.

As a further advantage of the present invention, means is provided for automatically detecting the dialing of a predetermined series of digits such as a complete telephone number, or even a portion of a telephone number, and to provide an alert or alarm signal in response to this detection. Consequently, where a user of the printer is waiting for a particular number to be dialed, they can engage in other activity until the alarm or alert signal occurs. Consequently, considerable wasteage of time is avoided which would have required constant monitoring of the printer.

It may thus be seen that the present invention provides substantial improvement in line monitoring whereby both its usefulness and flexibility are improved.

In general, the invention is a printer system for connection to a telephone line comprising a printer control circuit for operating a printer in response to signals appearing on the telephone line, an alphanumeric display for displaying alphanumeric symbols corresponding to those signals, a receiver circuit for connection to the telephone line for receiving and translating dialed digit signals which may be carried by the telephone line, and a sensing circuit connected to the telephone line for sensing and translating the status of the telephone line. A data bus interconnects the sensing circuit, the receiver circuit, the alphanumeric display and the printer control circuit. A central processing unit is connected to the data bus. First random access memory means is connected to the data bus and to address terminals of the central processing unit, for storing signals appearing on the data bus. Translating means is also connected to the data bus and to the address terminals, and has a fixed interconnection matrix for translating signals appearing on the data bus to signals for controlling the central processing unit to responsively operate the printer control circuit and the display. The printer control circuit includes means for causing the printer to print alphanumeric symbols across a line as signals are received by the receiver circuit and the sensing circuit from the telephone line relating to a call. As a the alpha-numeric display is caused to display the alphanumeric symbols as they are received by the receiver, but prior to display thereof by the printer.

In a further embodiment, the central processing unit with the random access memory and translating means is adapted to generate an alarm operate signal upon recognition of a predetermined sequence of signals on the telephone line.

BRIEF INTRODUCTION TO THE DRAWINGS

A better understanding of the invention will be obtained by reference to the detailed description below, and to the following drawings, in which:

FIG. 1 is a block schematic of the invention.

FIG. 2 is a schematic diagram of the line circuit portion of the preferred embodiment of the invention, FIGS. 3, 4 and 5 are a schematic diagram of the multifrequency receiver portion of the preferred embodiment of the invention, FIG. 6 is a schematic diagram of a display circuit, FIGS. 7 and 8 together form a schematic diagram of a printer mechanism control circuit, FIGS. 9 and 10 together form a schematic diagram of the central processing unit and associated memories, and FIG. 11 is a schematic diagram of a user alarm or alerting circuit.

DETAILED DESCRIPTION OF THE INVENTION

Figure 1:
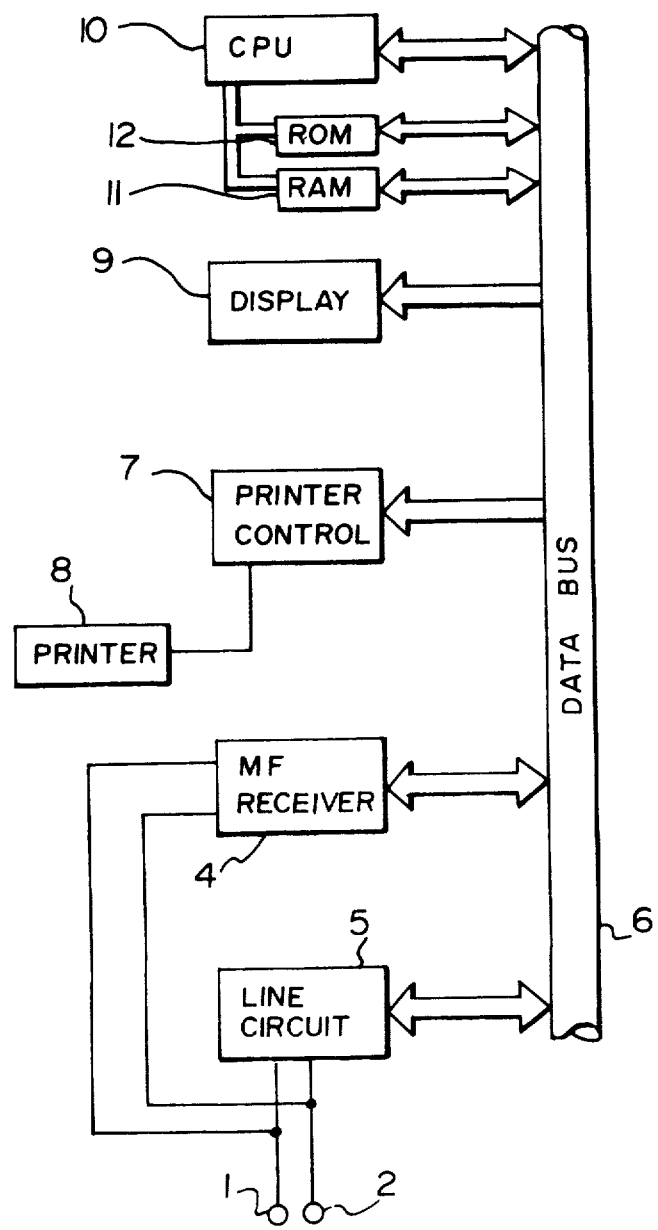

Turning first to FIG. 1, terminals 1 and 2 are for connection to the tip and ring leads of a telephone line which carry dialling as well as supervisory signals.

A multifrequency receiver 4 has its input connected across the tip and ring leads of the subscriber's line. The receiver 4 is adapted to detect tone-dialed digits. Receiver 4 also includes means for converting the tone digits to binary form, which is of the form which can be applied to a data bus.

A sensing means in the form of a line circuit 5 is also connected across the tip and ring leads of the subscriber's line. The line circuit includes means for sensing the on or off-hook status of the subscriber's line, for detecting ringing signals, etc. The circuit converts the sensed signals to binary signals for application to a data bus. This circuit can also be used to detect dial pulses and convert them to binary form.

Data bus 6 is connected to the output circuits of receiver 4 and line circuit 5. Preferably the data bus is an 8 bit bus.

A printer control circuit 7 has its input connected to data bus 6. Its output is adapted to be connected to a high speed printer 8.

An alphanumeric display 9 with associated circuitry is connected to data bus 6.

A central processing unit 10, preferably a microprocessor such as type 6800 available from Motorola, Inc., Phoenix, Arizona is connected to random access memory means (RAM) 11 and read only memory (ROM) 12. The read only memory can be of various forms, as they are well known to be the equivalent of a fixed interconnection matrix, and which forms a translating means. Forms of this memory are of of the type, for example, which stores signals in an array of MOS field effect transistors, which transistors are activated and numbers are stored by reception of a signal and is erased by exposure to ultraviolet light, or to a structure in which an interconnection pattern is fixed by means of conductive or blown fuse links.

The central processing unit and its memories are connected to data bus 6. The random access memory 11 is adapted to store signals appearing on the data bus as well as signals applied thereto by the central processing unit 10. The read only memory 12 is adapted to translate signals appearing on the data bus into signals for controlling the central processing unit.

In operation, assume that a subscriber's set connected to the line connected to terminals 2 and 2 goes off-hook. This causes a lowering of the line voltage applied from the central office, and the voltage lowering is sensed by the line circuit 5. A binary output signal is applied to data bus 6 in response. This signal is received by the central processing unit and accompanying memories at the appropriate interrupt time which translates the signal into an operation signal for the printer control 7 and display 9.

The printer control 7 receives a signal from the central processing unit via the data bus and provides an output signal to printer mechanism 8 to cause its printing hammers to mark a code and/or the time of the off-hook condition of the subscriber's line as a first indication on a line of its paper roll, and then to advance the paper, since information for one line of the paper roll has been completed.

The subscriber then proceeds to dial digits, and applies multifrequency tones on the subscriber's line to indicate the dialed number to the central office. Multifrequency receiver 4 detects the tones, converts them in sequence of reception to binary signals and applies them to data bus 6. It should be noted that each number is not visible to an observer, since the line being printed, number by number, remains under the print hammers until all of the digits have been dialed.

The central processing unit with memories 11 and 12 converts the binary signal to one which will operate printer control 7 and display 9. The printer control causes printer 8 to print the alphanumeric character corresponding to the dialed digit. Each number is not visible to an observer since the line being printed, number of number, remains under the print hammers until all of the digits have been dialed. In the meantime, however, display 9 receives the signal on the data bus corresponding to each alphanumeric character and translates it to a display signal, which is applied to a display such as a light emitting diode alphanumeric readout. The display circuitry holds the character illuminated on the display in order that it may be immediately read. Each number dialed is thus visible immediately to the operator, even though the printer has not advanced its paper roll.

Subsequent digits dialed by the subscriber cause a similar proceeding, and the display indicates each digit which has been dialed immediately upon dialing. After any portion of the sequence of digits has been dialed, even while the calling subscriber is waiting for a called subscriber to answer, the operator of the printer has become aware of the numbers which have been dialed, and he can take action based on the reception of this number.

After the call has been terminated the line circuit detects an on-hook condition on the subscriber's line and applies a binary signal to data bus 6 indicating this supervisory condition. The central processing unit and its memories 11 and 12 translate this signal into a control signal for printer 7 which causes a "termination of call" code and/or the time of termination to be printed on the printer paper roll. Since the call has now been completed, the printer control causes the printer paper roll to advance, thus providing to the operator a chance to view all alphanumeric data relating to the call which had been printed, which has hidden in prior art system. The operation has advance information in the present invention, and does not have to wait until the call is complete as was previously required. This has been found to be a subtle but substantial and important improvement in such printers.

The random access memory is also adapted to store binary signals corresponding to a predetermined set of digits. Upon reception of signals from the data bus corresponding to a sequence of dialed digits, the central processing unit operates under control of the read-only memory to match the dialed digits with the predetermined set. Upon finding a match for the sequence of digits, the central processing unit is adapted to apply a binary signal to the data bus which controls operation of the printer control circuitry, or an auxillary circuit including a relay or electronic switch (not shown) which causes an alarm such as a light or tone to become energized. Accordingly, an operator need not constantly watch the display to determine whether a number to be detected has been dialed, since the alarm advises him of this occurrence. This is a substantial advancement in the capability of this form of printer, since the operator can use his time more efficiently doing other tasks while waiting for the alarm.

Each of the circuit blocks shown in FIG. 1 will now be described with reference to the figures containing the detailed schematics of the invention.

Turning first to FIG. 2, a schematic diagram of the line circuit is shown. A differential amplifier 20 has its input terminals connected to the tip and ring leads T and R through balanced high resistance resistors 21, 22, 23 and 24. Resistors 21 and 22 are connected in series with one lead of the differential amplifier 20 and resistors 23 and 24 are connected in series with the other. The resistors should be of 1% tolerance or better.

Connected from the junction of resistors 21 and 22 to ground is a capacitor 25 of, for example, 0.001 microfarad, and connected from the junction of resistors 23 and 24 to ground is a similarly valued capacitor 26. The time constants of resistors 21 and 23 with capacitors 25 and 26 should be such as to cause signal frequencies which are higher than ringing frequency to be bypassed to ground.

A resistor 27 is connected between the output of differential amplifier 20 to the non-inverting input, the resistance value of the resistor being such as to cause the gain of the amplifier to preferably be about 1/100. Differential amplifier 20 translates the d.c. line voltage, as well as the ringing frequency signals.

The output of differential amplifier 20 is connected to a window comparator comprising operational amplifiers 28 and 29. The non-inverting input of operational amplifier 28 and the inverting input of operational amplifier 29 are connected to the output of differential amplifier 20. The non-inverting input of operational amplifier 29 is connected to the output of an operational amplifier 30 and the inverting input of operational amplifier 28 is connected to a source of threshold potential which will be described in more detail below.

Operational amplifier 30 is used as an inverting buffer, and has unity gain as provided by similarly valued input resistors 31 and feedback resistor 32, respectively connected between the source of threshold potential and the inverting input of amplifier 30, and between the output of operational amplifier 30 and the inverting input.

The output terminals of operational amplifiers 28 and 29 are connected together through isolating diodes 33 and 34. Threshold potential is applied to the input of operational amplifiers 28 and 30 from potential source $V_C$ $V_B$ connected through a potentiometer 35.

The function of the window comparator is to provide an output signal in the event the differential signal between the tip and ring leads is above or below a predetermined threshold, such as 40 volts. Potentiometer 35 provides a convenient threshold control.

The output terminals of diodes 33 and 34 are connected to a level shifter. This circuit includes resistor 36 which is connected to the base of an NPN transistor 37. The emitter of transistor 37 has a diode 38 connected to opposite polarity to its base-emitter junction, to its base. Its emitter is connected to ground.

The collector of transistor 37 is connected to a source of potential $V_B$ through resistor 39. The collector is also connected through a gate controlled tri-state buffer 40 to lead DB7 of the data bus. A strobe signal is applied to the gate of buffer 40 via the STROBE lead, whereupon an output signal is applied to the data bus at a particular sychronized time.

In operation, a differential D.C. potential is applied from the central office on tip and ring leads T and R. The differential signal is translated in differential amplifier 20 through the balanced input resistor network. The output signal of differential amplifier 20 is applied to the window comparator comprising operational amplifiers 28 and 29, which provides an output signal in the event that the differential input is greater than a predetermined magnitude of the input signal, irrespective of its polarity. Diodes 33 and 34 form an OR gate, which applies either polarity of the input signal to resistor 36 which is in excess of the operational amplifier threshold. The diodes provide isolation between the outputs of amplifiers 28 and 29.

Threshold potentiometer 35 allows an adjustment to the D.C. threshold level applied to operational amplifier 28 from potential source $V_C$ and $V_B$. The threshold adjustment potential is also applied to the non-inverting input of operational amplifier 29 through buffer amplifier 30, which has its own non-inverting input connected to a source of bias potential $V_A$. The cathode terminals of diodes 33 and 34 are connected as an OR gate to the input of transistor 37 through resistor 36. Diode 38 provides protection to the base-emitter junction of transistor 37, the latter providing positive and negative saturation levels whereby signals above the predetermined threshold provide one level of output signal, and those below provide a second level of output signal. The transistor circuit also adjusts the levels to that required on the data bus.

The output signal is applied to the data bus lead DB7 through gate controlled tri-state buffer 40, to the gate of which a strobe signal is applied. Accordingly, gate 40 is strobed open whereby a signal is applied to lead DB7 which is representative of whether the differential signal between the tip and ring leads is above or below the predetermined threshold. As was noted earlier, a differential signal below the threshold is indicative of an off-hook condition of the subscriber's line, and a differential signal in excess of the threshold is indicative of an on-hook condition.

Also connected to the output of differential amplifier 20 is a ringing voltage detector as will be described below. A ringing frequency filter is connected to the output of differential amplifier 20. One terminal of capacitor 41 is connected to the output of differential amplifier 20, and its other terminal is connected to one terminal of capacitor 42 and resistor 43, the other terminal of the latter being connected to a bias source $V_D$. The other terminal of capacitor 42 is connected through resistor 44 to a bias source $V_A$ and also to the non-inverting input of adifferential amplifier 45 and the inverting input of adifferential amplifier 46.

The inverting input of differential amplifier 45, and the inverting input of a differential amplifier 47 through resistor 48 are both connected to a threshold setting potentiometer 49. The opposite terminals of potentiometer 49 are connected respectively to potential source terminals $V_B$ and $V_A$.

The output terminal of differential amplifier 47 is connected to the non-inverting input of differential amplifier 46, and also to its own non-inverting input through feedback resistor 50. The value of resistors 48 and 50 should be similar in order that differential amplifier 47 should have unity gain. Amplifier 47 acts as an inverting buffer.

Connected to the output of each of differential amplifiers 45 and 46 are output isolating diodes 59 and 60, the cathodes of which are connected together. The cathodes are connected to a level shifting circuit similar to the one described earlier, the present circuit comprising resistor 53 which is connected to the base of NPN transistor 54. The emitter of transistor 54 is connected to ground, and protection diode 55 is connected from its base to its emitter. Capacitor 56 is connected between the collector and emitter of transistor 54, and resistor 57 is connected between the collector of transistor 54 to a source of potential $V_B$.

The collector of transistor 54 is connected to the input of a buffer 61 which has its output connected to data bus lead DB6.

In operation, ringing voltage, which typically is an A.C. signal having amplitude of 90 volts RMS appears as a differential voltage across tip and ring leads T and R. The resulting output signal of differential amplifier 20 is applied through the filter comprising capacitors 41 and 42 with resistors 43 and 44 to the input of the window comparator comprising operational amplifiers 45 and 46 with buffer 47. The filter is designed with parameters such that signals lower than ringing frequency are blocked. D.C. potential appearing on the subscriber's line is blocked from differential amplifiers 45 and 46.

The threshold potential level for operation of amplifiers 45 and 46 by potentiometer 49, which level is applied directly to amplifier 45 and to amplifier 46 through inverting buffer 47. Accordingly the amplifiers form a dual level comparator for the detection of ringing voltage.

The output signals of amplifiers 45 and 46 are applied through output isolation diodes 59 and 60 which apply both polarities of the signal to the following level shifter. The level shifter operates in a manner similar to that described with respect to transistor 37 and therefore need not be described further. The output signal level therefrom is applied to data bus lead DB6 through buffer 61.

Accordingly, when ringing signals have been received which are of amplitude exceeding the threshold set by potentiometer 49, they are rectified, and filtered in capacitor 56, and applied as a D.C. level change to data bus lead DB6.

Accordingly, it may be seen that the present line circuit provides means for detecting the presence of an on or off-hook condition on the subscriber's line as well as ringing signals. The on or off-hook condition is translated into a binary signal applied to data bus lead DB7, and the presence of ringing is detected and a resulting binary signal is applied to data bus lead DB6.

It should be noted that the fractional gain in differential amplifier 20 is specified so that the signals applied to the comparator amplifiers will be of such amplitude that the required bias potential source $V_C$ would be of voltage which is reasonable and compatible for use with solid-state integrated circuits. For example, a 40 volt input signal at a 40 volt equivalent threshold would exist, while the output of differential amplifier 20 would be at a level of 0.4 volts. The threshold D.C. level required to be applied to amplifiers 28 and 29 can thus easily be obtained from a 5 volt supply.

It is preferred that sufficient bias should be applied and control 35 should be adjusted so that a threshold should be established whereby a 40 volt difference in potential between the tip and ring leads would be at the threshold.

Figure 3:
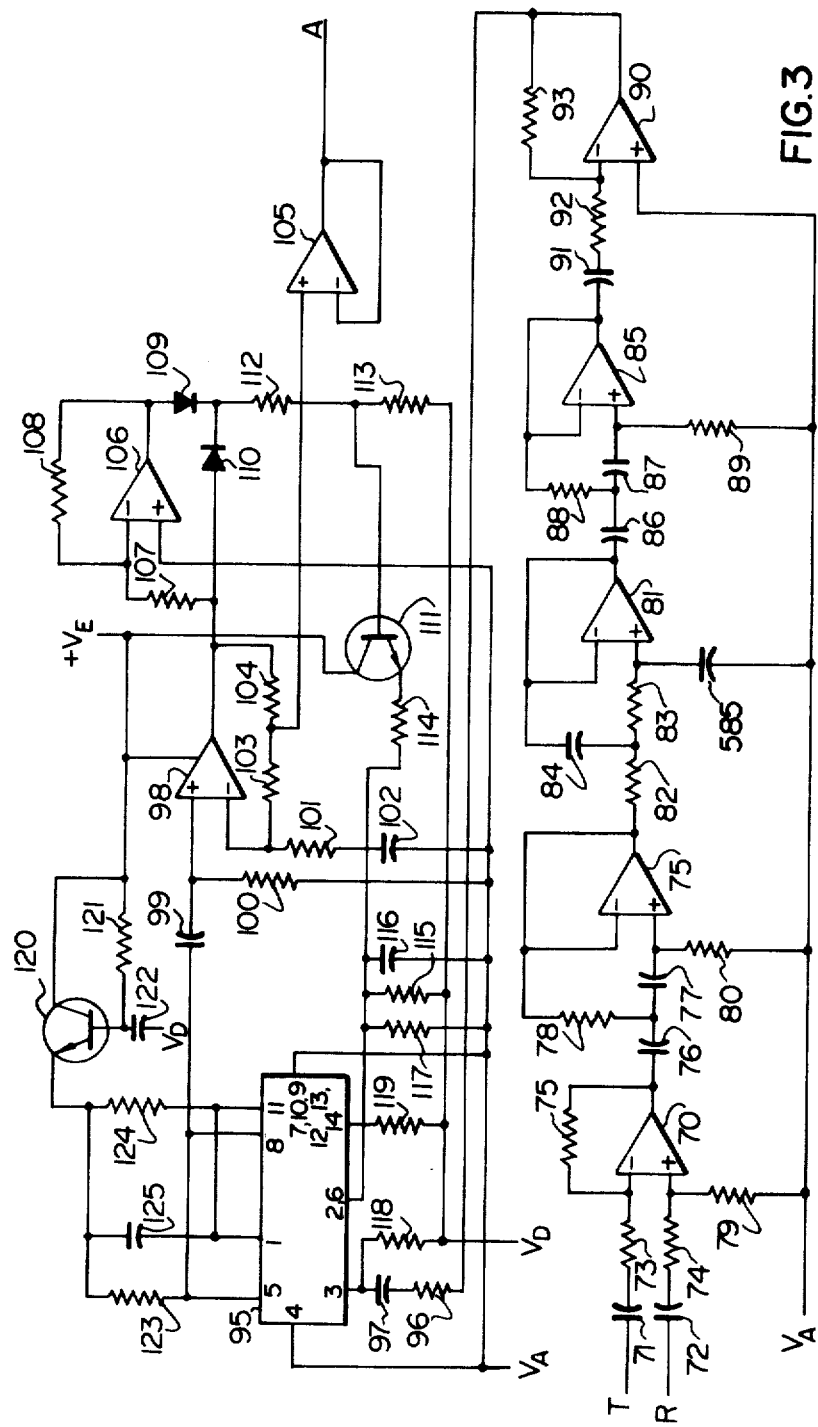
Figure 4:
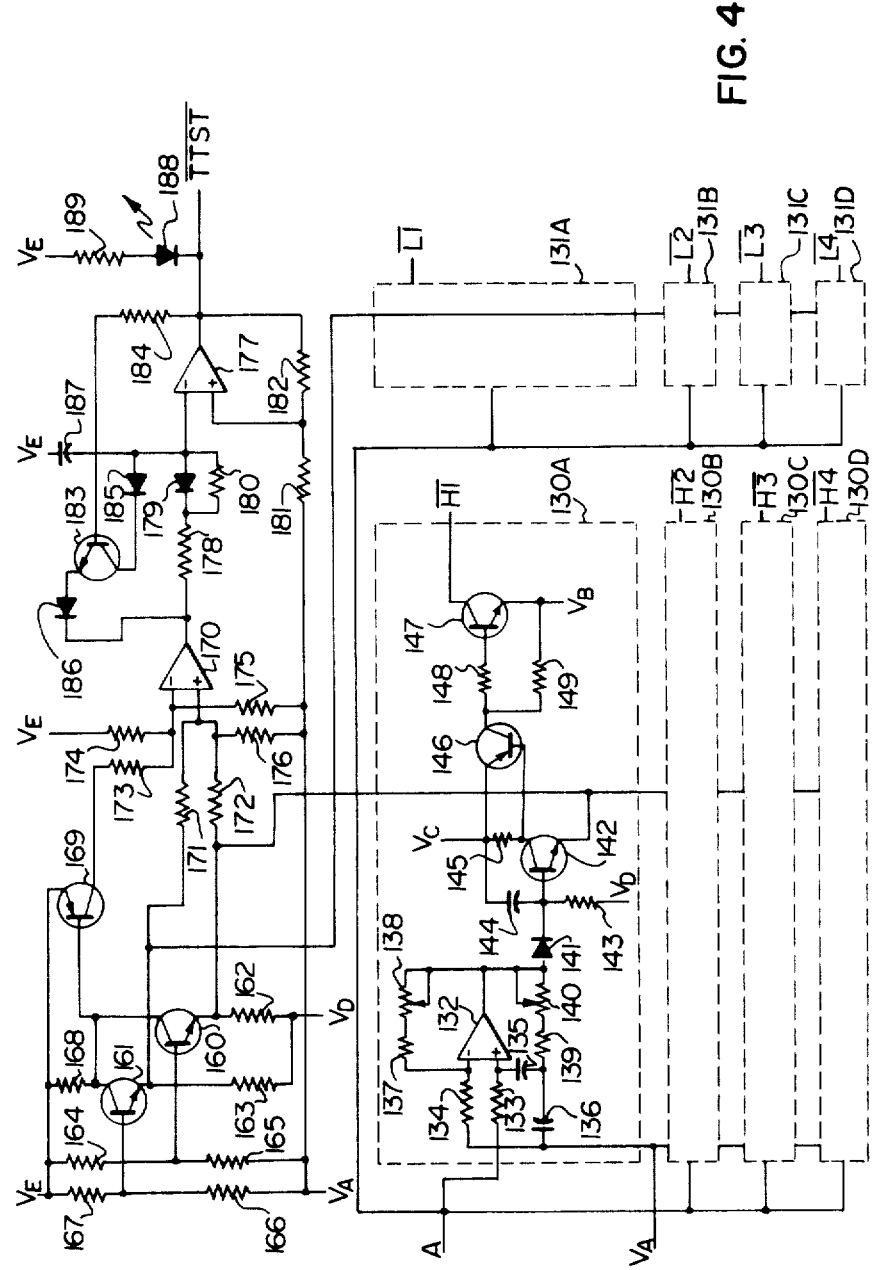
Figures 5, 5A:
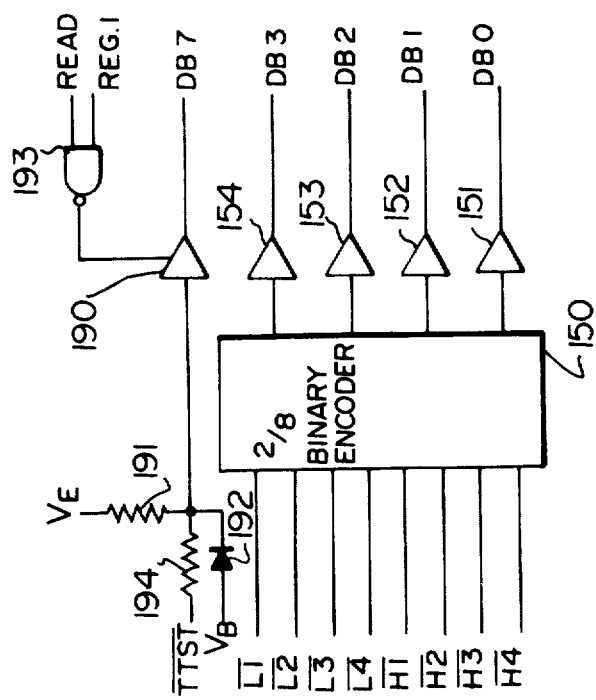

Turning now to FIGS. 3, 4, and 5, the circuitry of a multifrequency receiver suitable for use in this invention is shown. In FIG. 3, the receiver is connected to the tip and ring leads T and R. These leads are connected to a differential amplifier 70 through D.C. isolating capacitors 71 and 72 and input resistors 73 and 74. Feedback resistor 75 is connected between the output terminal of amplifier 70 and its inverting input terminal.

The output of differential amplifier 70 is connected to the input of a high pass filter which is comprised of operational amplifier 75 and series input capacitors 76 and 77 which are connected between the output of differential amplifier 70 and the non-inverting input of operational amplifier 75. A resistor 78 is connected between the junction of capacitors 76 and 77 and the inverting input of operational amplifier 75, which input is also connected directly to the output of the same operational amplifier.

A source of potential $V_A$ is connected to the non-inverting input of differential amplifier 70 through resistor 79 and to the non-inverting input of operational amplifier 75 through resistor 80.

The output of the just-described high pass filter is connected to the input of a low pass filter which is comprised of operational amplifier 81, through series resistors 82 and 83. The junction of resistors 82 and 83 is connected to the inverting input of operational amplifier 80 through capacitor 84. The inverting input of operational amplifier 81 is also connected directly to its output. The non-inverting input is connected to the source of potential $V_A$ through capacitor 585.

The output of the just-described low pass filter is connected to the input of a high pass filter which is comprised of amplifier 85, through series capacitors 86 and 87. The junction of capacitors 86 and 87 is connected to the inverting input of amplifier 85 through resistor 88, and the inverting input is directly connected to the output of amplifier 85. The non-inverting input of amplifier 85 is connected to the source of potential $V_A$ through resistor 89.

The output of the just-described high pass filter is connected to a signal level boosting stage, preferably with a gain of about 10. This stage is comprised of operational amplifier 90 which has its non-inverting input connected to the source of potential $V_A$, and its inverting input connected to the output of operational amplifier 85 through the series circuit of capacitor 91 and resistor 92. Its output is connected to its inverting input through feedback resistor 93.

It is preferred that the gain of the differential amplifier circuit comprising differential amplifier 70 should have a gain of about 1/5, assuming a differential tone input signal of about 2 volts peak-to-peak. The two highpass and one lowpass filters provide an effective bandpass filter function which should have a bandpass sufficient to encompass the lowest and highest frequencies of the multifrequency tones which are to be received. For instance, for a push-button telephone set in North America, the generated tones would require an effective bandpass between about (600 Hz and 2500 Hz.)

The output of differential amplifier 90 is connected to an automatic gain control circuit comprising automatic gain control integrated circuit 95 through the series circuit of resistor 96 and capacitor 97. Preferably integrated circuit 95 is type CA3046 which is available from Motorola Inc., Fairchild Semiconductor Inc., etc., of the United States. The automatic gain control circuit is further comprised of operational amplifier 98 which is connected to the output terminal 8 of the integrated circuit through capacitor 99. The non-inverting input of operational amplifier 98 is also connected to a source of potential $V_A$ through resistor 100, and the inverting input is connected to the same source through the series circuit for resistor 101 and capacitor 102. A series connected pair of feedback resistor 103 and 104 connect the output of operational amplifier 98 to the inverting input.

The junction between resistors 103 and 104 is connected to the non-inverting input of buffer operational amplifier 105, which has its output connected directly to its inverting input, to provide unity gain.

The output signal level and output impedance of operational amplifier 98 is controlled further by a circuit comprising operational amplifier 106 which has its inverting input connected to the output of operational amplifier 98 through resistor 107. Its non-inverting input is connected to the source of potential $V_A$ directly, and its output is connected to its inverting input through resistor 108. The output of operational amplifier 106 is also connected to the output of operational amplifier 98 through the series circuit of two diodes 109 and 110 which have their cathodes connected together. This provides a OR function between the output of operational amplifier 106 and the output of operational amplifier 98. The junction of the two diodes is connected to the input of a feedback circuit comprising NPN transistor 111 which has its base input connected to the junction of a pair of resistors 112 and 113 which are connected in series between the cathode junction of diodes 109 and 110 and a source of potential $V_D$. The collector of transistor 111 is connected to a source of potential $V_E$ and the emitter is connected through resistor 114 to feedback input terminal 2 and 6 of integrated circuit 95.

Feedback input terminals 2 and 6 of integrated circuit 95 are connected to the source of potential $V_D$ through resistor 115 and to source of potential $V_A$ through bypass capacitor 116 which is in parallel with resistor 117. Input terminal 3 is also connected to the source of potential $V_D$ through resistor 118, as are terminals 7, 10, 12, 13 and 14 together through resistor 119.

Operating potential is applied to terminals 5 and 8 of integrated circuit 95 through a voltage regulating circuit which is comprised of NPN transistor 120, which has its collector connected to source $V_E$, which source is also connected through resistor 121 to its base terminal. Its base terminal is bypassed to potential $V_D$ through capacitor 122. The emitter of transistor 120 is connected to terminals 5 and 11 respectively through resistors 123 and 124. The emitter of transistor 120 is also connected to terminal 1 of the integrated circuit through a capacitor 125. Terminals 1 and 11 of the integrated circuit are connected together, as are terminals 5 and 8.

The output of buffer amplifier 105 appears on lead A which extends from FIG. 3 to FIG. 4.

In FIG. 4, the input signal is applied to a plurality of filters 130A, 130B, 130C, 130D, and 131A, 131B, 131C and 131D. Each of the filters has its passband at one of the multifrequency signal frequencies to be received from the subscriber's line. For instance, the four filters 130A, 130B, 130C, and 130D are respectively responsive to the high frequency tone of the dual tone signals from a push-button telephone, while filters 131A, 131B, 131C and 131D are responsive to the low frequency tones.

Each of the filters provides a signal on an output lead $\overline{H1}$, $\overline{H2}$, $\overline{H3}$, and $\overline{H4}$ and $\overline{L1}$, $\overline{L2}$, $\overline{L3}$, and $\overline{L4}$. Upon reception of a dual frequency dialing tone from a push-button telephone set, a signal will be produced simultaneously on one of the leads $\overline{H1}$-$\overline{H4}$ and $\overline{L1}$-$\overline{L4}$.

Except for the component values for selecting the frequency passband of each of the filters, each of the filters is identical, and therefore for ease of description, only filter 130A will be described in detail.

The input lead A is connected to the non-inverting input of operational amplifier 132 of the active filter through resistor 133. The inverting input is connected to source of potential $V_A$ through resistor 134. Also connected to the source of potential $V_A$ is a pair of capacitors 135 and 136 connected in series.

The output terminal of operational amplifier 132 is connected to the inverting input terminal through resistor 137 and potentiometer 138, and to the junction of capacitors 135 and 136 through the series circuit of resistors 139 and potentiometer 140.

The output terminal of operational amplifier 132 is also connected through a rectifier diode 141 to the base input terminal of NPN transistor 142. The base terminal is connected to a source of bias $V_D$ through resistor 143, and to a source of potential $V_C$ through capacitor 144. The collector terminal is also connected to the source of potential $V_C$ through resistor 145.

The collector of transistor 142 is also connected to the base input terminal of PNP transistor 146 which has its emitter connected to the source of potential $V_C$. Its collector is connected to the base input terminal of NPN transistor 147 through resistor 148. The collector of transistor 146 is also connected to the emitter of transistor 147, which itself is connected to a source of potential $V_B$ through resistor 149. The collector output terminal of transistor 147 forms the output terminal of filter 130A, on lead $\overline{H1}$.

As noted earlier, the output leads of each of the filters are $\overline{H1}$, $\overline{H2}$, $\overline{H3}$, $\overline{H4}$, $\overline{L1}$, $\overline{L2}$, $\overline{L3}$, and $\overline{L4}$.

Turning now to FIG. 5, for a moment, each of the leads $\overline{L1}$-$\overline{L4}$ and $\overline{H1}$-$\overline{H4}$ is connected to an input of a two-out-of-eight binary encoder 150. The four output terminals of encoder 150 are connected to the inputs of individual buffer amplifiers 151, 152, 153 and 154. The output of each of buffer amplifiers 151-154 appears on data bus leads DB0, DB1, DB2 and DB3.

A circuit is shown in FIG. 4 for indicating the presence of a tone pair. The emitter of transistor 142 in each filter 130A, 130B, 130C and 130D is connected in parallel with the others and to the emitter of transistor 160. Similarly, the emitter lead from each of transistor 142 of filters 131A, 131B, 131C and 131D are connected together and to the emitter of transistor 161. The emitters of transistors 160 and 161 are respectively connected to a source of potential $V_D$ through individual resistors 162 and 163.

The base of transistor 160 is connected to the tap of a voltage divider comprising series resistors 164 and 165, which are connected between sources of potential $V_E$ and $V_A$.

Similarly, the base of transistor 161 is connected to the tap of a voltage divider comprising the series circuit of resistors 166 and 167 similarly connected between sources of potential $V_E$ and $V_A$.

The collectors of transistors 160 and 161 are connected together, and to a source of potential $V_E$ through resistor 168. The collectors are also connected to the base input of PNP transistor 169, which has its emitter connected to the source of potential $V_E$.

The emitters of transistors 160 and 161 are individually connected to the non-inverting input terminal of operational amplifier 170 through respective resistors 171 and 172. The collector of transistor 169 is connected to the inverting input of operational amplifier 170 through resistor 173; the inverting input is connected to source of potential $V_E$ through resistor 174 and to source of potential $V_A$ through resistor 175. The non-inverting input of operational amplifier 170 is also connected to the source of potential $V_A$ through resistor 176.

The output of operational amplifier 170 is connected to the inverting input of operational amplifier 177 through resistor 178 and diode 179 connected in series, which diode is connected in parallel with resistor 180. The non-inverting input of operational amplifier 177 is connected to the source of potential $V_A$ through resistor 181, and to the output of operational amplifier 177 through resistor 182. The output of operational amplifier 177 is also connected to the base input terminal of transistor 183 through resistor 184. The collector of transistor 183 is connected to the inverting input of operational amplifier 177 through diode 185 which has its anode connected to the anode of diode 179, and the emitter of transistor 183 is connected to the output of operational amplifier 170 through diode 186, which has its cathode connected to the latter output. The inverting input of operational amplifier 177 is bypassed to source of potential $V_E$ by capacitor 187.

The output of operational amplifier 177 is also connected to the source of potential $V_E$ through light emitting diode 188 which is in series with resistor 189. The latter output terminal is connected to lead TTST.

Referring now to FIG. 5, lead TTST is connected to the input of buffer 190, which has its output connected to data bus lead DB7. The input of buffer 190 is also connected to potential source $V_E$ through resistor 191 and to potential source $V_B$ through diode 192. The gate of buffer 191 is connected to the output of NAND gate 193 which has its input terminals connected to a READ lead and to a register address lead REG. 1.

Considering the operation of the circuit with respect to FIGS. 3, 4 and 5, operation of the input filters including operational amplifiers 75, 81 and 85 have already been described. As was noted, the filter output band limited signal is amplified in operational amplifier 90 and is applied to an automatic gain control circuit which includes automatic gain control integrated circuit 95. The output of this circuit is applied through A.C. coupling capacitor 99 to operational amplifier 98, and the output thereof is applied to buffer amplifier 105. The output of operational amplifier 98 is also connected to the input of operational amplifier 106 which preferably has unity gain.

The automatic gain control feedback input to integrated circuit 95 was noted earlier as being applied to pins 2 and 6. This pin is connected to the emitter of transistor 111 through resistor 114. The automatic gain control input signal is applied to the base of transistor 111 as a proportion of the signal received both from the output of operational amplifier 98 and operational amplifier 106 through rectifier diodes 109 and 110.

The input signal is half wave rectified in diode 110, is inverted in operational amplifier 106 and the other polarity of the signal is rectified in diode 109. The resulting signal after being divided in resistor voltage divider 112 and 113 is applied to transistor 111, and the ripple is smoothed in a filter comprising resistor 114, capacitor 116 and resistor 117, the latter being a bleeder across capacitor 116.

The feedback circuit just described thus controls the average level of the signal applied to operational amplifier 98 and is carried through operational amplifier 105. An effective automatic gain control of the signal is achieved.

Operating current for integrated circuit 95 is obtained from the source of potential $V_E$ through a conventional regulator circuit including transistor 120.

The level stabilized and band-limited signal at lead A is applied to all of the active filters 130A, 130B, 130C, 130D and 131A, 131B, 131C and 131D.

Considering filter 130A as an example, a single frequency bandpass active filter of well-known construction comprising operational amplifier 132 described earlier allows a narrow band, single frequency tone to pass therethrough. The bandwidth and frequency are selectable utilizing potentiometers 138 and 140.

The output signal of operational amplifier 132 is rectified in diode 141 and smoothed in capacitor 144. The resulting signal is applied to transistor 142 which is boot-strapped to transistor 146. The collector output of transistor 146 is connected to the input of transistor 147 which has its output collector connected to lead H1.

Accordingly, a predetermined frequency of the gain controlled input signal is passed through the active filter including operational amplifier 132, is rectified and filtered and appears as a D.C. signal at a proper bus level on lead H1.

Similarly, other predetermined frequencies of the signal appearing on the tip and ring leads are passed through individual ones of the active filters and appear as output signals on leads H2, H3, H4, L1, L2, L3, or L4.

When dialing tones are applied to the tip and ring leads, it is conventional that a simultaneous low and high frequency tone is generated for each digit which is dialed. Accordingly, there will be simultaneous D.C. output signals on one of leads H1, H2, H3, H4, one of leads L1, L2, L3, or L4.

These signals are received on two of the similarly labelled leads of the 2/8 binary encoder 150 (FIG. 5). As a result of receipt of the signals on two of its input leads, a binary output signal is generated and is applied to data bus leads DB0, DB1, DB2, and/or DB3 through buffer amplifiers 151, 151, 153 and 154.

FIG. 5A depicts a matrix scheme showing which data bus leads are activated by various input signals. The rows of the matrix are designated L1, L2, L3 and L4, each designating one out of four low frequency tone inputs, and the columns of the matrix are designated H1, H2, H3, H4, each representing one out of four high frequency tone inputs. Since there will be a pair of low and high tones present for each dialed digit, the intersection block of each of the rows and columns indicates which data bus leads carry a high level signal in the presence of the two simultaneous tones.

For example, the presence of tones L2 and H3 result in a high level signal on leads DB1 and DB2.

In the upper righthand corners of each of the matrix intersection blocks a numeral is shown which is representative of the dialed digit or of another designator.

Thus the reception of a pair of dialing tones from the tip and ring leads results in the generation of a D.C. signal on one or more data bus leads corresponding to a translation of the dialing tones. The matrix in FIG. 5A provides an indication of what numeral had been dialed and also which specific data bus leads are activated corresponding to the frequencies of the dialing tones.

A circuit is also included as an indicator of the presence of the received tones (see FIG. 4). It should be noted that the emitters of transistor 142 of each of the filters 130A, 130B, 130C, and 130D are connected through resistor 162 to a source of potential $V_D$ and to the emitter of transistor 160. Similarly the emitters of transistors 142 of each of the filters 131A, 131B, 131C and 131D are connected to the source of potential $V_D$ through resistor 163, and also to the emitter of transistor 161.

When a high frequency tone is present, one of the transistors 142 of filters 130A–130D conducts, drawing current through resistor 162. The emitter voltage of transistor 160 thus is raised, causing it to turn off and in response, removing the remaining source of base drive to transistor 169, causing it to turn off.

Similarly, when a low frequency tone is present, one of the transistors 142 of filters 131A–131D conducts, drawing current through resistor 163, which raises the voltage at the emitter of transistor 161, causing it to turn off.

With the higher voltage at the emitters of transistors 160 and 161, the voltage at the non-inverting input of operational amplifier 170 is caused to rise, and when transistor 169 turns off, the voltage at the inverting input is caused to fall. As a result, an output signal appears from operational amplifier 170.

The output signal of operational amplifier 170 is applied to the inverting input of operational amplifier 177 through rectifier diode 179. Feedback from the output of operational amplifier 177 is applied to the base input of transistor 183 which conducts as a result, lowering the impedance between the output of operational amplifier 170 and the inverting input of operational amplifier 177. When operational amplifier 177 conducts with an input signal, its output current passes through light emitting diode 188, which provides a visual indication that a dual tone signal is being received. Transistor 183 provides a quick discharge path for capacitor 187 until a steering signal is obtained causing the potential on the TTST lead to be low. When TTST lead is low, transistor 183 is non conducting and now the discharge path for capacitor 187 is resistor 178 and diode 179.

The output signal of operational amplifier 177, appearing on the TTST lead is applied to buffer amplifier 190 through resistor 194 (see FIG. 5). The TTST lead had been held clamped to the potential on lead $V_B$ by diode 192, and resistor 194 limits current flow during clamping. This limits the potential applied to buffer amplifier 190 to voltages compatible with the microprocessor, e.g. 0 to +5 volts, rather than −12 to +5 volts as in the preceding circuitry. With the presence of a READ and REG1 signal at the inputs of NAND gate 193, buffer amplifier 190 is enabled and the signal applied to buffer amplifier 190 is passed through to data bus lead DB7. Accordingly, whenever a dialing multifrequency tone signal is present and is received by the receiver, a signal will be present on data bus lead DB7, and all except a zero designating tone signal will cause a signal to appear on one or more of the leads DB0–DB3.

Figure 6:
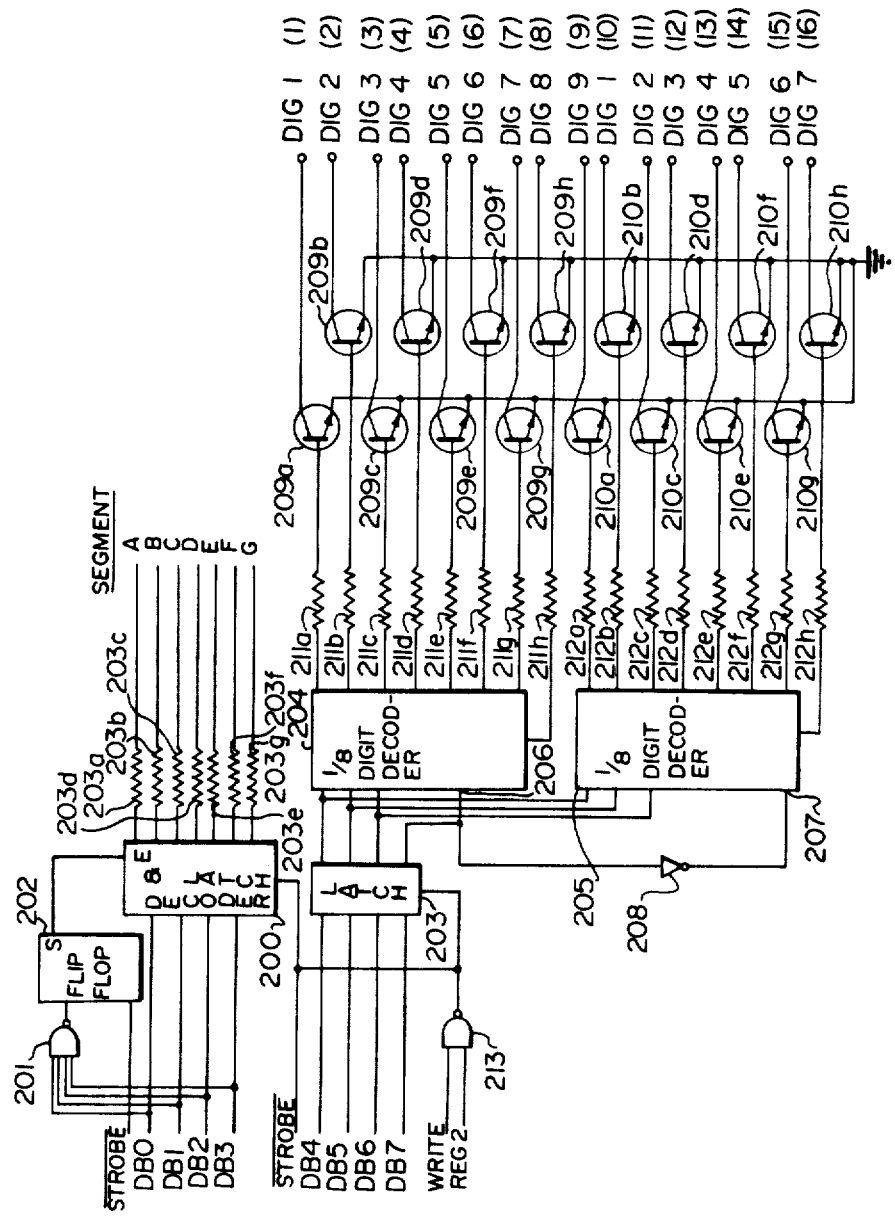

FIG. 6 is a schematic diagram of circuitry for a 7 segment display, the display element itself being not shown since its structure and operation are well known. The display driver circuitry is comprised of decoder 200 which has its input terminals connected to data bus leads DB0, DB1, DB2 and DB3. These leads are also connected to the input of NAND gate 201 which has its output connected to flip flop 202. The set output of flip flop 202 is connected to the blanking input E of decoder 200. The output terminals of decoder 200 are individually connected to the display segment leads A, B, C, D, E, F, and G via resistors 203a, 203b, 203c, 203d, 203e, 203f and 203g.

Data bus leads DB4, DB5, DB6 and DB7 are connected to the input of 4 bit latch 203. The output of latch 203 is connected to the input terminals of ⅛ digit decoders 204 and 205 in parallel.

One of the output terminals of latch 203 is connected to the decoder enable input 206 of decoder 204, and also to the decoder enable input 207 through inverter 208.

The output terminals of digit decoders 204 and 205 are connected to the inputs of the display digit driver transistors 209a, 209b, 209c, 209d, 209e, 209f, 209g and 209h and 210a, 210b, 210c, 210d, 210e, 210f, 210g and 210h respectively, each through input resistors 211a, 211b, 211c, 211d, 211e, 211f, 211g, and 211h and 212a, 212b, 212c, 212d, 212e, 212f, 212g, and 212h.

The emitters of each of the 209 and 210 transistors are connected together to ground. Each of the collectors of transistors 209a–209h are connected to the digit selection inputs of display digits 1–8 of all of the segments. The collectors of transistors 210a–210h are individually connected to the digit selection inputs of digits 9–16.

In operation, digit display signals appear on the appropriate data bus leads DB0–DB3 and DB4–DB7. A blanking signal is generated (on character F in one successful prototype which was blanked out by the display) by operation of flip flop 202 upon the sensing of the presence of a signal on all the DB0–DB3 leads which are applied to NAND gate 201.

As noted earlier, data bus leads DB4–DB7 carry signals designative of a digit to be displayed, multiplexed 2 ms per digit by the microprocessor. These signals are stored in latch 203, and applied to digit decoders 204 and 205 in parallel. One of the output terminals of decoder 203 is either at high or low level at this time, a low level input causing digit decoder 204 to decode the digit, and a high level input, after inversion in inverter 208 to low level, causing digit decoder 205 to be enabled.

As a result, driving current is applied to one of the output terminals DIG 1–DIG 8 connected to the collectors of transistors 209a–209h or to terminals DIG 9–DIG 7 which are connected to the collectors of transistors 210a–210h. At the same time, a signal is applied to any of the segment A–G leads, by which a display segment is selected. In this manner a specific digit, in a specific display segment is selected and displayed.

Decoder 200 and latch 203, however, operate when a signal is received on the WRITE lead and REG2 lead which are connected to the input of a NAND gate 213. The output of NAND gate 213 is connected to the select inputs of decoder 200 and latch 203, along with a STROBE input. The STROBE input is also applied to the input of flip flop 202.

Accordingly, the decoding and display of the appropriate selected digits in the appropriate digit segment occurs with the presence of a STROBE signal, generated with the presence of a WRITE and REG2 signal.

Figure 7:
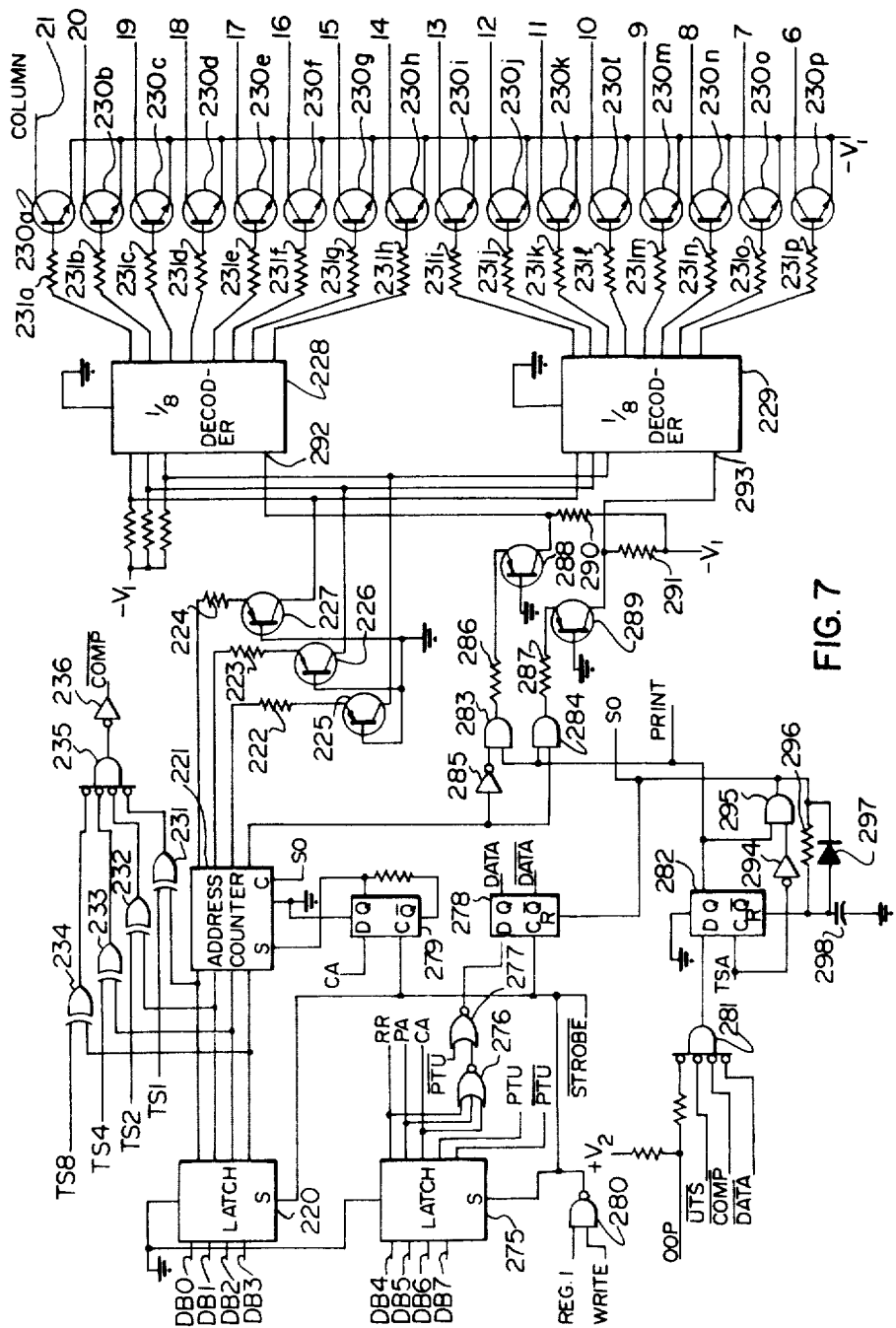
Figure 8:
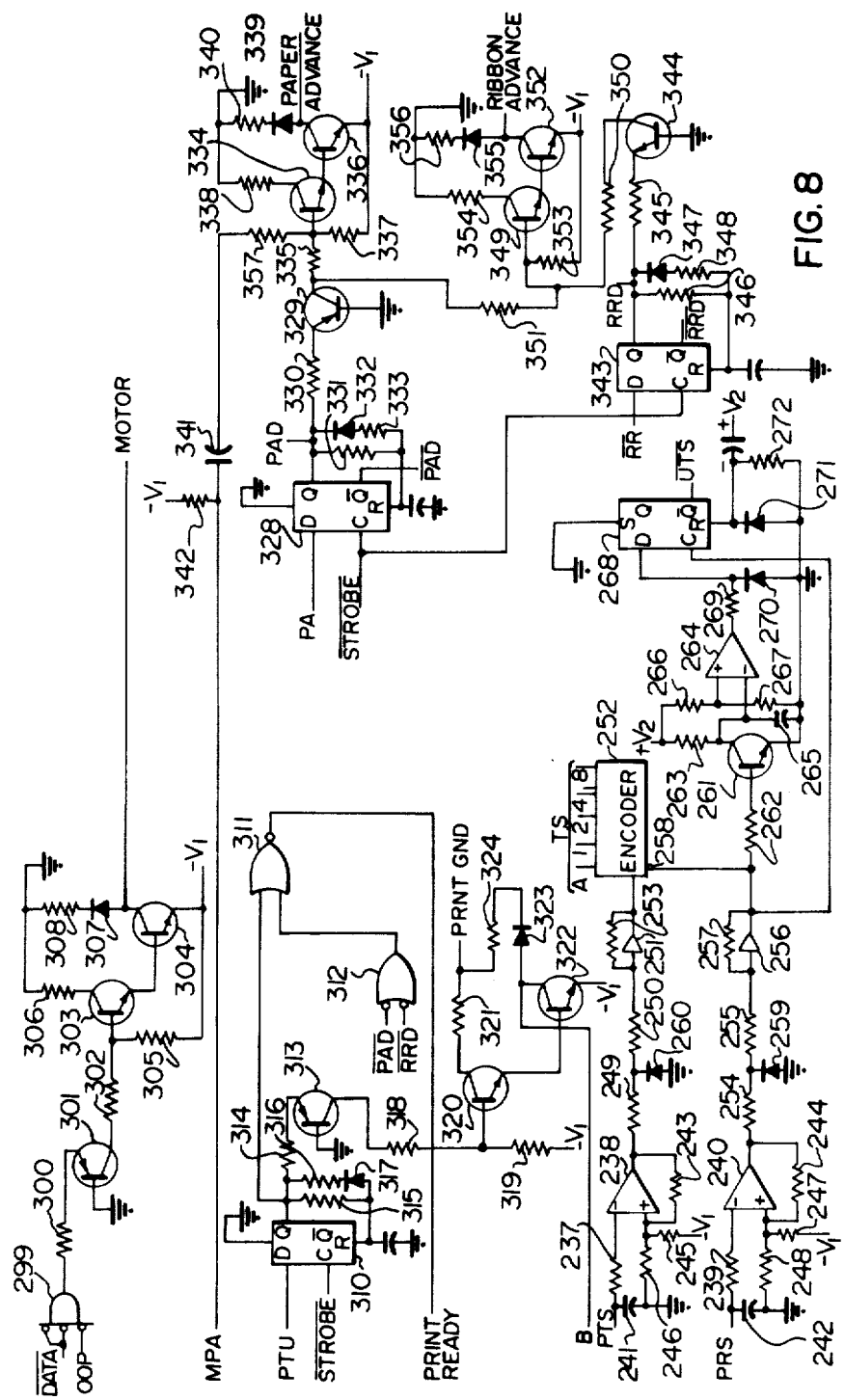

Reference is now made to FIGS. 7 and 8 in conjunction which show the printer control circuitry for the printer mechanism preferred in this invention. The printer preferably is type EP101, available from C. Itoh Electronics Inc., New York, N.Y., U.S.A. This printer is supplied with a rotatable drum which carries a sequence of numbers and digits. The drum is spun to locate a particular number or digit against a paper roll. A printer hammer then applies the paper against a ribbon which is adjacent each of the print wheels, thus causing an impression.

In FIG. 7 the input of 4 bit latch 220 is connected to data bus leads DB0, DB1, DB2, and DB3, and the output of which is connected to parallel input binary counter 221. The output leads of counter 221 are individually connected through resistors 222, 223 and 224 to the inputs of transistors 225, 226 and 227. The collector output leads of each of these transistors are connected to drum coloum select ⅛ decoders 228 and 229 in parallel. The individual output terminals of decoders 228 and 229 are connected to the base inputs of transistors 230a-230p through resistors 231a-231p. The emitters of each of the latter transistors are connected together to a source of potential $-V_1$. The individual collector outputs are connected to the column select terminals of the printer mechanism, labelled 6-21 in FIG. 7.

The output terminals of latch 220 are also each connected to one of the input terminals of EXCLUSIVE OR gates 231, 232, 233, and 234. The second input terminal of each of the EXCLUSIVE OR gates are individually connected to timing signal TS1, TS2, TS4, TS8 leads which carry the timing signals for control of the printer mechanism, and indicate of the position of the printing drum for printing each character. These signals are obtained from the output of encoder 252 (FIG. 8). The output of each of EXCLUSIVE OR gates 231, 232, 233 and 234 are connected to negative logic input AND gate 235, the output of which is connected to the input of inverter 236. The output of inverter 236 is lead $\overline{COMP}$ (compare). A signal appears on this lead upon coincidence of appropriate signals on the data bus which indicate the corresponding desired position of the drum as indicated on the TS leads.

A column select signal appearing on data bus leads DB0-DB3 is decoded, and coincidence with the position of the printing drum indicated on the PTS lead (FIG. 8) is determined, and with the noted coincidence a pulse appears on the $\overline{COMP}$ lead at the proper printing time (indicating that the printing drum is in proper location).

At the same time binary counter 221 applies its output signals to transistors 225, 226 and 227 which in turn apply them to decoders 228 and 229. The output leads of decoders 228 and 229 are connected to apply the resulting decoded output signal to transistors 230a-230p, which select the printer column, the printer hammer of which will be operated at the designated time to print the proper character. The designation of the character is thus controlled by the signal on the data bus as compared with the timing signal which is provided as a result of the timing signal on the PTS lead from the printer mechanism.

A circuit for the derivation of the timing signals on leads TS1, TS2, TS4 and TS8 may be seen in FIG. 8. Two leads PTS (print timing signals) and PRS (print reset signals) are connected to the corresponding timing and reset terminals of the printing mechanism. As there are usually 16 segments on the print drum, 32 double pulses per revolution of the drum appear on the PTS lead (and effectively 6), and 1 pulse per revolution of the drum appears on the PRS lead. Those pulse signals are both translated through similar circuits as follows.

The PTS lead is connected through resistor 237 to the inverting input of operational amplifier 238, while the PRS lead is connected through resistor 239 to the inverting input of operational amplifier 240. The PTS and PRS leads are individually bypassed to ground by capacitors 241 and 242. Operational amplifiers 238 and 240 have individual feedback resistors 243 and 244 connected between their respective output terminals and non-inverting input terminals. A voltage divider connected between a source of potential $-V_1$ and ground is connected with its tap to the non-inverting input of the individual operational amplifiers 238 and 240. The voltage divider connected to operational amplifier 238 is comprised of series resistors 245 and 246, and the voltage divider connected to operational amplifier 240 is comprised of series resistors 247 and 248.

The output terminal of operational amplifier 238 is connected through series resistors 249 and 250 as well as Schmitt buffer 251 to a serial-to-parallel encoder 252. Schmitt buffer 251 is bypassed with a high value resistor 253. The output leads of encoder 252 are labelled TSA, TS1, TS2, TS4, and TS8, the latter four of which are connected to the second inputs of EXCLUSIVE OR gates 231, 232, 233 and 234 (FIG. 7) described earlier. These leads, of course, carry the timing pulses by which a time comparison is made with the signal from the data bus which designates which digit is to be imprinted at the designated time in the designated column, also as described earlier.

The output of operational amplifier 240 is connected through series resistors 254 and 255 to the input of Schmitt buffer amplifier 256, which itself is bypassed by resistor 257. The output of buffer amplifier 256 is connected to the reset input 258 of encoder 252. The junction of resistors 254 and 255 is connected to ground through clamping diode 259, and the junction of resistors 249 and 250 is connected to ground through clamping diode 260.

In operation, a pulse on the PRS lead as a result of a mark on the printer drum rotating past a sensing point is amplified in operational amplifier 240 (for instance 100 times), and the resulting output signal is clipped to a relatively clean square wave by its amplitude exceeding the threshold determined by the ratio of resistors 248 and 247. The resulting pulse is applied to the reset input 258 of encoder 252. This marks the beginning of a cycle by which the timing of the rotation, and thus of the drum location begins.

A sixteen pulse per drum revolution signal appears on the PTS lead and is amplified in amplifier 238 in a similar manner as the one pulse per revolution signal. The resulting output signal is applied to the input terminal of encoder 252. The encoder converts the 16 serial pulses to parallel signals on the TSA, TS1, TS2, TS4 and TS8 leads according to the count of the pulses from the beginning, reset pulse. As noted earlier, signals on the latter four leads are applied to EXCLUSIVE OR gates 231, 232, 233, 234 (FIG. 7) as described earlier.

Also connected to the output of buffer amplifier 256 is the base input lead of transistor 261 through resistor 262. The collector of transistor 261 is connected to a source of potential $+V_2$ through resistor 263, and its emitter is connected to ground. Its collector is also connected to the inverting input of operational amplifier 264, and is also bypassed to ground by capacitor 265.

The non-inverting input of operational amplifier 264 is connected to the junction of a pair of series connected resistors 266 and 267 which are connected between the source of potential $+V_2$ and ground, forming a voltage divider.

The output of operational amplifier 264 is connected to the Data (D) input of flip flop 268 through resistor 269. The Data input of flip flop 268 is also bypassed to ground through diode 270. The output of buffer amplifier 256 is also connected to the Clock (C) input of flip flop 268. The Set inputs of flip flop 268 is connected to ground and the reset input R is connected to ground through diode 271, bypassed by resistor 272. The reset input of flip flop 268 is connected through capacitor 273 to potential $V_2$ which is used to reset flip flop 268 on power-up.

The reset pulse signal which is at the output of buffer amplifier 256 is applied to the clock input of flip flop 268. At the same time, it is applied to the input of transistor 261. Transistor 261 conducts, discharging capacitor 265. It should be noted that both inputs to operational amplifier 264 are connected to voltage dividers, one being comprised of resistors 266 and 267 and the other being comprised of resistors 263 and capacitor 265. When capacitor 265 charges at a certain rate, the voltage thereacross will be less than $+V_2$, and the charge time is established so that the voltage is about the same as across resistor 267. Thus there is no differential voltage during this time amplified by operational amplifier 264. As the voltage across capacitor 265 increases toward $+V_2$, operational amplifier 264 conducts, on the positive edge of the output from buffer amplifier 256, operating flip flop 268.

The reset pulse applied to transistor 261 causes discharge of capacitor 265. If the printing drum is not up to speed, the voltage on capacitor 265 exceeds the voltage at the non inverting input of operational amplifier 264, and its voltage causes operation of flip flop 268 as described above. If the printing drum is up to proper speed, capacitor 265 is caused to discharge before its voltage can increase sufficiently to exceed the voltage at the non-inverting input of operational amplifier 264. With the signal at the clock input of flip flop 268 pulsing once per revolution at the proper speed, the output signal at the $\overline{\text{UTS}}$ (not up to speed) lead of flip flop 268 remains low.

Should the drum not be up to proper operation speed, flip flop 268 operates as noted above, and a high level signal appears on the $\overline{\text{UTS}}$ lead. This lead is connected to a four input inverting input NAND gate which will be described further with reference to FIG. 7.

Returning now to FIG. 7, latch 275 is connected to data bus leads DB4, DB5, DB6, and DB7. This latch provides functional signals for the printer mechanism, such as paper advance, etc.

It will be noted that there are five output leads of latch 275, designated RR (ribbon advance), PA (paper advance), CA (column address), PTU (paper take up) and $\overline{\text{PTU}}$.

Each of the leads RR, PA, and CA are connected to an input of NOR gate 276, which has its output connected to the input of NOR gate 277 along with the $\overline{\text{PTU}}$ input. The output of NOR gate 277 is connected to the data input D of flip flop 278.

The CA lead is connected to the data input of a flip flop 279, which has its output connected to the set inputs of counter 221.

The register 1 lead (REG1) and also the WRITE lead are connected to the inputs of NAND gate 280, the output of which forms the $\overline{\text{STROBE}}$ lead and signal.

The output of this gate is connected to the set inputs of latch 275 and 220, and also to the clock input C of flip flops 278 and 279. The output leads of flip flop 278 are designated DATA, and $\overline{\text{DATA}}$.

An inverting input NAND gate 281 which was briefly mentioned earlier has four inputs connected thereto: the DATA lead, COMP lead, $\overline{\text{UTS}}$ lead, and an out-of-paper lead OOP, the latter carrying a signal from the print mechanism when the paper roll in the printer has run out. The output of NAND gate 281 is connected to the data input of flip flop 282. A timing signal source is connected to the clock input of flip flop 282 on the TSA lead.

The Q output of flip flop 282 carries a print authorization signal, on the lead labelled PRINT. This lead is also connected to one of the inputs of AND gates 283 and 284.

Also connected to the second input of AND gate 284 is an output of counter 221. This output is also connected to the second input of AND gate 283 through an inverter 285. The effect of this, therefore, is to apply a signal either to AND gate 283 or AND gate 284 from the noted output of decoder 221 depending on whether the signal is high or low. The output signals of the latter AND gates thus alternate.

The outputs of AND gates 283 and 284 are respectively connected through resistors 286 and 287 to the emitters of driver transistors 288 and 289, the bases of which are connected to ground. The collectors are connected to a source of potential $-V_1$ through individual resistors 290 and 291. The collector of transistor 288 is connected to the enable input 292 of decoder 228, while the collector output of transistor 289 is connected to the enable input of decoder 229.

The timing signal input TSA is also connected to the input of an inverter 294, which has its output connected to AND gate 295. The Q output of flip flop 282 is also connected to the second input of AND gate 295. The output of AND gate 295 is connected to the reset input R of flip flop 278, and to the reset input of flip flop through resistor 296 which is in parallel with diode 297. Bypass capacitor 298 is connected between reset input of flip flop 282 and ground.

In operation, a column address digital signal appears on the output lead of counter 221 which is connected to the input of inverter 285 and AND gate 284. This results from the address signal on the data bus, held in latch 220 and applied to the input of counter 221. As flip flop 279 sequences, it advances the address input to counter 221. With the input of pulses on counter 221 clock input C from the SO lead it continues to count, indicating the location across the printer drum. In addition, output pulses appear alternately at the outputs of AND gates 283 and 284 which are applied to transistors 288 and 289. These transistors operate as level shifters. Accordingly, the enable inputs 292 and 293 of decoders 228 and 229 are caused to alternate between ground and potential $-V_1$ in sequence. The data input signal which is applied in parallel to decoders 228 and 229 from counter 221 is decoded alternately in decoders 228 and 229. The outputs of decoders 228 are applied through transistors 230a–230p to output leads 6–21 which are connected to the transistor collectors, and to the corresponding column enable input of the printer drum.

AND gates 283 and 284, however, do not function unless they are enabled from the PRINT lead, which indicates that the print wheels are in position, that paper is present, and that the drum has advanced. A signal on the PRINT lead is applied from the Q output of flip flop 282, which has an input signal present at its data input D when signals from gate 281 indicates that the timing is correct, that a data signal indicating the number to be printed is present, that a comparison of the location of the print drum with the input data indicates that the proper alphanumeric digit is in location for printing, and that paper is present in the printer mechanism. These signals, as was noted earlier, are provided on the OOP, UTS, COMP and DATA leads. In the event data is present, the position of the print drum is correct for impressing the proper alphanumeric symbol, the timing signal is correct, and paper is present, an output signal appears from gate 281, causing flip flop 282 to apply an output signal at its Q output. This signal enables gates 283 and 284, which gates enable either decoder 228 or decoder 229 and allow signals to be translated from counter 221. Accordingly a COLUMN lead is selected, and with a signal on the PRINT lead from the Q output of flip flop 282, the proper print hammer is operated.

With the application of a timing signal on the TSA lead connected to the clock input of flip flop 282, which signal is also applied through inverter 294 to one of the inputs of NAND gate 295 along with the PRINT output signal of flip flop 282, a reset signal is applied to flip flops 278 and 282 and also to the SO lead, indicating the completion of an alphanumeric character printing cycle. The DATA signal output of flip flop 278 is inverted, which inhibits gate 281, and the circuit is prepared for application of the next character.

Returning now to FIG. 8, an inverting input AND gate 299 has a pair of inputs, one from the DATA lead and one from the OUT OF PAPER lead OOP. The output of gate 299 is connected through resistor 300 to the emitter of transistor 301, which has its base connected to ground. Its collector is connected through resistor 302 to the base of transistor 303 which has its emitter directly coupled to the base of transistor 304. Transistor 304 has its emitter connected to a source of potential $-V_1$ (in the case of both of transistors 303 and 304 being of NPN polarity), and the base of transistor 303 is connected to the source of potential $-V_1$ through resistor 305. The collector of transistor 303 is connected to ground through resistor 306, and the collector of transistor 304 is connected to ground through diode 307 and resistor 308. The collector of transistor 304 is connected to a motor drive lead, referenced MOTOR.

With the presentation of a data signal on the DATA lead from flip flop 278 (FIG. 7) through gate 299, this signal is amplified in transistors 301, 303 and 304, appears on the MOTOR lead, and the printer drive motor is caused to advance. Should the printer be out of paper, a signal from the printer mechanism appears on the OOP lead connected to gate 299, and the gate is thereby inhibited from operating the motor. In this manner the printer is stopped from printing when the apparatus has run out of paper.

The remaining portion of the print mechanism drive circuit shown in FIG. 8 is comprised of flip flop 310 which has its data input D connected to the PTU signal from latch 275 and its clock input to a STROBE input lead. The PTU lead, it will be recalled, is one of the decoded output leads of latch 275 (FIG. 7). The Q output lead of flip flop 310 is connected to one input of NOR gate 311, and its output is connected to a PRINT READY lead which is a status indicator to the microprocessor.

The second input of NOR gate 311 is connected from the output of inverting input OR gate 312. This gate has its inputs respectively connected to leads $\overline{PAD}$ (paper advance drive) and $\overline{RRD}$ (red ribbon drive) connected to the printing mechanism.

The Q output of flip flop 310 is connected to the emitter of transistor 313 through resistor 314, and also to the flip flop reset input through the parallel circuit of resistor 315 and resistor 316 in series with diode 317.

The base of transistor 313 is connected to ground, and its collector is connected to a source of potential $-V_1$ through series resistors 318 and 319. The junction of resistors 318 and 319 is connected to the base of transistor 320. The collector of transistor 320 is connected to lead PRNT GND through resistor 321. The PRNT GND lead is connected to the print ground terminal on the printer mechanism.

The emitter of transistor 320 is connected to the base of transistor 322. The collector of transistor 322 is connected to the PRNT GND lead through diode 323 and resistor 324 in series. The collector of transistor 322 is connected to the B terminal (the paper take-up solenoid) of the printer mechanism.

With the presence of a signal on the PTU lead, at the proper time designated by the presence of a pulse on the STROBE lead a signal appears on the Q output of flip flop 310. This signal is applied to the reset input of the aforenoted flip flop, resetting it. It is also applied to transistor 313, which pulls up the junction between resistors 318 and 319. This causes conduction of the collector-emitter circuits of transistors 320 and 322, thus enabling the Paper Take-Up Solenoid lead.

A signal also appears on the PA (paper advance) lead which is connected to the data input of flip flop 328, which causes advancement of the paper in the printer at an appropriate time. The Q output lead of flip flop 328 is connected to the emitter of transistor 329 through resistor 330. The base of transistor 329 is connected to ground.

The Q lead of flip flop 328 is connected to its reset input through the parallel circuit of resistor 331, and diode 332 in series with resistor 333. The base of transistor 329 is connected to ground.

The collector of transistor 329 is connected to the base of transistor 334 through resistor 335, and to the base of transistor 349 through resistor 351. The emitter of transistor 334 is connected directly to the base of transistor 336, which has its emitter connected to a source of potential $-V_1$ with resistor 337 which is also connected to the base of transistor 334. The collector of transistor 334 is connected to ground through resistor 338, and the collector of transistor 336 is connected to ground through diode 339 in series with resistor 340.

In the configuration shown, transistors 334 and 336 are of NPN polarity. The collector of transistor 336 is connected to the PAPER ADVANCE lead which is connected to the printer mechanism PAPER ADVANCE input.

The base of transistor 334 is connected to a manual paper advance lead MPA through resistor 357 and capacitor 341 in series. The MPA lead is also connected to a source of potential $-V_1$ through resistor 342. A manually applied signal on the MPA lead allows an operator to advance the paper in the printer.

A ribbon advance input signal on lead RR is applied to the data input D of flip flop 343. The Q output of flip flop 343 is connected to the emitter of transistor 344 through resistor 345. The Q output is also connected to the reset input R of flip flop 343 through the parallel circuit of resistor 346 and diode 347 in series with resistor 348.

The collector of transistor 344 is connected to the base input of transistor 349 through resistor 350.

The emitter of transistor 349 is connected directly to the base of transistor 352, which has its emitter connected to a source of potential $-V_1$ along with resistor 353 which is also connected to the base of transistor 349. The collector of transistor 349 is connected to ground through resistor 354, and the collector of transistor 352 (the RIBBON ADVANCE lead) is connected to ground through the series circuit of diode 355 and resistor 356.

Each time a pulse appears at the output of transistor 329, it is applied in parallel to the circuit which includes transistor 334 and the circuit which includes transistor 349. Since each of these circuits operates in a similar manner, a pulse signal appears on the RIBBON ADVANCE lead at the same time as on the PAPER ADVANCE lead.

Should a signal appear on the $\overline{RR}$ lead, flip flop 343 operates and applies a pulse to transistor 344. This pulse is applied mainly to the circuit including transistor 349 (since resistor 351 should be of high value) and only the ribbon is advanced. The $\overline{STROBE}$ input to flip flop 343 ensures synchronization of the printer timing of the ribbon advance with the remainder of the operation of the printer.

Figure 9:
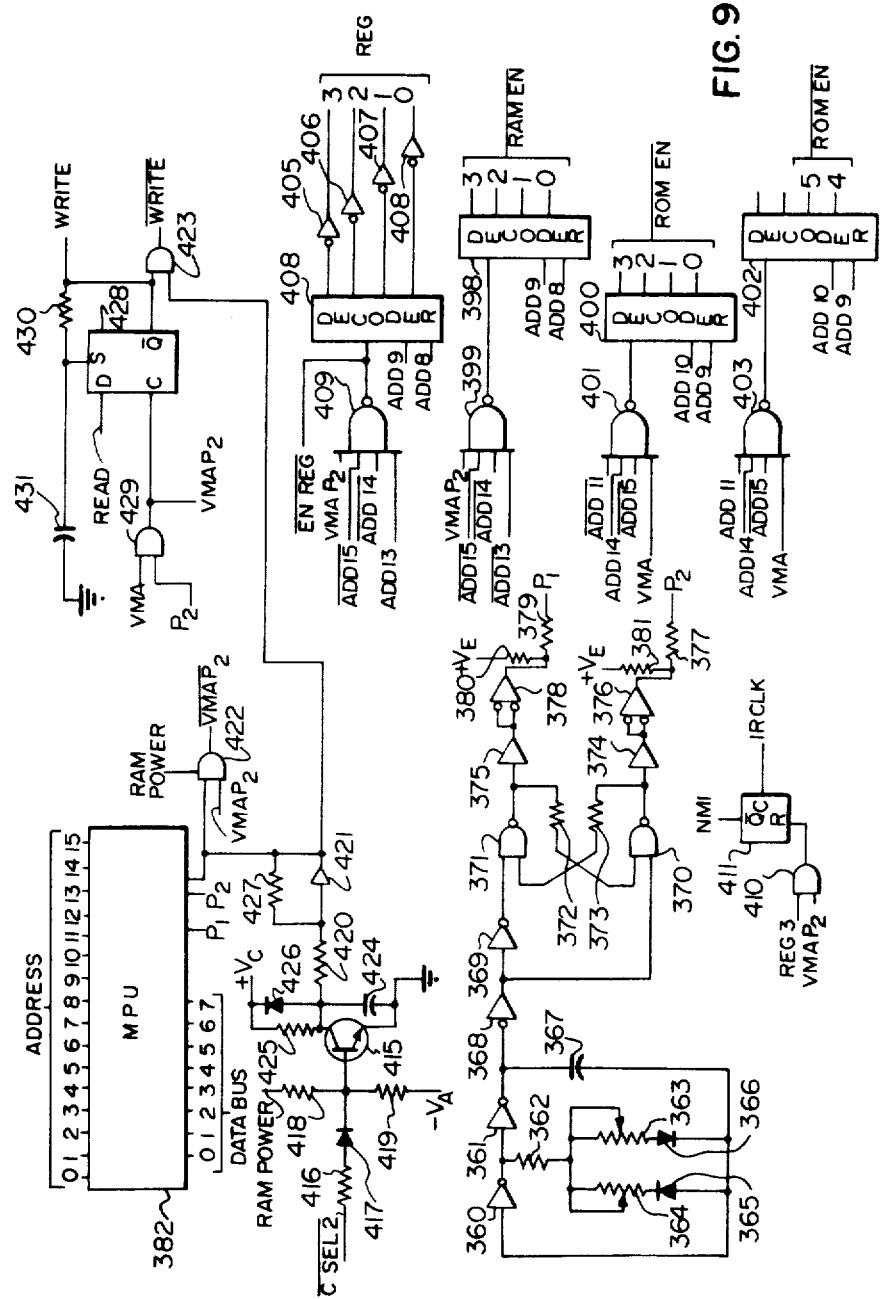
Figure 10:
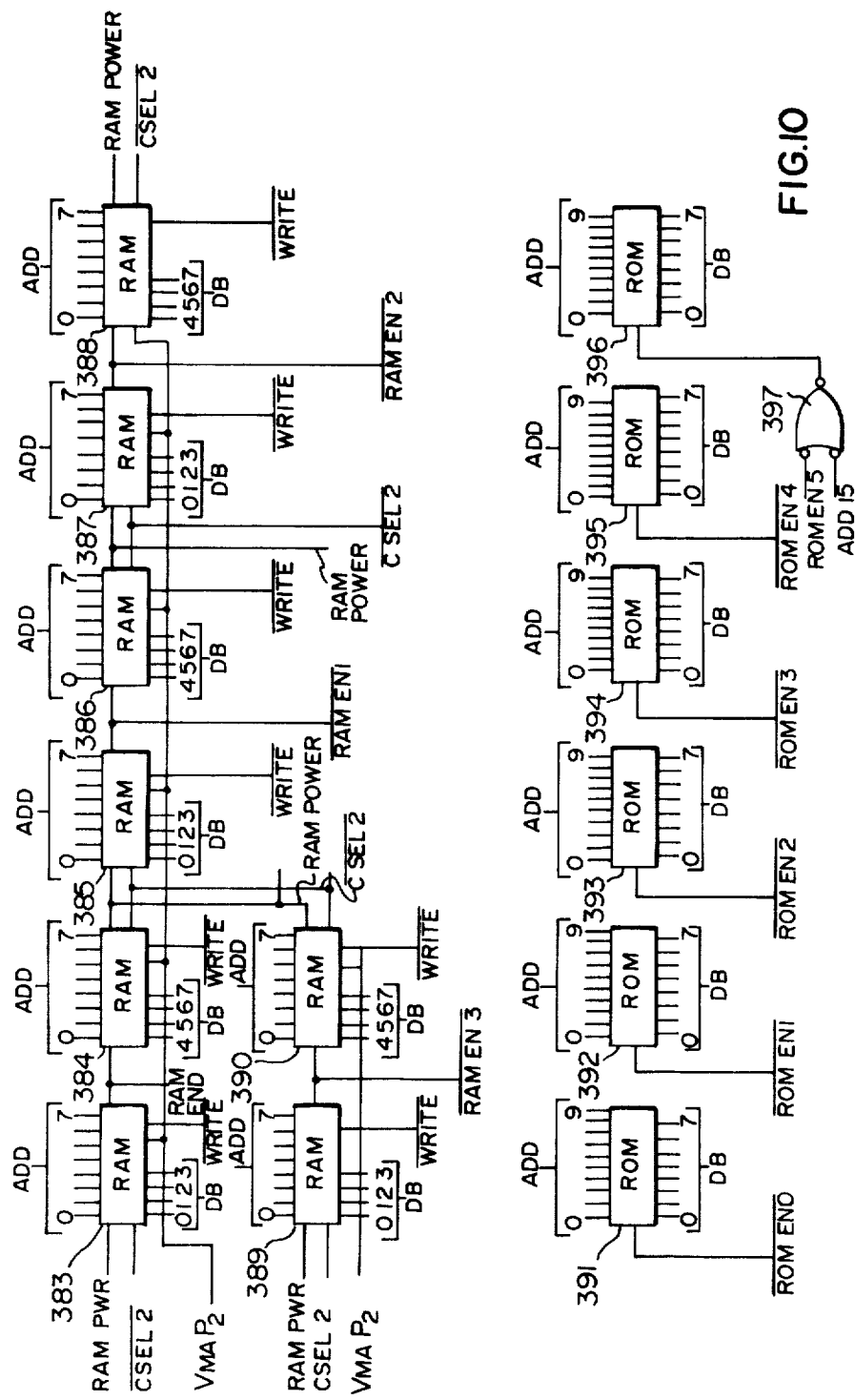

Turning now to FIGS. 9 and 10, the central processing unit and associated memories are shown.

A clock provides two output signals with phases $P_1$ and $P_2$. The clock is comprised of an oscillator having series-connected inverters 360 and 361 with resistor 362 connected to their junction. Resistor 362 is also connected to one end of a pair of potentiometers 363 and 364. The other end of each of the potentiometers is respectively connected to one end of oppositely poled diodes 365 and 366. Capacitor 367 connects the output of inverter 361 to the junction of the two diodes.

The output of inverter 361 is connected to the input of inverting input buffer 368, the output of which is connected to the input of a flip flop constructed as follows. The output of buffer 368 is connected to the input of inverter 369 and also to one input of NAND gate 370. The output of inverter 369 is connected to one of the inputs of NAND gate 371. The output of NAND gate 371 is connected to the second input of NAND gate 370 through resistor 372, while the output of NAND gate 370 is connected to the second input of NAND gate 371 through resistor 373. The output of NAND gate 370 is also connected to the input of buffer 374, and the output of NAND gate 371 is connected to the input of buffer 375. The output of buffer 374 is connected through the series circuit of buffer 376 and resistor 377 to output lead $P_2$, and the output of buffer 375 is connected via the series circuit of buffer 378 and resistor 379 to the lead labelled $P_1$. The junction of buffer 378 and resistor 379 is connected to a source of potential $+V_E$ through resistor 380 and similarly the junction between buffer 376 and resistor 377 is connected to the source of potential $+V_E$ through resistor 381.

In operation, the circuit including inverters 360 and 361 and potentiometers 363 and 364 forms an oscillator. The resistance of potentiometer 363 can be about 10% of the value of the resistance of potentiometer 364, which establishes potentiometer 364 as a frequency vernier control.

The resulting output signal of inverter 361 passes through buffer 368 to the following flip flop, which is enabled each time a pulse from the oscillator is received. Accordingly, output pulses occur in alternate sequence at the output terminals of NAND gates 370 and 371.

These pulses are translated by buffers 375 and 378 and appear at lead $P_1$, and are also translated by buffers 374 and 376 and appear at lead $P_2$ in opposite phase to the signal at lead $P_1$.

A microprocessor 382 is utilized which has a pair of clock input leads $P_1$ and $P_2$. In addition the microprocessor has sixteen address terminals 0-15, as well as eight data bus terminals 0-7. Preferably, the microprocessor MPU is type 6800, which is available from Motorola Inc. of Phoenix, Ariz.

Associated with the microprocessor are randon access memories (RAMs) 383-390 (see FIG. 10) and read only memories (ROMs) 391-396. As is well-known, the electrical interconnections within the ROMs are fixed, and as such are physical structural adjuncts to the microprocessor. However, for ease of description, the content of both the RAMs and ROMs will be expressed in machine language and by mnemonic in Appendix A attached hereto.

Each of the RAMs is connected to a $\overline{WRITE}$ lead as shown, as well as a VMAP$_2$ lead.

A RAM enable lead is connected to each pair of RAMs as follows: RAM EN0 lead is connected to RAMs 383 and 384, RAM EN1 is connected to RAMs 385 and 386, RAM EN2 is connected to RAMs 387 and 388, and RAM EN3 lead is connected to RAMs 389 and 390. A RAM POWER lead is connected to each of the RAMs, and a chip select lead $\overline{C \text{ SEL } 2}$ is also connected to each of the RAMs.

Similarly, ROM enable leads $\overline{ROM\ EN0}$, $\overline{ROM\ EN1}$, $\overline{ROM\ EN2}$, $\overline{ROM\ EN3}$, $\overline{ROM\ EN4}$ and $\overline{ROM\ EN5}$ are connected to ROMs 391-396. ROM EN5 is connected to ROM 396 through a NOR gate 397, along with the inverse signal derived from address 15 lead $\overline{ADD15}$, connected to microprocessor 382.

The RAM and ROM enable signal generation circuitry is shown IN FIG. 9. Looking first at the RAM enable output leads 0, 1, 2, 3, which are connected to the corresponding RAM enable leads in FIG. 10, it will be seen that these leads are the output leads of decoder 398. The address 8 and address 9 leads from microprocessor 382 are connected to two of the inputs of decoder 398, as well as the output of NAND gate 339. The input leads of NAND gate 399 are connected to the VMAP$_2$ lead, and address $\overline{ADD\ 15}$, address $\overline{ADD\ 14}$, and address $\overline{ADD\ 13}$ leads of microprocessor 382.

The ROM enable output leads 0-3 are connected to decoder 400. The input leads of decoder 400 are connected to the address ADD9 and address ADD10 leads of the microprocessor 382, as well as to the output of NAND gate 401. The input leads of NAND gate 401 are connected to the $\overline{ADD\ 11}$, ADD 14, $\overline{ADD\ 15}$ and VMA leads.

Similarly, the ROM enable 4 and 5 leads are connected to the output of decoder 402. The input leads to decoder 402 are connected to the ADD9 and ADD10 address outputs of microprocessor 382, and to the output of NAND gate 403. The input leads to NAND gate 403 are connected to the ADD 11, ADD 14, $\overline{ADD\ 15}$, and VMA leads.

The register leads referred to earlier are derived from the REG 0, 1, 2, and 3 leads, which are connected to the outputs of inverting input buffers 405, 406, 407, and 408. The inputs of these buffers are connected to the individual output leads of decoder 408. The input leads of decoder 408 are connected to the address leads ADD8 and ADD9, and to the output of NAND gate 409. An enable register lead $\overline{\text{EN REG}}$ is connected to the output of NAND gate 409. The input leads of NAND gate 409 are connected to VMAP$_2$, ADD 15, Add 14 and ADD 13 leads.

The REG 3 lead and VMAP$_2$ leads are connected to respective inputs of AND gate 410, which has its output connected to the reset input R of flip flop 411. The clock input is connected to the IRCLK lead, and the $\overline{Q}$ output lead is connected to the NM1 lead.

The chip select lead $\overline{\text{C SEL 2}}$ is connected to the base input of transistor 415 through the series circuit of resistor 416 and diode 417. The base is also connected to the tap of a resistance voltage divider comprising resistors 418 and 419 which divider is connected between source RAM POWER and potential $-V_A$.

The collector output of transistor 415 is connected through resistor 420 and Schmitt buffer 421 to the reset input R of microprocessrr 382 and also to one input of AND gate 422 and one input of AND gate 423. Capacitor 424 is connected between the collector of transistor 415 and ground; the emitter of transistor 415 is also connected to ground. The collector is connected to a source of potential $+V_C$ through resistor 425 connected in parallel with diode 426. Schmitt buffer 421 is bypassed by high valued resistor 427.

The second input of AND gate 422 is connected to the VMAP$_2$ lead; the output of AND gate 422 is the $\overline{\text{VMAP}_2}$ lead.

The second input of AND gate 423 is connected to the $\overline{Q}$ output of flip flop 428. The output of AND gate 423 is the $\overline{\text{WRITE}}$ lead.

The data input D to flip flop 428 is applied to the READ lead while the clock input VMAP$_2$ is applied to the clock input of flip flop 428. The input leads to AND gate 429 are the VMA lead and the P$_2$ lead. Consequently, the output of AND gate 429 is the VMA P$_2$ lead, connected to the clock input C of flip flop 428.

The $\overline{Q}$ output of flip flop 428 is connected to the WRITE lead, which is connected through resistor 430 to the set inputs of flip flop 428. The set input is also connected to ground through capacitor 431.

The operation of the type 6800 microprocessor with its peripheral ROM and RAM memories is known to persons skilled in the art, and therefore will not be described in detail. Data sheets and other operation information is available from Motorola Semiconductors of Austin, Tex. relating to the microprocessor type MC6800 which is suitable for use with this invention, to which the reader is referred, and which is incorporated herein by reference.

The clock source of alternate phases P$_1$ and P$_2$ has already been described. The Q$_1$ and Q$_2$ leads are connected to already been described. The Q$_1$ and Q$_2$ leads are connected to all similarly labelled leads described, such as those connected to microprocessor 382, to one lead of AND gate 429 etc. Upon entry of a pulse on the VMA lead to AND gate 429, a pulse is produced on the VMAP$_2$ lead at the output of AND gate 429. With proper power voltage, the level on the $\overline{\text{C SEL 2}}$ lead is low, allowing operation, while should the power voltage drop to too low a voltage, the $\overline{\text{C SEL 2}}$ lead goes to high voltage, resetting the microprocessor.

Upon the application of address code signals on address leads 0-15 of microprocessor 382, decoder 408 provides an output on the REG 0, 1, 2, and 3 leads. Similarly, upon addressing of the appropriate inputs to decoders 398, 400 and 402, RAMs 0-3 and ROMs 0-5 are enabled.

With the addressing of the RAMs and ROMs on the input leads from microprocessor 382, and with enabling from decoders 398, 400 and 402, data is either read from or written on data bus leads 0-7 connected to RAMs 383-390 or are read from data bus leads 0-7 connected to ROMs 391-396.

The appropriate RAM is selected by a signal on the $\overline{\text{C SEL 2}}$ lead, and clock signals are applied via the VMAP$_2$ lead.

It will be understood that signals translated by the ROMs cause the microprocessor 382 to access and store signals such as dialed digits which are carried by the data bus, and cause the microprocessor to translate them to signals, which, when applied later to the data bus, operate the printer and the display.

For ease of understanding the invention the internal translation mechanism of each of the RAM and ROM memories will be described in processor machine language and mnemonic, rather than in electronic terms. A complete description of the stored signal contents of the memories will be evident with reference to the listing of the memory contents in machine language and mnemonic which listing will be found in Appendix A.

Turning now to FIG. 11, which will be found on the same page of drawings as FIG. 2, an alarm circuit comprising a latch 435 is shown, having input leads which are connected to the data bus leads DB5, DB6 and DB7. Any spare input leads are connected to ground.

One output of latch 435 is connected through resistor 437 to the base input of transistor 438. The emitter of transistor 438 (assuming that it is of PNP polarity) is connected to ground. The collector is connected through a relay coil 439 shunted by protective diode 440 to a source of potential V$_D$. The base of transistor 438 is also connected to potential V$_D$ through resistor 441.

A make contact 439-1 of relay coil 439 is connected to leads 442 and 443 which are connected to an external alarm circuit (not shown). The leads 442 and 443 can be shunted by a protective varistor 444.

When the appropriate previously designated series of digits stored in the RAM memory and accessed upon receipt of a signal on the data bus leads causes the microprocessor to apply a predetermined translated signal to the data bus leads DB5, DB6 and DB7 under control of the program listed in Appendix B, to operate the alarm, latch 435 operates, causing operation of transistor 438. Relay 439 operates, closing contact 439-1, causing the external alarm circuit to operate and alert the operator that the designated series of digits has been dialed. He can then check the alphanumeric display, if desired, and take appropriate action.

To reset the latch, signals are applied to the WRITE and REG3 inputs to AND gate 436, causing the latch to drop, opening relay 439 and releasing the alarm signal.

Upon the presence of signals on the data bus leads which indicate that the telephone line to which the printer is connected has gone to an off-hook condition, the latch applies an output signal to inverter 445 which in turn applies an output signal to the $\overline{\text{OFHK}}$ lead, which can also be applied to an indicator, advising the operator that the telephone line under observation is active.

The line circuit thus detcts an off hook condition on the telephone line, and applies a digital signal to the data bus, corresponding to this state. The signal is received from the data bus by the microprocessor which operates under control of the signals stored in the RAM memory circuits and applies signals to the data bus which cause the printer control to operate the printer to print the presence of an off hook condition. If desired, the microprocessor can contain a clock input which provides a time and/or data as the data to be printed on the presence indication of the off-hook condition. The printer paper roll is then advanced.

At the same time as the printer is printing, an electronic display operates, indicating to the operator the digits which are being printed.

Following the off-hook condition, dial tones or dial pulses are carried by the telephone line. The receiver detects each dial tone, for example, filters it, and applies a digital signal to the data bus corresponding thereto. This is received by the central processing unit which accesses the ROM, obtains a translation, and causes the printer control circuit to operate the printer, printing the dialed digit, and at the same time cause the display to display the digit in alphanumeric form. The latter will be visible to the operator, while the printed digit will not.

As each successive digit is received, the printer is similarly caused to print it on the same line hidden to the operator, while the display displays it immediately to him.

In the event that a predetermined number which has been stored in a RAM is dialed, a signal is applied to an alarm operate circuit by the microprocessor, which alerts the operator of the dialing of digit sequence which is to be detected.

When the telephone line returns to the on-hook condition, this is sensed by the line circuit which applies an on-hook digital signal to the data bus. The microprocessor responds after translating the signal in the ROM, by applying signals to the data bus to advance the paper in the printer and causing the printer to print a code indicating that the call has terminated, the time and/or the date.

The apparatus described herein has been found to be a significant advance in printer control mechanisms. For the first time an operator is able to identify a call as soon as a predesignated series of numbers has been dialed, no matter how many digits are in the series. Further, the number which is dialed becomes evident to the apparatus user immediately upon dialing, as each number is received, in contrast to the previous requirement of the entire call to be completed before the dialed number is indicated.

A person skilled in the art understanding the above-described invention may now conceive of variations and alternatives. All are considered within the sphere and scope of this invention as defined in the appended claims.

```
00143
00144                       * RAM ASSIGNMENTS
00145                       *
00146A 0020                          ORG    $20
00147A 0020    0001    A STACK       RMB    1
00148
00149
00150                       * FLAGS
00151                       *
00152A 0021    0001    A ANSFLG      RMB    1
00153A 0022    0001    A BUSY        RMB    1
00154A 0023    0001    A DIGTYP      RMB    1
00155A 0024    0001    A FLAG        RMB    1
00156A 0025    0001    A FLASH       RMB    1
00157
00158A 0026    0001    A MCTFLG      RMB    1
00159A 0027    0001    A MF4FLG      RMB    1
00160A 0028    0001    A PRGFLG      RMB    1
00161A 0029    0001    A RIBBON      RMB    1
00162A 002A    0001    A PAFLAG      RMB    1
00163
00164A 002B    0001    A RNGFLG      RMB    1
00165A 002C    0001    A TSTFLG      RMB    1
00166A 002D    0001    A PRSTOP      RMB    1
00167
00168                       *
00169                       * COUNTERS
00170                       *
00171A 002E    0001    A BCDCNT      RMB    1
00172A 002F    0001    A COLCNT      RMB    1
00173A 0030    0001    A DIGCNT      RMB    1
00174A 0031    0001    A SECOND      RMB    1
00175A 0032    0001    A SECSAV      RMB    1
00176A 0033    0001    A EVNCNT      RMB    1
00177
00178A 0034    0001    A PRWAIT      RMB    1
00179A 0035    0001    A DSPCNT      RMB    1
00180A 0036    0001    A RVTIMR      RMB    1
00181A 0037    0002    A PRNCNT      RMB    2
00182          0039    A TTLMTR      EQU    *
00183A 0039    0004    A MCOUNT      RMB    4
00184
```

```
00185A 003D    0001   A PRGTMR R4B    1
00186
00187
00188                        * COUNT + FLAG
00189                        *
00190A 003E    0001   A PCNT    R4B    1
00191A 003F    0001   A PFLAG   R4B    1
00192
00193A 0040    0001   A REVCNT  R4B    1
00194A 0041    0001   A REVFLG  R4B    1
00195
00196A 0042    0001   A RVCNT   R4B    1
00197A 0043    0001   A RNGCNT  R4B    1
00198
00199A 0044    0001   A MTRCNT  R4B    1
00200A 0045    0001   A MTRFLG  R4B    1
00201
00202                        *
00203                        * WORK BYTES / POINTERS
00204                        *
00205A 0046    0001   A COLSAV  R4B    1
00206          0047   A EVENTA  EQU    *
00207A 0047    0001   A EVNSAV  R4B    1
00208A 0048    0001   A EVNTNM  R4B    1
00209
00210A 0049    0002   A NXSTAT  R4B    2
00211          004B   A MFRXSV  EQU    *
00212A 004B    0001   A REG0SV  R4B    1
00213A 004C    0001   A REG1SV  R4B    1
00214A 004D    0001   A REG2SV  R4B    1
00215          004E   A LNSTAT  EQU    *
00216A 004E    0001   A REG3SV  R4B    1
00217
00218A 004F    0001   A ONHOOK  R4B    1
00219
00220A 0050    0002   A SAVEX0  R4B    2
00221A 0052    0002   A SAVEX1  R4B    2
00222A 0054    0002   A STRPNT  R4B    2
00223A 0056    0002   A NXTEVN  R4B    2
00224A 0058    0002   A KBFNXT  R4B    2
00225
00226A 005A    0002   A PRNPNT  R4B    2
00227A 005C    0002   A ADDIND  R4B    2
00228A 005E    0002   A GETSAV  R4B    2
00229A 0060    0002   A EVNTIN  R4B    2
00230
00231A 0062    0002   A CLKPNT  R4B    2
00232A 0064    0002   A DISPNT  R4B    2
00233A 0066    0001   A DISPAD  R4B    1
00234A 0067    0002   A PROTPT  R4B    2
00235
00236
00237                        *
00238                        * ALARM COUNTERS/FLAGS
00239                        *
00240A 0069    0002   A ALMSAV  R4B    2
00241A 006B    0001   A ALRMCT  R4B    1
00242A 006C    0002   A ALRMPT  R4B    2
00243A 006E    0001   A ALRMFG  R4B    1
00244
00245A 006F    0001   A CMPCNT  R4B    1
00246A 0070    0001   A CMPDAT  R4B    1
00247A 0071    0001   A CMPNIB  R4B    1
00248A 0072    0002   A CMPNTR  R4B    2
00249
00250                        *
00251                        * DIALLING COUNTERS/FLAGS
00252                        *
00253A 0074    0001   A BREAKX  R4B    1
00254A 0075    0001   A BRKCNT  R4B    1
00255A 0076    0001   A BRKFLG  R4B    1
00256A 0077    0001   A BRKCON  R4B    1
00257
00258A 0078    0001   A LVCNTR  R4B    1
```

```
00259A 0079      0001    . VSTAT  RMB    1
00260
00261A 007A      0001    A MAKEX  RMB    1
00262A 007B      0001    A MAKTIM RMB    1
00263
00264A 007C      0001    A PULCNT RMB    1
00265
00266A 007D      0001    A ON2WTM RMB    1
00267A 007E      0001    A GNDTIM RMB    1
00268
00269
00270                    *
00271                    * DISPLAY & KBD
00272                    *
00273A 007F      0002    A DPADDR RMB    2
00274A 0081      0001    A DSPADD RMB    1
00275
00276A 0082      0001    A KBDATA RMB    1
00277A 0083      0001    A KBDCMP RMB    1
00278A 0084      0001    A KBDCNT RMB    1
00279A 0085      0001    A KBDSTR RMB    1
00280A 0086      0001    A KBDTIM RMB    1
00281
00282                    *
00283                    * CALL COUNTERS
00284                    *
00285A 0087      0001    A RTCSEC RMB    1
00286A 0088      0004    A CALLTM RMB    4
00287A 008C      0004    A ELPSAV RMB    4
00288A 0090      0004    A CLOCK  RMB    4
00289A 0094      0004    A SAVTIM RMB    4
00290
00291                    *
00292                    * RTC DISPLAY
00293                    *
00294A 0098      0002    A DSPWW  RMB    2
00295A 009A      0001    A DSPDAY RMB    1
00296A 009B      0002    A DSPHH  RMB    2
00297A 009D      0002    A DSPMIN RMB    2
00298A 009F      0002    A DSPSEC RMB    2
00299           00A1     A CLKEND EQU    *
00300
00301                    *
00302                    * BUFFERS
00303                    *
00304A 00A1      000F    A KBDBUF RMB    15
00305           00B0     A KBFEND EQU    *
00306
00307A 00B0      0010    A DSPBUF RMB    16    FOR DIALLED DIGITS
00308
00309A 00C0      000E    A IDENTB RMB    14
00310
00311           00CE     A GNDFLG EQU    *
00312A 00CE      0001    A PARAMO RMB    1     SYSTEM PARAMETERS
00313A 00CF      0009    A PARAM1 RMB    9
00314
00315A 00D8      0050    A ALRMTB RMB    80
00316
00317A 0128      0064    A MNBUF  RMB    100
00318           018C     A EVNBFN EQU    *
00319
00320           018C     A PRNBUF EQU    *
00321A 0400                       ORG    -$400
00322           0400     A PRBFND EQU    *
00323
00324           0274     A PRNMAX EQU    PRBFND-PRNBUF
00325                    *
00326                    * FOR EXORCISOR
00327                    *
00328A 4000                       ORG    $4000
00329
00330
00331                    * POWER UP VECTORS HERE
00332                    *
00333A 4000 8E 0020  A    START  LDS    #STACK
00334
00335A 4003 CE 0000  A           LDX    #0
00336A 4006 20 03 400B           BRA    CLRLOP
00337
00338A 4008 CE 0128  A    CLREVN LDX    #EVNBUF
```

```
00339
00340A 400B 6F 00      A CLRLOP CLR    X
00341A 400D 6D 00      A        TST    X
00342A 400F 26 34 4045          BNE    ERRORE
00343
00344A 4011 63 00      A        COM    X
00345A 4013 A6 00      A        LDAA   X
00346A 4015 81 FF      A        CMPA   #$FF
00347A 4017 26 2C 4045          BNE    ERRORE
00348
00349A 4019 6F 00      A        CLR    X
00350A 401B 7F 2300    A        CLR    REG3
00351
00352A 401E 08                  INX
00353A 401F 8C 0090    A        CPX    #CLOCK
00354A 4022 27 E4 400B          BEQ    CLREVN
00355
00356A 4024 8C 0400    A        CPX    #PR3END    END ?
00357A 4027 26 E2 400B          BNE    CLRLOP     NO
00358
00359
00360A 4029 CE 4000    A        LDX    #START
00361A 402C 4F                  CLRA
00362A 402D AB 00      A SUMLOP ADDA   X
00363A 402F 7F 2300    A        CLR    REG3
00364A 4032 08                  INX
00365A 4033 8C 4C00    A        CPX    #PRMEND
00366A 4036 26 F5 402D          BNE    SUMLOP
00367
00368A 4038 4D                  TSTA
00369A 4039 27 0E 4049          BEQ    SETPNT
00370
00371A 403B 86 0C      A        LDAA   #$C
00372A 403D B7 2200    A ERRSET STAA   REG2
00373
00374A 4040 7F 2300    A ERRLOP CLR    REG3
00375A 4043 20 FB 4040          BRA    ERRLOP
00376
00377A 4045 86 0E      A ERRORE LDAA   #$E
00378A 4047 20 F4 403D          BRA    ERRSET
00379
00380A 4049 CE 018C    A SETPNT LDX    #PRNBUF
00381A 404C DF 5A      A        STX    PRNPNT
00382A 404E DF 67      A        STX    PROTPT
00383
00384A 4050 CE 0128    A        LDX    #EVNBUF
00385A 4053 DF 60      A        STX    EVNTIN
00386A 4055 DF 56      A        STX    NXTEVN
00387
00388A 4057 CE 0098    A        LDX    #DSPWW
00389A 405A DF 62      A        STX    CLKPNT
00390
00391A 405C CE 4220    A        LDX    #IDLE
00392A 405F DF 49      A        STX -  NXSTAT
00393
00394A 4061 0E                  CLI
00395
00396A 4062 BD 479E    A        JSR    DISPWK     START CLOCK
00397
00398A 4065 CE 4B38    A        LDX    #MSGPWR
00399A 4068 BD 45C0    A        JSR    STRTIM
00400
00401A 406B BD 47B5    A        JSR    PRNPAP
00402
00403A 406E 7E 43F2    A        JMP    E.PROC 00405
00406                  *  EVENTS                              PROCEDURE
00407                  *  ------                              ---------
00408                  *
00409                  *   1. PFALSE /CLEAR DOWN/             E.CLR
00410                  *   2. RTC    /1 SECOND TICK/          E.RTC
00411                  *   3. METER /METER PULSE/             E.METR
00412                  *   4. REVRSE /REVERSE/                E.REV
00413                  *   5. FLSHST /FLASH-HOOK/             E.FLSH
00414                  *   6. PORG  /P-LEAD: ORG CALL/        E.ORG
00415                  *   7. PTERM /P-LEAD: TERM CALL/       E.TRM
00416                  *   8. OFHOOK /2 OR 3 WIRE/            E.OFHK
00417                  *   9. ONHK2W /2 WIRE/                 E.ONHK
00418                  *  10. RNGING /2 WIRE/                 E.RING
```

```
00419                     *
00420                     *    $10+X DP DIGIT
00421                     *    $20+X AF4 DIGIT
00422                     *    $40+X KBD DIGIT
00423                     *
00424A 4071 CE 0044   A METER  LDX     #MTRCNT
00425A 4074 86 03     A        LDAA    #MTRSTR
00426A 4076 97 48     A        STAA    EVNTNM
00427A 4078 86 40     A        LDAA    #MTRBIT
00428A 407A C6 19     A        LDAB    #MTRMAX
00429A 407C 20 27 40A5         BRA     DBNCEX
00430
00431A 407E CE 0040   A TSTREV LDX     #REVCNT
00432A 4081 86 04     A        LDAA    #REVRSE
00433A 4083 97 48     A        STAA    EVNTNM
00434A 4085 86 20     A        LDAA    #REVBIT
00435A 4087 C6 19     A        LDAB    #REVMAX
00436A 4089 20 1A 40A5         BRA     DBNCEX
00437
00438A 408B CE 0042   A TSTRV  LDX     #RVCNT
00439A 408E 86 0A     A        LDAA    #RNGING
00440A 4090 97 48     A        STAA    EVNTNM
00441A 4092 86 01     A        LDAA    #RVBIT
00442A 4094 C6 96     A        LDAB    #RVMAX
00443A 4096 20 0D 40A5         BRA     DBNCEX
00444
00445A 4098 CE 003E   A PLEAD  LDX     #PCNT
00446A 409B 86 0B     A        LDAA    #PTRUE
00447A 409D 97 48     A        STAA    EVNTNM
00448A 409F 86 80     A        LDAA    #PBIT
00449A 40A1 C6 0F     A        LDAB    #PMAX
00450A 40A3 20 00 40A5         BRA     DBNCEX
00451                     *
00452                     *
00453                     *   FUNCTION TO DEBOUNCE REV,RV,METER
00454                     *   --------
00455                     *
00456                     *         X   = COUNT
00457                     *         X+1 = FLAG
00458                     *         A   = BIT #          ASSUME STATUS BIT LOW TRUE
00459                     *         B   = MAXCNT
00460                     *      EVNTNM = EVENT #
00461                     *
00462                     *
00463A 40A5 95 4E      A DBNCEX BITA    LNSTAT   CHEC  SENSE
00464A 40A7 26 19 40C2          BNE     DBNCIO   BIT=FALSE
00465A 40A9 E1 00      A        CMPB    X
00466A 40AB 23 1F 40CC          BLS     DBNCND   STABLE
00467A 40AD 6C 00      A        INC     X
00468A 40AF E1 00      A        CMPB    X
00469A 40B1 26 19 40CC          BNE     DBNCND   NOT STABLE YET
00470A 40B3 A6 01      A        LDAA    1,X
00471A 40B5 26 15 40CC          BNE     DBNCND
00472A 40B7 86 01      A        LDAA    #1       SET TRUE
00473A 40B9 A7 01      A        STAA    1,X      FLAG
00474A 40BB 96 48      A        LDAA    EVNTNM
00475A 40BD BD 43DF    A        JSR     EVENT
00476A 40C0 0D                  SEC
00477A 40C1 39                  RTS
00478
00479A 40C2 6D 00      A DBNCIO TST     X
00480A 40C4 27 06 40CC          BEQ     DBNCND
00481A 40C6 6A 00      A        DEC     X
00482A 40C8 26 02 40CC          BNE     DBNCND
00483A 40CA 6F 01      A        CLR     1,X
00484
00485A 40CC 0C           DBNCND CLC
00486A 40CD 39                  RTS
00488                     *
00489                     *  IRQ VECTORS HERE
00490                     *
00491A 40CE B6 2000    A IRQ    LDAA    REG0
00492A 40D1 97 4B      A        STAA    REG0SV
00493
00494A 40D3 B6 2200    A        LDAA    REG2
00495A 40D6 97 4D      A        STAA    REG2SV
00496
00497A 40D8 B6 2300    A        LDAA    REG3
```

```
00498A 40DB 97 4E     A              STAA   REG3SV
00499
00500A 40DD 86 2100   A              LDAA   REG1
00501A 40E0 97 4C     A              STAA   REG1SV
00502
00503A 40E2 85 40     A              BITA   #$40         10 MS ?
00504A 40E4 27 15 40FB               BEQ    IRQ00        NO
00505
00506A 40E6 96 34     A              LDAA   PRWAIT
00507A 40E8 27 03 40ED                BEQ    INCSEC
00508
00509A 40EA 7A 0034   A              DEC    PRWAIT
00510
00511A 40ED 96 87     A  INCSEC LDAA  RTCSEC
00512A 40EF 8B 01     A              ADDA   #1
00513A 40F1 19                       DAA
00514A 40F2 97 87     A              STAA   RTCSEC
00515A 40F4 24 05 40FB               BCC    IRQ00
00516
00517A 40F6 86 02     A              LDAA   #RTC
00518A 40F8 BD 43DF   A              JSR    EVENT
00520
00521
00522                       *
00523                       * PRINTER
00524                 `     *
00525
00526          40FB   A  IRQ00 EQU    *
00527A 40FB D6 34     A  IRQ01 LDAB   PRWAIT       BUSY ?
00528A 40FD 26 57 4156               BNE    IRQ02        YES
00529
00530
00531                       *
00532                       * CHECK FOR MANUAL PA
00533                       *
00534
00535A 40FF D6 2A     A              LDAB   PAFLAG       MANUAL ?
00536A 4101 27 2C 412F               BEQ    IRQ11        NO
00537
00538A 4103 C1 FF     A              CMPB   #$FF         PA PART ?
00539A 4105 26 08 410F               BNE    IRQ12        NO..PT
00540
00541A 4107 C6 01     A  IRQ23 LDAB   #1           SET PT FLAG
00542A 4109 D7 2A     A              STAB   PAFLAG
00543
00544A 410B C6 20     A              LDAB   #$20         PA CMD
00545A 410D 20 1A 4129               BRA    IRQ13
00546
00547A 410F C1 01     A  IRQ12 CMPB   #1           PT ?
00548A 4111 27 11 4124               BEQ    IRQ20        YES
00549
00550A 4113 D6 85     A              LDAB   KBDSTR       STROBE?
00551A 4115 26 05 411C               BNE    IRQ21        YES
00552
00553A 4117 7F 002A   A  IRQ22 CLR    PAFLAG
00554A 411A 20 13 412F               BRA    IRQ11
00555
00556A 411C D6 82     A  IRQ21 LDAB   KBDATA
00557A 411E C1 11     A              CMPB   #$11         PA=1 ?
00558A 4120 27 E5 4107               BEQ    IRQ23        YES
00559
00560A 4122 20 F3 4117               BRA    IRQ22        NO
00561
00562A 4124 7C 002A   A  IRQ20 INC    PAFLAG       =2
00563A 4127 C6 80     A              LDAB   #$80         PT CMD
00564
00565A 4129 86 28     A  IRQ13 LDAA   #40
00566A 412B 97 34     A              STAA   PRWAIT
00567
00568A 412D 20 24 4153               BRA    PRNFNO
00569
00570                       *
00571                       * NOT MANUAL PA
00572                       *
00573
00574A 412F 96 4C     A  IRQ11 LDAA   REG1SV
00575A 4131 2A 23 4156               BPL    IRQ02        PRINTER NOT READY
00576
00577
```

```
00578                    *
00579                    * PRINTER READY ... CHECK COMMANDS
00580                    *
00581
00582A 4133 DE 37    A IRQ14  LDX    PRNCNT
00583A 4135 27 1F 4156        BEQ    IRQ02      NO OUTPUT
00584
00585A 4137 09              DEX
00586A 4138 DF 37    A       STX    PRNCNT
00587
00588A 413A DE 67    A       LDX    PROTPT
00589A 413C E6 00    A       LDAB   X
00590A 413E C5 80    A       BITB   #$80       PT/PA/RR ?
00591A 4140 27 06 4148       BEQ    PRNTER     NO
00592
00593                    *
00594                    * PAPER TAKE UP UNIT
00595                    *
00596
00597A 4142 86 28    A PRNOT1 LDAA   #40
00598A 4144 97 34    A        STAA   PRWAIT
00599A 4146 20 00 4148        BRA    PRNTER
00600
00601
00602A 4148 08            PRNTER INX
00603A 4149 8C 0400  A       CPX    #PRBEND
00604A 414C 26 03 4151       BNE    PRNFIN
00605A 414E CE 01BC  A       LDX    #PRNBUF
00606
00607A 4151 DF 67    A PRNFIN STX   PROTPT
00608A 4153 F7 2100  A PRNFNO STAB  REG1
00610                    *
00611                    * KEYBOARD (KBD) :
00612                    *   KBDFLG -> 0 = BUFFER EMPTY
00613                    *   KBDSTR -> 0 = NO DEBOUNCED STROBE
00614                    *
00615
00616             4156 A IRQ02  EQU    *
00617
00618A 4156 B6 2200 A        LDAA   REG2
00619A 4159 27 42 419D       BEQ    KBDEND     NO DATA
00620
00621A 415B 91 83   A        CMPA   KBDCMP     STILL SAME ?
00622A 415D 27 08 4167       BEQ    KBD00      YES
00623
00624A 415F 97 83   A        STAA   KBDCMP     NEW DATA
00625A 4161 86 19   A        LDAA   #25        DEBOUNCE TIME (50 MS)
00626A 4163 D7 86   A        STAB   KBDTIM
00627A 4165 20 36 419D       BRA    KBDEND
00628
00629A 4167 D6 85   A KBD00   LDAB  KBDSTR     SAME STROBE ?
00630A 4169 26 35 41A0       BNE    IRQ03
00631
00632A 416B D6 86   A        LDAB   KBDTIM     DEBOUNCED ?
00633A 416D 27 05 4174       BEQ    KBD02      YES
00634A 416F 5A             DECB              NOT YET
00635A 4170 D7 86   A        STAB   KBDTIM
00636A 4172 20 29 419D       BRA    KBDEND
00637
00638A 4174 97 82   A KBD02   STAA  KBDATA     BUFFER DATA
00639A 4176 2A 09 4181       BPL    KBD03
00640
00641A 4178 16             TAB
00642A 4179 C4 F0   A        ANDB   #$F0
00643A 417B C1 80   A        CMPB   #$80       HI ?
00644A 417D 26 1E 419D       BNE    KBDEND     NO..ILLEGAL
00645
00646A 417F 8A F0   A        ORAA   #$F0
00647
00648A 4181 81 11   A KBD03   CMPA  #$11
00649A 4183 26 0E 4193       BNE    KBD04
00650
00651A 4185 D6 28   A        LDAB   PRGFLG
00652A 4187 26 0A 4193       BNE    KBD04
00653
00654A 4189 D6 2A   A        LDAB   PAFLAG
00655A 418B 26 0B 4198       BNE    KBD05
00656
```

```
00657A 418D C6 FF      A          LDAB    #$FF
00658A 418F D7 2A      A          STAB    PAFLAG
00659A 4191 20 05 4198            BRA     KBD05
00660
00661A 4193 8A 80      A KBD04    ORAA    #$80
00662A 4195 BD 43DF    A          JSR     EVENT
00663
00664A 4198 73 0085    A KBD05    COM     KBDSTR   SET STROBE FLAG
00665A 419B 20 03 41A0            BRA     IRQ03
00666
00667A 419D 7F 0085    A KBDEND   CLR     KBDSTR   NOT DATA
00669
00670                           *
00671                           *   WHILE PRGFLG = 0
00672                           *      CASE DIGCNT OF
00673                           *         0 : CLK
00674                           *        >0 : DSPBUF
00675                           *
00676                           *   IF PRGFLG = 3 THEN CLK ELSE KBD
00677                           *
00678A 41A0 96 28      A IRQ03    LDAA    PRGFLG
00679A 41A2 27 18 41BC            BEQ     DISP10
00680
00681A 41A4 81 03      A          CMPA    #3
00682A 41A6 26 18 41C0            BNE     DISP20
00683
00684                           *
00685                           * DISPLAY CLOCK
00686                           *
00687A 41A8 DE 62      A DSPCLK   LDX     CLKPNT
00688A 41AA A6 00      A          LDAA    X
00689A 41AC B7 2200    A          STAA    REG2
00690A 41AF 08                    INX
00691A 41B0 8C 00A1    A          CPX     #CLKEND
00692A 41B3 26 03 41B8            BNE     DSCLKO
00693A 41B5 CE 0098    A          LDX     #DSPWW
00694A 41B8 DF 62      A DSCLKO   STX     CLKPNT
00695A 41BA 20 25 41E1            BRA     DISP04
00696
00697                           *
00698                           * NOT PROG MODE
00699                           *
00700A 41BC 96 30      A DISP10   LDAA    DIGCNT
00701A 41BE 27 E8 41A8            BEQ     DSPCLK   NO DIALLED DIGITS
00702
00703                           *
00704                           * DISPLAY KBD/DSP
00705                           *
00706A 41C0 DE 64      A DISP20   LDX     DISPNT
00707A 41C2 D6 66      A          LDAB    DISPAD
00708A 41C4 26 0C 41D2            BNE     DISP00
00709
00710A 41C6 96 28      A          LDAA    PRGFLG
00711A 41C8 27 05 41CF            BEQ     DISP21
00712
00713A 41CA CE 00A1    A          LDX     #KBDBUF
00714A 41CD 20 03 41D2            BRA     DISP00
00715
00716A 41CF CE 00B0    A DISP21   LDX     #DSPBUF
00717
00718A 41D2 A6 00      A DISP00   LDAA    X
00719A 41D4 84 0F      A          ANDA    #$F
00720A 41D6 1B                    ABA
00721A 41D7 B7 2200    A          STAA    REG2
00722
00723A 41DA CB 10      A          ADDB    #$10
00724A 41DC D7 66      A          STAB    DISPAD
00725A 41DE 08                    INX
00726A 41DF DF 64      A          STX     DISPNT
00727
00728A 41E1 96 4F      A DISP04   LDAA    ONHOOK
00729A 41E3 B7 2300    A          STAA    REG3
00730
```

```
00732              *
00733              *
00734              *    STATE HANDLER:
00735              *       CALL PROCEDURE (METER)
00736              *
00737              *    IF 3-WIRE CALL PLEAD
00738              *
00739              *
00740A 41E6 BD 4071  A  IHQSTA JSR   METER
00741A 41E9 96 4C    A         LDAA  REGISV
00742A 41EB 85 20    A         BITA  #BIT2W
00743A 41ED 27 03 41F2         BEQ   STAJMP
00744A 41EF BD 4098  A         JSR   PLEAD
00745
00746A 41F2 DE 49    A  STAJMP LDX   NXSTAT
00747A 41F4 6E 00    A         JMP   X
00748
00750              *
00751              * STATE = GROUND START .... WAIT 100 MS AFTER P
00752              *
00753A 41F6 7A 007E  A  GNDSTR DEC   GNDTIM
00754A 41F9 26 0D 4208        BNE   GNSTND
00755
00756A 41FB CE 4209  A         LDX   #GNDLV
00757A 41FE DF 49    A         STX   NXSTAT    =LV DEBOUNCE
00758
00759A 4200 86 32    A         LDAA  #GNDORG
00760A 4202 97 7B    A         STAA  MAKTIM
00761
00762A 4204 86 0A    A  TRMGND LDAA  #GNDTRM
00763A 4206 97 75    A         STAA  BRKCNT
00764
00765A 4208 3B          GNSTND RTI
00766
00767              *
00768              * STATE = DEBOUNCE LV TO DETERMINE DIRECTION
00769              *          OF CALL
00770              *
00771A 4209 8D 7C 4287 GNDLV  BSR   TESTLV    LV ?
00772A 420B 25 07 4214        BCS   GNDLVO    YES
00773
00774A 420D 7A 007B  A        DEC   MAKTIM    NO LV ... ORG ?
00775A 4210 27 71 4283        BEQ   PLDORG    YES
00776A 4212 20 F0 4204        BRA   TRMGND    NO..RESET LV COUNT
00777
00778A 4214 7A 0075  A GNDLVO DEC   BRKCNT    TERM ?
00779A 4217 26 02 421B        BNE   GNDLV1    NO
00780
00781A 4219 27 55 4270        BEQ   PTRMLD
00782                      '
00783A 421B 86 32    A GNDLV1 LDAA  #GNDORG   NO...RESET NO LV COUNT
00784A 421D 97 7B    A        STAA  MAKTIM
00785
00786A 421F 3B              RTI
00787
00788              * STATE = IDLE
00789              *
00790
00791A 4220 96 4C    A IDLE   LDAA  REGISV
00792A 4222 85 20    A        BITA  #BIT2W
00793A 4224 26 2C 4252       BNE   IDLE3W
00794
00795              *
00796              * STATE = IDLE (2-WIRE)
00797              *
00798A 4226 BD 408B  A IDLE2W JSR   TSTRV     RINGING IRST?
00799              *
00800              * STATE = IDLE (2-WIRE)
00801              *    OR
00802              *        = ONHOOK (3-WIRE)...TERM CALL
00803              *
00804              *
00805A 4229 96 4C    A BUSYON LDAA  REGISV
00806A 422B 85 20    A        BITA  #BIT2W
00807A 422D 27 04 4233       BEQ   BSYON1    2-WIRE
00808
00809A 422F 96 3F    A        LDAA  PFLAG
00810A 4231 27 6C 429F        BEQ   BSYEND
00811
```

```
00812A 4233 8D 52 4287 BSYONI  BSR    TESTLV    LV ?
00813A 4235 24 04 423B         BCC    BSYONO    NO
00814
00815A 4237 7F 007B   A         CLR    MAKTIM
00816A 423A 3B                  RTI
00817
00818A 423B 7C 007B   A BSYONO INC    MAKTIM
00819A 423E 96 7B     A         LDAA   MAKTIM
00820A 4240 81 31     A         CMPA   #OFHKTM-1
00821A 4242 23 0D 4251          BLS    BSYOND
00822A 4244 86 08     A         LDAA   #OFHOOK
00823
00824A 4246 BD 43DF   A NXTOFF JSR    EVENT
00825A 4249 CE 4295   A         LDX    #BSYOFF
00826
00827A 424C DF 49     A BSYNXT STX    NXSTAT
00828
00829A 424E BD 43C9   A         JSR    RSTBRK
00830
00831A 4251 3B          BSYOND RTI
00832                          *
00833                          *   STATE = IDLE (3-WIRE)
00834                          *
00835A 4252 96 3F     A IDLE3W LDAA   PFLAG
00836A 4254 27 FB 4251         BEQ    BSYOND    STILL IDLE
00837
00838A 4256 86 32     A         LDAA   #GNDWAT
00839A 4258 97 7E     A         STAA   GNDTIM
00840
00841A 425A 7F 007B   A         CLR    MAKTIM
00842A 425D CE 4262   A         LDX    #TSTORG
00843A 4260 20 EA 424C          BRA    BSYNXT
00845
00846                          *
00847                          *   STATE FOR 3-WIRE ONLY:
00848                          *   - PLEAD IS BUSY
00849                          *   - IF ANY LV DURING FIRST 100 MS
00850                          *     THEN ASSUME TERM!
00851                          *
00852                          *
00853A 4262 96 3F     A TSTORG LDAA   PFLAG
00854A 4264 27 39 429F          BEQ    BSYEND
00855
00856A 4266 96 CE     A         LDAA   GNDFLG
00857A 4268 26 8C 41F6          BNE    GNDSTR    GROUND START
00858
00859A 426A 96 4E     A         LDAA   LNSTAT
00860A 426C 85 02     A         BITA   #LVBIT    LV?
00861A 426E 26 0A 427A          BNE    TSORGO    NO...STILL ORG
00862A 4270 86 07     A PTRMLD LDAA   #PTERM    GOT LV...TERM
00863A 4272 BD 43DF   A         JSR    EVENT
00864A 4275 CE 4229   A         LDX    #BUSYON
00865A 4278 20 D2 424C          BRA    BSYNXT
00866
00867A 427A 7C 007B   A TSORGO INC    MAKTIM
00868A 427D 96 7B     A         LDAA   MAKTIM
00869A 427F 81 31     A         CMPA   #ORGTIM-1
00870A 4281 23 CE 4251          BLS    BSYOND
00871A 4283 86 06     A PLDORG LDAA   #PORG
00872A 4285 20 BF 4246          BRA    NXTOFF
00873
00874                          *
00875                          *   FUNCTION TO CHECK LV STATE
00876                          *
00877A 4287 96 4E     A TESTLV LDAA   LNSTAT
00878A 4289 85 02     A         BITA   #LVBIT    LV ?
00879A 428B 27 06 4293          BEQ    SETLV     YES
00880
00881A 428D 85 18     A         BITA   #RBIT+TBIT BOTH AT BATT ?
00882A 428F 27 02 4293          BEQ    SETLV     YES
00883A 4291 0C                  CLC
00884A 4292 39                  RTS
00885
00886A 4293 0D          SETLV  SEC
00887A 4294 39                  RTS
```

```
00889                      *
00890                      *   STATE = OFF-HOOK
00891                      *
00892                      *   - IF 3-WIRE, CHECK P
00893                      *   - CHECK DIALLING
00894                      *   - FLASH-HOOK (3-WIRE)
00895                      *   - ON-HOOK (2-WIRE)
00896                      *
00897A 4295 96 4C    A BSYOFF LDAA    REG1SV
00898A 4297 85 20    A        BITA    #BIT2W
00899A 4299 27 0F 42AA        BEQ     DIAL       2-WIRE
00900A 429B 96 3F    A        LDAA    PFLAG
00901A 429D 26 0B 42AA        BNE     DIAL
00902                      *
00903                      *   3-WIRE CLEAR DOWN (NO P-LEAD)
00904                      *
00905A 429F 86 01    A BSYEND LDAA    #PFALSE
00906A 42A1 BD 43DF  A        JSR     EVENT
00907A 42A4 CE 4220  A        LDX     #IDLE
00908A 42A7 DF 49    A        STX     NXSTAT
00909A 42A9 3B                RTI
00911                      *
00912                      *   CHECK DIALLING
00913                      *
00914A 42AA BD 407E  A DIAL   JSR     TSTREV
00915A 42AD 96 7A    A        LDAA    MAKEX
00916A 42AF 27 03 42B4        BEQ     DIAL00
00917A 42B1 7A 007A  A        DEC     MAKEX
00918
00919A 42B4 8D D1 4287 DIAL00 BSR    TESTLV
00920A 42B6 24 04 42BC        BCC     DIAL10     NO LV
00921
00922A 42B8 BD 42DA  A        JSR     BREAK      YES
00923A 42BB 3B                RTI
00924
00925A 42BC D6 7A    A DIAL10 LDAB    MAKEX
00926A 42BE 26 03 42C3        BNE     TSMFRX
00927A 42C0 BD 4376  A        JSR     MAKE
00928
00929A 42C3 96 4B    A TSMFRX LDAA    MFRXSV
00930A 42C5 2A 0F 42D6        BPL     MFRX00     NO STROBE
00931A 42C7 D6 27    A        LDAB    MF4FLG     SEEN?
00932A 42C9 26 0E 42D9        BNE     MFRXND     YES
00933A 42CB 97 27    A        STAA    MF4FLG
00934A 42CD 43                COMA
00935A 42CE 84 0F    A        ANDA    #$F
00936A 42D0 8B 20    A        ADDA    #MFDIGT
00937A 42D2 BD 43DF  A        JSR     EVENT
00938A 42D5 3B                RTI
00939
00940A 42D6 7F 0027  A MFRX00 CLR     MF4FLG
00941A 42D9 3B        MFRXND  RTI
00943                      *
00944                      *   PROCEDURE BREAK;
00945                      *
00946                      *   IF NOT BREAK DURING MAKE THEN DO ;
00947                      *
00948                      *
00949                      *
00950                      *   BRKCNT:=BRKCNT+1  PROCEDURE NOT CALLED IF BRKCNT > BRKMAX
00951                      *
00952                      *   IF BRKFLG=0 THEN  NO BREAK YET
00953                      *     MAKCNT:=0
00954                      *     BEGIN
00955                      *     BRKCON:=BRKCON+1  CONTINUOUS BREAK COUNTER
00956                      *     IF BRKCNT=1 THEN  LEADING EDGE
00957                      *        MAKEX:=MKHLIM;  DO NOT CARE ABOUT MAKES
00958                      *     ELSE BEGIN  INTO BREAK
00959                      *        IF BRKCNT=SUMCNT OR BRKCON=CONCNT  =BREAK
00960                      *           THEN BRKFLG:=1;
00961                      *        END;
00962                      *     END;
00963                      *   ELSE BEGIN  BREAK DETECTED ALREADY
00964                      *        IF BRKCNT=BRKMAX THEN  MAXIMUM BREAK
00965                      *           BEGIN
00966                      *           BRKFLG:=0;
00967                      *           CASE LVCOIN OF
00968                      *             0:NXSTAT (FLASH);  FLASH-LOOK
00969                      *             1:NXSTAT (COINPL); COIN PULSE
00970                      *           END;
00971                      *        END;
00972                      *   END;
```

```
00973
00974A 42DA 96 74    A BREAK  LDAA   BREAKX   BREAK DURING MAKE ?
00975A 42DC 27 0B 42E9         BEQ    BREAK0   NO
00976
00977A 42DE 7C 007B  A         INC    MAKTIM
00978
00979A 42E1 7A 0074  A         DEC    BREAKX   TOO LONG ?
00980A 42E4 26 29 430F         BNE    BRAK02   NOT YET
00981
00982A 42E6 7F 007B  A         CLR    MAKTIM
00983
00984A 42E9 7C 0075  A BREAK0  INC    BRKCNT
00985A 42EC D6 75    A         LDAB   BRKCNT
00986A 42EE 96 76    A         LDAA   BRKFLG   "BRKFLG?"
00987A 42F0 26 1E 4310         BNE    BRAK10
00988A 42F2 7F 007B  A         CLR    MAKTIM   "THEN"
00989A 42F5 7C 0077  A         INC    BRKCON
00990A 42F8 C1 01    A         CMPB   #1       LEADING EDGE?
00991A 42FA 26 05 4301         BNE    BRAK00   NO
00992A 42FC C6 14    A         LDAB   #MKHLTM  DO NOT CARE IF MAKES
00993A 42FE D7 7A    A         STAB   MAKEX    DURING BREAK
00994A 4300 39                 RTS
00995A 4301 C1 0A    A BRAK00  CMPB   #SUMCNT  INTEGRATOR COUNT
00996A 4303 27 06 430B         BEQ    BRAK01   GOT BREAK
00997A 4305 96 77    A         LDAA   BRKCON
00998A 4307 81 04    A         CMPA   #CONCNT-1 CONTINUOUS COUNT
00999A 4309 23 04 430F         BLS    BRAK02
01000A 430B 86 FF    A BRAK01  LDAA   #$FF
01001A 430D 97 76    A         STAA   BRKFLG
01002A 430F 39         BRAK02  RTS
01003
01004                 *
01005                 * BRKFLG ALREADY SET
01006                 *
01007A 4310 C1 2C    A BRAK10  CMPB   #MNCOIN-1
01008A 4312 23 2D 4341         BLS    BRAK11
01009
01010A 4314 96 4E    A         LDAA   LNSTAT
01011A 4316 85 04    A         BITA   #LVCOIN
01012A 4318 27 06 4320         BEQ    BRAK20   NOT COIN PULSE
01013
01014A 431A 86 01    A         LDAA   #1
01015A 431C 97 76    A         STAA   BRKFLG   FLAG COIN PULSE
01016A 431E 20 21 4341         BRA    BRAK11
01017
01018A 4320 96 76    A BRAK20  LDAA   BRKFLG
01019A 4322 2C 1D 4341         BGE    BRAK11
01020
01021
01022A 4324 C1 36    A BRAK30  CMPB   #BRKMAX-1 "ELSE"
01023A 4326 23 E7 430F         BLS    BRAK02   STILL BREAK
01024A 4328 7F 0076  A         CLR    BRKFLG   TOO LONG
01025
01026A 432B 96 4C    A         LDAA   REGISV
01027A 432D 85 20    A         BITA   #BIT2W
01028A 432F 27 11 4342         BEQ    BRAK40
01029
01030A 4331 86 0F    A         LDAA   #LVMAX
01031A 4333 97 78    A         STAA   LVCNTR
01032A 4335 97 79    A         STAA   LVSTAT
01033
01034A 4337 86 05    A         LDAA   #FLSHST  START OF FLASH
01035
01036A 4339 CE 43D5  A         LDX    #I.FLSH
01037A 433C DF 49    A BRAK13  STX    NXSTAT
01038
01039A 433E BD 43DF  A         JSR    EVENT
01040A 4341 39         BRAK11  RTS
01041
01042                 *
01043                 * 2-WIRE LONG BREAK
01044                 *
01045A 4342 96 CF    A BRAK40  LDAA   PARAM1
01046A 4344 26 02 4348         BNE    BRAK41
01047
01048A 4346 86 30    A         LDAA   #$30     DEFAULT=300 MS
01049
01050A 4348 97 7D    A BRAK41  STAA   ON2WTM
01051A 434A CE 4353  A         LDX    #TESTON
```

```
01052A 434D DF 49      A          STX       NXSTAT
01053A 434F BD 43C9    A          JSR       RSTBRK
01054A 4352 39                    RTS
01056                             *
01057                             * STATE = 2-WIRE ONHOOK DEBOUNCE
01058                             *
01059A 4353 BD 4287    A TESTON   JSR       TESTLV     LV ?
01060A 4356 25 06 435E            BCS       TSTONO     YES
01061
01062A 4358 CE 4295    A          LDX       #BSYOFF
01063A 435B DF 49      A          STX       NXSTAT
01064A 435D 3B                    RTI
01065
01066A 435E 96 4C      A TSTONO   LDAA      REGISV
01067A 4360 85 40      A          BITA      #$40       10 MS ?
01068A 4362 27 09 436D            BEQ       TSTON1     NO
01069
01070A 4364 96 7D      A          LDAA      ON2WTM
01071A 4366 8B 99      A          ADDA      #$99       (-1)
01072A 4368 19                    DAA
01073A 4369 97 7D      A          STAA      ON2WTM
01074A 436B 27 01 436E            BEQ       TSTON2
01075
01076A 436D 3B           TSTON1   RTI
01077
01078                             *
01079                             * GOT ONHOOK
01080                             *
01081A 436E CE 4220    A TSTON2   LDX       #IDLE
01082A 4371 86 09      A          LDAA      #ONHK2W
01083A 4373 8D C7 433C            BSR       BRAK13
01084A 4375 3B                    RTI
01086
01087                             * PROCEDURE MAKE:
01088                             *
01089                             * IF MAKTIM < MAKMAX THEN    NOT INTERDIGIT
01090                             *   BEGIN
01091                             *   MAKTIM:=MAKTIM+1;
01092                             *   CASE MAKTIM OF
01093                             *   1: BREAKX:=BRHLTM
01094                             *   MAKMIN: BEGIN
01095                             *              IF BRKFLG THEN
01096                             *                 BEGIN
01097                             *                 PULCNT:=PULCNT+1;
01098                             *                 BRKFLG:=0
01099                             *                 END;
01100                             *           END;
01101                             *   MAKMAX: BEGIN
01102                             *              SAVDIG (PULCNT);
01103                             *              BRKFLG:=0;
01104                             *           END;
01105                             * END;
01106                             *
01107
01108A 4376 7F 0077    A MAKE     CLR       BRKCON
01109A 4379 D6 7A      A          LDAB      MAKEX      MAKE DURING BREAK ?
01110A 437B 27 05 4382            BEQ       MAKEO      NO
01111
01112A 437D 7A 007A    A          DEC       MAKEX
01113A 4380 26 06 4388            BNE       MAKEO3
01114
01115A 4382 D6 7B      A MAKEO    LDAB      MAKTIM
01116A 4384 C1 95      A          CMPB      #MAKMAX-1
01117A 4386 23 01 4389            BLS       MAKEOO
01118A 4388 39           MAKEO3   RTS
01119A 4389 5C           MAKEOO   INCB
01120A 438A D7 7B      A          STAB      MAKTIM
01121A 438C C1 01      A          CMPB      #1         LEADING EDGE ?
01122A 438E 27 34 43C4            BEQ       MAKE20     YES
01123
01124A 4390 C1 07      A          CMPB      #MAKMIN-1
01125A 4392 26 0D 43A1            BNE       MAKE10
01126
01127A 4394 96 76      A          LDAA      BRKFLG     BREAK SEEN ?
01128A 4396 2C 03 439B            BGE       MAKE04     NO
01129
01130A 4398 7C 007C    A          INC       PULCNT     YES
01131
01132A 439B 8D 2C 43C9 MAKE04    BSR       RSTBRK
```

```
01133
01134A 439D 7F 0076  A  MAKE02 CLR    BRKFLG
01135A 43A0 39           MAKE01 RTS
01136A 43A1 C1 95     A  MAKE10 CMPB   #MAKMAX-1
01137A 43A3 26 FB 43A0          BNE    MAKE01
01138A 43A5 96 7C     A         LDAA   PULCNT
01139A 43A7 27 F4 439D          BEQ    MAKE02
01140A 43A9 81 09     A         CMPA   #9
01141A 43AB 23 0D 43BA          BLS    MAKE11
01142
01143A 43AD 81 0A     A         CMPA   #10
01144A 43AF 22 03 43L           BHI    MAKE30
01145
01146A 43B1 4F                  CLRA
01147A 43B2 20 06 43BA          BRA    MAKE11
01148
01149A 43B4 81 0F     A  MAKE30 CMPA   #15
01150A 43B6 23 02 43BA          BLS    MAKE11
01151
01152A 43B8 86 0A     A         LDAA   #10       ="X"
01153
01154A 43BA 8B 10     A  MAKE11 ADDA   #DPDIGT
01155A 43BC BD 43DF   A         JSR    EVENT
01156A 43BF 7F 007C   A         CLR    PULCNT
01157A 43C2 20 D9 439D          BRA    MAKE02
01158
01159
01160A 43C4 86 03     A  MAKE20 LDAA   #BRHLTM
01161A 43C6 97 74     A         STAA   BREAKX
01162A 43C8 39                  RTS
01163
01164                    *
01165                    * RESET BREAK COUNTERS
01166                    *
01167A 43C9 4F           RSTBRK CLRA
01168A 43CA 97 75     A         STAA   BRKCNT
01169A 43CC 97 77     A         STAA   BRKCON
01170A 43CE 97 7A     A         STAA   MAKEX
01171A 43D0 97 76     A         STAA   BRKFLG
01172A 43D2 97 74     A         STAA   BREAKX
01173A 43D4 39                  RTS
01175
01176                    * STATE = FLASH
01177                    *
01178                    * WAIT FOR NO P-LEAD OR NO LV
01179                    *
01180A 43D5 96 3F     A  I.FLSH LDAA   PFLAG
01181A 43D7 26 03 43DC          BNE    I.FL00
01182A 43D9 7E 429F   A         JMP    BSYEND    P GONE
01183
01184A 43DC 7E 4229   A  I.FL00 JMP    BUSYON
01186                    *
01187                    * SAVE EVENT ... NO CHECK FOR OVERFLOW
01188                    *
01189A 43DF DE 60     A  EVENT  LDX    EVNTIN
01190A 43E1 A7 00     A         STAA   X
01191A 43E3 08                  INX
01192A 43E4 8C 018C   A         CPX    #EVNBFN
01193A 43E7 26 03 43EC          BNE    EVENTN
01194
01195A 43E9 CE 0128   A         LDX    #EVNBUF
01196
01197A 43EC DF 60     A  EVENTN STX    EVNTIN
01198A 43EE 7C 0033   A         INC    EVNCNT
01199A 43F1 39                  RTS
01201                    *
01202                    * EVENT PROCESSOR
01203                    *
01204A 43F2 96 2C     A  E.PROC LDAA   TSTFLG
01205A 43F4 27 0A 4400          BEQ    E.PR10
01206
01207A 43F6 96 22     A         LDAA   BUSY
01208A 43F8 26 06 4400          BNE    E.PR10
01209
01210A 43FA BD 4A1D   A         JSR    PRTST
01211A 43FD 7F 002C   A         CLR    TSTFLG
01212
01213A 4400 96 33     A  E.PR10 LDAA   EVNCNT
01214A 4402 27 EE 43F2          BEQ    E.PROC
```

```
01215
01216A 4404 0F            E.PR00  SEI
01217A 4405 7A 0033   A           DEC     EVCNT
01218A 4408 0E                    CLI
01219A 4409 DE 56     A           LDX     NXTEVN
01220A 440B 8C 018C   A           CPX     #ENBFN
01221A 440E 26 03 4413            BNE     E.PR01
01222A 4410 CE 0128   A           LDX     #ENBUF
01223
01224A 4413 E6 00     A  E.PR01   LDAB    X
01225A 4415 08                    INX
01226A 4416 DF 56     A           STX     NXTEVN
01227
01228A 4418 D7 47     A           STAB    EV.SAV
01229A 441A C1 0B     A           CMPB    #MAXEVN
01230A 441C 22 24 4442            BHI     E.DIGT
01231A 441E 5A                    DECB
01232A 441F 58                    ASLB
01233
01234A 4420 CE 442C   A           LDX     #E.TAB
01235A 4423 BD 49F3   A           JSR     ADDBX
01236A 4426 EE 00     A           LDX     X
01237A 4428 AD 00     A           JSR     X
01238A 442A 20 C6 43F2            BRA     E.PROC
01239
01240                    *
01241                    * SUBROUTINE JUMP TABLE
01242                    *
01243A 442C     4531  A  E.TAB    FDB     E.CLR   /PFALSE/
01244A 442E     46EF  A           FDB     E.RTC   /RTC/
01245A 4430     456A  A           FDB     E.MTR   /MTRSTR/
01246A 4432     4462  A           FDB     E.REV   /REVRSE/
01247A 4434     4565  A           FDB     E.FLSH  /FLSHST/
01248A 4436     4482  A           FDB     E.PRG   /PROG/
01249A 4438     4479  A           FDB     E.PRM   /PTERM/
01250A 443A     4508  A           FDB     E.FHK   /OFHOK/
01251A 443C     4531  A           FDB     E.NHK   /ONHK2N/
01252A 443E     4451  A           FDB     E.RING  /RNGING/
01253A 4440     4450  A           FDB     E.TRU   /PTRUE/
01255                    *
01256                    * GOT DIGIT...DP/MF/KBD
01257                    *
01258A 4442 C5 80     A  E.DIGT   BITB    #KBDIGT
01259A 4444 27 05 444B           BEQ     E.DIG0
01260A 4446 BD 4822   A           JSR     E.KBDG
01261A 4449 20 A7 43F2            BRA     E.PROC
01262
01263A 444B BD 463B   A  E.DIG0   JSR     E.DPDG
01264A 444E 20 A2 43F2            BRA     E.PROC
01265
01266                    *
01267                    * EVENT = PTRUE
01268                    *
01269A 4450 39            E.PTRU  RTS                     NO ACTION
01271
01272                    *
01273                    *
01274                    *  EVENT = RINGING
01275                    *
01276                    *  IF RNGCNT<>0 THEN RNGCNT:=RNGTIM /*
01277                    *
01278                    *  ELSE BEGIN  /FIRST BURST/
01279                    *       PRINT (RING);
01280                    *       RNGCNT:=RNGTIM;
01281                    *       END;
01282                    *  END;
01283                    *
01284A 4451 96 2B     A  E.RING   LDAA    RNGFLG
01285A 4453 26 06 445B           BNE     E.RNG0
01286A 4455 CE 4B1C   A           LDX     #MSGRNG
01287A 4458 BD 45F6   A           JSR     STMSEC  STRING+TIME+SEC
01288
01289A 445B 86 05     A  E.RNG0   LDAA    #RNGTIM
01290A 445D 97 36     A           STAA    RVTIMR
01291A 445F 97 2B     A           STAA    RNGFLG
01292A 4461 39                    RTS
01294                    *
01295                    *
01296                    *
```

```
01297                      *    EVENT = REVRSE
01298                      *    PRINT "ANS" (CALLTM);
01299                      *    CALLTM:=0
01300                      *
01301                      * PROCEDURE PRNANS :
01302                      *   PROCEDURE CALLED ON FIRST METER PULSE
01303                      *   (AFTER 2 DIALLED DIGITS)
01304                      *
01305            4462    A PRNANS EQU    *
01306A 4462 96 21        A E.REV  LDAA   ANSFLG
01307A 4464 26 12 4478           BNE    E.REVN
01308
01309A 4466 CE 4AFC       A        LDX    #MSGANS
01310A 4469 DF 54         A        STX    STRPNT
01311A 446B BD 4609       A        JSR    PRNCAL    PRINT CALLTM
01312A 446E BD 44FE       A        JSR    CLRCAL    CLEAR CALLTM
01313A 4471 86 FF         A        LDAA   #$FF
01314A 4473 97 21         A        STAA   ANSFLG
01315
01316A 4475 7F 0024       A        CLR    FLAG
01317
01318A 4478 39              E.REVN RTS
01319                      *
01320                      *
01321                      *
01322                      *    EVENT = PTERM
01323                      *      PRINT (TRM,ST,TIME)
01324                      *      RIBBON:=RED
01325                      *
01326A 4479 86 10        A E.TRM  LDAA   #REDRIB
01327A 447B 97 29        A        STAA   RIBBON
01328A 447D CE 4824      A        LDX    #MSGTRM
01329A 4480 20 0C 448E            BRA    TRMORG
01330                      *
01331                      *
01332                      *    EVENT = PORG
01333                      *      PRINT (ORG,ST,TIME)
01334                      *      RIBBON:=BLACK
01335                      *
01336A 4482 7F 0029      A E.ORG  CLR    RIBBON
01337A 4485 CE 4818      A        LDX    #MSGORG
01338
01339A 4488 86 80        A        LDAA   #$80
01340A 448A 9A 4F        A        ORAA   ONHOOK
01341A 448C 97 4F        A        STAA   ONHOOK
01342
01343A 448E BD 4816      A TRMORG JSR    STRING
01344
01345A 4491 CE 4B3C      A STPRNT LDX    #MSGST
01346A 4494 BD 45F6      A        JSR    STMSEC
01347
01348                      *
01349                      *
01350                      *    INITIALIZE COUNTERS FOR THIS CALL:
01351                      *
01352                      *    1. CALLTM
01353                      *    2. TTLMTR
01354                      *    3. DIGCNT
01355                      *
01356                      *    SET BUSY
01357                      *
01358A 4497 BD 44FE      A STCLR  JSR    CLRCAL
01359A 449A BD 4503      A        JSR    CLRMTR
01360A 449D BD 46DD      A        JSR    CLRDSP
01361
01362A 44A0 4F                    CLRA
01363A 44A1 97 21        A        STAA   ANSFLG
01364A 44A3 97 30        A        STAA   DIGCNT
01365A 44A5 97 6F        A        STAA   CMPCNT
01366A 44A7 97 24        A        STAA   FLAG
01367A 44A9 97 6E        A        STAA   ALRMFG
01368A 44AB 97 25        A        STAA   FLASH
01369A 44AD 97 26        A        STAA   MCTFLG
01370A 44AF 97 35        A        STAA   DSPCNT
01371
01372A 44B1 43                    COMA
```

```
01373A 44B2 97 22     A           STAA    BUSY
01374
01375A 44B4 CE 00B0   A           LDX     #DSPBUF
01376A 44B7 DF 64     A           STX     DISPNT
01377A 44B9 DF 72     A           STX     CMPNTR
01378A 44BB 39                    RTS
01380                     *
01381                     *
01382                     * ROUTINES TO HANDLE CALLTM/ELPSAV
01383                     *
01384                     *
01385                     * CALLTM RMB 4    8 BCD DIGITS
01386                     * ELPSAV RMB 4    EACH
01387                     * CLOCK  RMB 4    RTC
01388                     * SAVTIM RMB 4    FOR FLASH-HOOK
01389                     *
01390                     * TO MOVE CALLTM TO ELPSAV & CLR CALLTM FOR FLASH-HOOK
01391                     *
01392                     *
01393A 44BC CE 0088   A  SAVCAL LDX  #CALLTM
01394A 44BF C6 04    A           LDAB    #4
01395
01396A 44C1 A6 00    A  SVCALP LDAA    X
01397A 44C3 6F 00    A           CLR     X
01398A 44C5 A7 04    A           STAA    4,X
01399A 44C7 A6 08    A           LDAA    8,X
01400A 44C9 A7 0C    A           STAA    12,X
01401A 44CB 08                   INX
01402A 44CC 5A                   DECB
01403A 44CD 26 F2 44C1           BNE     SVCALP
01404
01405A 44CF 96 31    A           LDAA    SECOND
01406A 44D1 97 32    A           STAA    SECSAV
01407
01408A 44D3 39                   RTS
01409                     * TO ADD CALLTM TO ELPSAV & STORE IN CALLTM
01410                     *
01411                     *
01412A 44D4 CE 008B  A  ADDTIM LDX  #CALLTM+3
01413A 44D7 C6 04    A           LDAB    #4
01414A 44D9 0C                   CLC
01415
01416A 44DA A6 00    A  ADTMLP LDAA    X
01417A 44DC A9 04    A           ADCA    4,X
01418A 44DE 19                   DAA
01419A 44DF A7 00    A           STAA    X
01420A 44E1 09                   DEX
01421A 44E2 5A                   DECB
01422A 44E3 26 F5 44DA           BNE     ADTMLP
01423A 44E5 39                   RTS
01424                     *
01425                     * TO CLEAR (X) 4 BYTES
01426                     *
01427A 44E6 86 04    A  CLEARX LDAA    #4
01428
01429A 44E8 6F 00    A  CLRXLP CLR     X
01430A 44EA 08                   INX
01431A 44EB 4A                   DECA
01432A 44EC 26 FA 44E8           BNE     CLRXLP
01433A 44EE 39                   RTS
01434                     *
01435                     * TO ADD 1 TO (X)...BCD...CARRY SET IF OVERFLOW
01436                     *
01437A 44EF C6 04    A  INCRMX LDAB    #4
01438A 44F1 0D                   SEC
01439
01440A 44F2 A6 00    A  INCXLP LDAA    X
01441A 44F4 89 00    A           ADCA    #0
01442A 44F6 19                   DAA
01443A 44F7 A7 00    A           STAA    X
01444A 44F9 09                   DEX
01445A 44FA 5A                   DECB
01446A 44FB 26 F5 44F2           BNE     INCXLP
01447A 44FD 39                   RTS
01448
01449                     *
01450                     * CLR CALLTM
01451                     *
```

```
01452A 44FE CE 0088  A CLRCAL LDX      #CALLTM
01453A 4501 20 E3 44E6        BRA      CLEARX
01454
01455                       *
01456                       * CLEAR METER COUNT
01457                       *
01458A 4503 CE 0039  A CLRMTR LDX      #TTLMTR
01459A 4506 20 DE 44E6        BRA      CLEARX
01461                       *
01462                       *
01463                       *  EVENT = OFFHOOK;  /2 OR 3 WIRE/
01464                       *
01465                       *  IF 2-WIRE THEN PRINT(ST,TIME)
01466                       *
01467                       *  ELSE PRINT (ANS,CALLTM)
01468                       *
01469A 4508 86 80    A E.OFHK LDAA     #$80          LED
01470A 450A 9A 4F    A        ORAA     ONHOOK
01471A 450C 97 4F    A        STAA     ONHOOK
01472
01473A 450E 96 4C    A        LDAA     REGISV
01474A 4510 85 20    A        BITA     #BIT2W        2-WIRE?
01475A 4512 27 13 4527        BEQ      E.OF2W        YES
01476
01477A 4514 96 25    A        LDAA     FLASH
01478A 4516 27 03 451B        BEQ      E.OFOO
01479
01480A 4518 BD 44BC  A        JSR      SAVCAL
01481
01482A 451B 96 21    A E.OFOO LDAA     ANSFLG
01483A 451D 26 07 4526        BNE      E.OFND
01484
01485A 451F BD 4462  A        JSR      PRNANS        NO...3-WIRE
01486A 4522 86 FF    A        LDAA     #$FF
01487A 4524 97 21    A        STAA     ANSFLG
01488A 4526 39            E.OFND RTS
01489
01490A 4527 BD 4491  A E.OF2W JSR      STPRNT
01491A 452A 7F 002B  A        CLR      RNGFLG
01492A 452D 7F 0036  A        CLR      RVTIMR
01493A 4530 39               RTS
01495                       *
01496                       *
01497                       * EVENT = PFALSE ;  /CLEAR-DOWN/
01498                       *
01499                       *    PRINT ("TTL",MCOUNT) /UNLESS MCOUNT=O/
01500                       *
01501                       *    PRINT "TIM",CALLTM) /ELAPSED TIME/
01502                       *
01503                       *    PRINT ("CLR", TIME) /REAL TIME/
01504                       *
01505             4531  A E.ONHK EQU   *
01506A 4531 96 22    A E.CLR  LDAA     BUSY
01507A 4533 27 2F 4564        BEQ      E.CLND
01508
01509A 4535 96 26    A        LDAA     ACTFLG
01510A 4537 27 08 4541        BEQ      E.CLRO         NO METERS
01511A 4539 CE 4B28  A        LDX      #MSGTTL
01512A 453C DF 54    A        STX      STRPNT
01513A 453E BD 4604  A        JSR      PRNACT
01514
01515A 4541 CE 4B20  A E.CLRO LDX      #MSGTIM
01516A 4544 DF 54    A        STX      STRPNT
01517A 4546 BD 4609  A        JSR      PRNCAL
01518A 4549 CE 4B00  A        LDX      #MSGCLR
01519A 454C BD 45C0  A        JSR      STRTIM         STRING + TIME
01520A 454F 4F              CLRA
01521A 4550 97 22    A        STAA     BUSY
01522A 4552 97 35    A        STAA     DSPCNT
01523A 4554 97 30    A        STAA     DIGCNT
01524A 4556 97 24    A        STAA     FLAG
01525
01526A 4558 96 4F    A        LDAA     ONHOOK
01527A 455A 84 7F    A        ANDA     #$7F
01528A 455C 97 4F    A        STAA     ONHOOK
01529
01530A 455E BD 47B5  A        JSR      PRNPAP
01531A 4561 7F 0029  A        CLR      RIBBON
01532
01533A 4564 39            E.CLND RTS
```

```
01535                        *
01536                        *
01537                        *    EVENT = FLASH-HOOK ; /SE. FLAG/
01538                        *
01539                        *       FLASH:=TRUE
01540                        *       ELPSAV:=CALLTM (SAVCA.)
01541                        *       CALLTM:=0        (SAVCA.)
01542                        *       SAVTIM:=CLOCK
01543                        *
01544A 4565 86 FF    A E.FLSH LDAA    #$FF
01545A 4567 97 25    A        STAA    FLASH
01546A 4569 39                        RTS
01548                        *
01549                        *
01550                        *    EVENT = METER; /METER PULSE/
01551                        *
01552                        *    IF FLAG(ROGMTR) OR FLAG(TRUMTR) THEN PRINT(METER
01553                        *
01554                        *    ELSE BEGIN
01555                        *        IF DIGCNT > 1
01556                        *
01557                        *        THEN BEGIN
01558                        *          IF ANSFLG=FALSE THEN PRINT (ANS);
01559                        *             PRINT ("MTR");
01560                        *             PRNTIO (METER);
01561                        *             FLAG:=TRUMTR;
01562                        *             ANSFLG:=TRUE;
01563                        *        END;
01564                        *        ELSE BEGIN
01565                        *             PRINT ("ERR");
01566                        *             PRNTIO(METER);
01567                        *             FLAG:=ROGMTR;
01568                        *        END;
01569                        *    END;
01570                        *
01571                        *    IF FLASH THEN
01572                        *       BEGIN
01573                        *        CALLTM:=CALLTM+ELPSAV
01574                        *        FLASH:=FALSE
01575                        *    END;
01576                        *
01577                        *
01578A 456A 86 FF    A E.METR LDAA    #$FF
01579A 456C 97 26    A        STAA    MCTFLG
01580
01581A 456E 96 24    A        LDAA    FLAG
01582A 4570 81 02    A        CMPA    #ROGMTR
01583A 4572 27 2A 459E        BEQ     E.MTRP
01584A 4574 81 01    A        CMPA    #TRUMTR
01585A 4576 27 26 459E        BEQ     E.MTRP
01586A 4578 96 30    A        LDAA    DIGCNT
01587A 457A 81 01    A        CMPA    #1
01588A 457C 23 15 4593        BLS     E.MTR1   NEED MORE THAN 1 DIGITS
01589A 457E 96 21    A        LDAA    ANSFLG
01590A 4580 26 06 4588        BNE     E.MTRO
01591A 4582 CE 4AFC  A        LDX     #MSGANS
01592A 4585 BD 4462  A        JSR     PRNANS
01593
01594A 4588 CE 4814  A E.MTRO LDX     #MSGMTR
01595A 458B 8D 24 45B1        BSR     STRNMT   (STRING)+FIRST MTR
01596A 458D 86 01    A        LDAA    #TRUMTR
01597A 458F 97 24    A        STAA    FLAG
01598A 4591 20 0D 45A0        BRA     E.MTRF
01599
01600A 4593 CE 4B0C  A E.MTR1 LDX     #MSGERR
01601A 4596 8D 19 45B1        BSR     STRNMT
01602A 4598 86 02    A        LDAA    #ROGMTR
01603A 459A 97 24    A        STAA    FLAG
01604A 459C 20 02 45A0        BRA     E.MTRF
01605
01606A 459E 8D 1A 4__A E.MTRP BSR     PRNTIO
01607
01608A 45A0 96 25    A E.MTRF LDAA    FLASH
01609A 45A2 27 06 45AA        BEQ     E.MTRN
01610A 45A4 7F 0025  A        CLR     FLASH
01611A 45A7 BD 44D4  A        JSR     ADDTIM   CALLTM+ELPSAV
01612
01613A 45AA CE 003C  A E.MTRN LDX     #ITLMTR+3
01614A 45AD BD 44EF  A        JSR     INCRMX
01615A 45B0 39                        RTS
```

```
01616
01617
01618                         *  PRINT STRING & FIRST METER
01619                         *
01620A 45B1 BD 4816 A STRNMT JSR    STRING
01621A 45B4 86 0A   A        LDAA   #10
01622A 45B6 97 2F   A        STAA   COLCNT
01623A 45B8 97 46   A        STAA   COLSAV
01624
01625A 45BA 86 0D   A PRNT10 LDAA   #$D      (METER)
01626A 45BC BD 4803 A        JSR    PRNCOL
01627A 45BF 39               RTS
01629                        *
01630                        *
01631                        *   FUNCTIONS TO PRINT TIME FROM:
01632                        *
01633                        *       1. CLOCK
01634                        *       2. SAVTIM
01635                        *
01636                        *
01637A 45C0 BD 4816 A STRTIM JSR    STRING
01638
01639A 45C3 CE 0090 A PRNRTC LDX    #CLOCK
01640A 45C6 20 03 45CB       BRA    PRNTIM
01641
01642A 45C8 CE 0094 A PRNSAV LDX    #SAVTIM
01643A 45CB A6 00   A PRNTIM LDAA   X        WW
01644A 45CD 8D 1C 45EB       BSR    PRNBCD
01645A 45CF 8D 14 45E5       BSR    PRDASH
01646A 45D1 A6 01   A        LDAA   1,X      D
01647A 45D3 84 0F   A        ANDA   #$F
01648A 45D5 BD 47B7 A        JSR    PRINTA
01649A 45D8 8D 0B 45E5       BSR    PRDASH
01650A 45DA A6 02   A        LDAA   2,X      HH
01651A 45DC 8D 0D 45EB       BSR    PRNBCD
01652A 45DE 8D 05 45E5       BSR    PRDASH
01653A 45E0 A6 03   A        LDAA   3,X      MM
01654A 45E2 8D 07 45EB       BSR    PRNBCD
01655A 45E4 39               RTS
01656
01657A 45E5 86 0A   A PRDASH LDAA   #DASH
01658A 45E7 BD 47B7 A        JSR    PRINTA
01659A 45EA 39               RTS
01660                        *
01661                        *   FUNCTION TO PRINT BCD (A)
01662                        *
01663A 45EB BD 47AD A PRNBCD JSR    UNPACK
01664A 45EE BD 47B7 A        JSR    PRINTA
01665A 45F1 17              TBA
01666A 45F2 BD 47B7 A        JSR    PRINTA
01667A 45F5 39               RTS
01668
01669
01670                        *
01671                        *  PRINT STRING(X) .... DATE...TIME...SEC
01672                        *
01673A 45F6 8D C8 45C0 STMSEC BSR   STRTIM
01674A 45F8 8D EB 45E5       BSR    PRDASH
01675A 45FA 96 31   A        LDAA   SECOND
01676A 45FC 8D ED 45EB       BSR    PRNBCD
01677A 45FE 39               RTS
01679                        *
01680                        *
01681                        *  FUNCTIONS TO PRINT BCD FIELDS (4 BYTE COUNTER
01682                        *
01683                        *       1. CALLTM
01684                        *       2. ELPSAV
01685                        *       3. MCOUNT
01686                        *
01687                        *
01688A 45FF CE 008C A PRNELP LDX    #ELPSAV
01689A 4602 20 08 460C       BRA    PRBCDX
01690
01691A 4604 CE 0039 A PRNMCT LDX    #MCOUNT
01692A 4607 20 03 460C       BRA    PRBCDX
01693
01694A 4609 CE 008B A PRNCAL LDX    #CALLTM
01695
01696A 460C C6 04   A PRBCDX LDAB   #4
```

```
01697
01698A 460E A6 00      A PRBCD0 LDAA    X
01699A 4610 26 05 4617          BNE     PRBCD1
01700A 4612 08                  INX
01701A 4613 5A                  DECB
01702A 4614 26 F8 460E          BNE     PRBCD0
01703A 4616 39                  RTS                    COUNT = 0
01704                   *
01705                   *
01706                   *  COUNT > 0
01707                   *  (STRPNT) = "XXX"....PRINT FIRST
01708                   *
01709                   *
01710A 4617 DF 50      A PRBCD1 STX     SAVEX0
01711A 4619 D7 2E      A        STAB    BCDCNT
01712A 461B DE 54      A        LDX     STRPNT
01713A 461D BD 4816    A        JSR     STRING
01714A 4620 DE 50      A        LDX     SAVEX0
01715A 4622 A6 00      A        LDAA    X
01716A 4624 BD 47AD    A        JSR     UNPACK   A=MS
01717A 4627 4D                  TSTA
01718A 4628 26 06 4630          BNE     PRBCD2
01719A 462A 17                  TBA
01720A 462B BD 47B7    A        JSR     PRINTA
01721A 462E 20 04 4634          BRA     PRBCD3
01722
01723A 4630 A6 00      A PRBCD2 LDAA    X
01724A 4632 8D B7 45EB          BSR     PRNBCD
01725
01726A 4634 08           PRBCD3 INX
01727A 4635 7A 002E    A        DEC     BCDCNT
01728A 4638 26 F6 4630          BNE     PRBCD2
01729A 463A 39                  RTS
01731                   *
01732                   *
01733                   *  EVENT = DIGIT: /MF4 OR DP DIGIT/
01734                   *
01735                   *  IF FLASH THEN
01736                   *    BEGIN
01737                   *      CLEAR-DOWN;
01738                   *      PRINT ("OSS");
01739                   *      PRINT (DIGIT);
01740                   *      CLEAR (FLASH);
01741                   *      FLAG:=DLDIGT;
01742                   *    END;
01743                   *
01744                   *  IF FLAG(DLDIGT) THEN PRINT (DIGIT)
01745                   *    ELSE BEGIN
01746                   *      PRINT ("MF"/"DP");
01747                   *      PRINT (DIGIT);
01748                   *      FLAG:=DLDIGT;
01749                   *    END;
01750                   *
01751                   *
01752                   *
01753        463B      A E.DPDG EQU     *
01754        463B      A E.MFDG EQU     *
01755A 463B 96 25      A        LDAA    FLASH
01756A 463D 27 45 4684          BEQ     E.DG10
01757                   *
01758                   *  DIALLED DIGIT AFTER FLASH-HOOK
01759                   *  PRINT:
01760                   *    1. TTL
01761                   *    2. TIM (ELPSAV)
01762                   *    3. CLR (TIMSAV)
01763                   *    4. NEW.CALL (TIMSAV)
01764                   *
01765A 463F CE 4B2B    A        LDX     #MSGTTL   "TTL"
01766A 4642 DF 54      A        STX     STRPNT
01767A 4644 BD 4604    A        JSR     PRNACT
01768A 4647 CE 4B20    A        LDX     #MSGTIM   "TIM"
01769A 464A DF 54      A        STX     STRPNT
01770A 464C BD 45FF    A        JSR     PRNELP
01771A 464F CE 4B00    A        LDX     #MSGCLR   "CLR"
01772A 4652 BD 4816    A        JSR     STRING
01773A 4655 BD 45C8    A        JSR     PRNSAV
01774A 4658 BD 47B5    A        JSR     PRNPAP
01775A 465B 7F 0029    A        CLR     RIBBON
01776A 465E BD 4497    A        JSR     STCLR
01777                   *
```

```
01778                        *    NEW CALL...2WIRE OR 3WIRE?
01779                        *
01780A 4661 96 4C    A            LDAA    REGISV
01781A 4663 85 20    A            BITA    #BIT2W          2 WIRE?
01782A 4665 27 0C 4673            BEQ     E.DG00          YES
01783A 4667 CE 4B18  A            LDX     #MS3ORG
01784A 466A BD 4816  A            JSR     STRING
01785
01786A 466D CE 4B3C  A            LDX     #MSGST
01787A 4670 BD 4816  A            JSR     STRING
01788
01789A 4673 BD 45C8  A E.DG00 JSR  PRNSAV
01790
01791A 4676 BD 45E5  A            JSR     PRDASH
01792A 4679 96 32    A            LDAA    SECSAV
01793A 467B BD 45EB  A            JSR     PRNBCD
01794
01795A 467E 7F 0025  A            CLR     FLASH
01796A 4681 7F 0024  A            CLR     FLAG
01798                        *
01799                        *
01800                        *    PRINT (DIGIT); /FUNCTION TO PRINT DIALLED DIGIT/
01801                        *
01802                        *    IF FLAG <> PLDIGT OR DIG.TYPE<> PREV.TYPE
01803                        *      THEN BEGIN
01804                        *        PRINT (DIG.TYPE); /INITS COL,COUNT/
01805                        *        PREV.TYPE:=DIG.TYPE;
01806                        *        PRNT13(A); /A=DIGIT/
01807                        *      END;
01808                        *
01809                        *
01810                        *    ELSE PRNT13 (A); /A=DIGIT/
01811                        *
01812                        *
01813A 4684 86 10    A E.DG10 LDAA  #DLDIGT
01814A 4686 91 24    A            CMPA    FLAG
01815A 4688 27 05 468F            BEQ     E.DG11
01816A 468A 97 24    A            STAA    FLAG
01817A 468C 7F 0023  A            CLR     DIGTYP
01818
01819A 468F 96 47    A E.DG11 LDAA  EVENTA         GET DIGIT
01820A 4691 16                    TAB
01821A 4692 C4 F0    A            ANDB    #$F0
01822A 4694 D1 23    A            CMPB    DIGTYP
01823A 4696 27 17 46AF            BEQ     E.DG20
01824A 4698 D7 23    A            STAB    DIGTYP
01825A 469A C1 20    A            CMPB    #AFDIGT
01826A 469C 26 05 46A3            BNE     E.DG12
01827A 469E CE 4B10  A            LDX     #MSGMF
01828A 46A1 20 03 46A6            BRA     E.DG13
01829
01830A 46A3 CE 4B04  A E.DG12 LDX   #MSGDP
01831
01832A 46A6 BD 4816  A E.DG13 JSR   STRING
01833A 46A9 86 0D    A            LDAA    #13
01834A 46AB 97 2F    A            STAA    COLCNT
01835A 46AD 97 46    A            STAA    COLSAV
01836
01837A 46AF 96 47    A E.DG20 LDAA  EVENTA
01838A 46B1 84 0F    A            ANDA    #$F
01839
01840A 46B3 7C 0030  A            INC     DIGCNT
01841
01842                        *
01843                        *  DISPLAY DIGIT
01844                        *
01845A 46B6 36                    PSHA
01846A 46B7 D6 35    A            LDAB    DSPCNT
01847A 46B9 26 02 46BD            BNE     DSPDGI
01848A 46BB 8D 20 46DD            BSR     CLRDSP
01849
01850A 46BD CE 00B0  A DSPDGI LDX   #DSPBUF
01851A 46C0 BD 49F3  A            JSR     ADDBX
01852A 46C3 A7 00    A            STAA    X
01853
01854A 46C5 D6 35    A            LDAB    DSPCNT
01855A 46C7 5C                    INCB
```

```
01856A 46C8 C1 0C      A              CMPB    #12
01857A 46CA 23 01 46CD                BLS     DSPDGO
01858
01859A 46CC 5F                        CLRB
01860
01861A 46CD D7 35      A DSPDGO SFAB  DSPCNT
01862A 46CF 32                        PULA
01863
01864A 46D0 36                        PSHA
01865A 46D1 BD 4803    A              JSR     PRNCOL
01866A 46D4 32                        PULA
01867
01868A 46D5 D6 6E      A              LDAB    ALRMFG
01869A 46D7 26 03 46DC                BNE     DSPDGN
01870
01871A 46D9 BD 4A57    A              JSR     SETCMP
01872A 46DC 39           DSPDGN RTS
01873
01874                         *
01875                         * CLEAR DISPLAY BUFFER
01876                         *
01877A 46DD 36           CLRDSP PSHA
01878A 46DE 37                  PSHB
01879A 46DF 86 FF      A        LDAA    #$FF
01880A 46E1 CE 00B0    A        LDX     #DSPBUF
01881A 46E4 C6 10      A        LDAB    #16
01882
01883A 46E6 A7 00      A CLDSLP STAA   X
01884A 46E8 08                  INX
01885A 46E9 5A                  DECB
01886A 46EA 26 FA 46E6          BNE    CLDSLP
01887A 46EC 33                  PULB
01888A 46ED 32                  PULA
01889A 46EE 39                  RTS
01891                         *
01892                         *
01893                         * EVENT = TICK; /1 SECOND CLOCK/
01894                         *
01895                         *   1. INCREM. CALL TIME (UNLESS IDLE?)
01896                         *   2. COUNT DOWN TIMERS (RV)
01897                         *   3. UPDATE RTC,DISPLAY GHOST
01898                         *
01899                         *
01900A 46EF 96 22      A E.RTC  LDAA   BUSY
01901A 46F1 27 06 46F9          BEQ    E.RTC0
01902A 46F3 CE 008B    A        LDX    #CALLTM+3
01903A 46F6 BD 44EF    A        JSR    INCRMX
01904
01905A 46F9 96 36      A E.RTC0 LDAA   RVTIMR
01906A 46FB 27 11 470E          BEQ    E.RTC1
01907
01908A 46FD 7A 0036    A        DEC    RVTIMR
01909A 4700 26 0C 470E          BNE    E.RTC1
01910
01911A 4702 7F 002B    A        CLR    RNGFLG
01912
01913A 4705 CE 4B08    A        LDX    #MSGEND
01914A 4708 BD 45F6    A        JSR    STMSEC
01915A 470B BD 47B5    A        JSR    PRNPAP
01916
01917A 470E 96 3D      A E.RTC1 LDAA   PRGTMR
01918A 4710 27 08 471A          BEQ    RTCLK
01919
01920A 4712 7A 003D    A        DEC    PRGTMR
01921A 4715 26 03 471A          BNE    RTCLK
01922
01923A 4717 7F 0028    A        CLR    PRGFLG
01924
01925                         *
01926                         * UPDATE CLOCK (WW,DAY,HOUR,MIN)
01927                         * DISPLAY SECOND ALSO
01928                         *
01929A 471A 96 31      A RTCLK  LDAA   SECOND
01930A 471C 8B 01      A        ADDA   #1
01931A 471E 19                  DAA
01932A 471F 97 31      A        STAA   SECOND
01933A 4721 81 59      A        CMPA   #$59
01934A 4723 22 0E 4733          BHI    RTCMIN
01935
```

```
01936A 4725 96 31      A DISPSC LDAA    SECOND
01937A 4727 BD 47AD    A        JSR     UNPACK
01938A 472A 8B 80      A        ADDA    #$80
01939A 472C 97 9F      A        STAA    DSPSEC
01940A 472E CB C0      A        ADDB    #$C0
01941A 4730 D7 A0      A        STAB    DSPSEC+1
01942A 4732 39                  RTS
01943
01944A 4733 7F 0031    A RTCMIN CLR     SECOND
01945A 4736 96 93      A        LDAA    CLOCK+3   MINUTES
01946A 4738 8B 01      A        ADDA    #1
01947A 473A 19                  DAA
01948A 473B 97 93      A        STAA    CLOCK+3
01949A 473D 81 59               CMPA    #$59
01950A 473F 22 0E 474F          BHI     RTCHR
01951
01952A 4741 96 93      A DISPMN LDAA    CLOCK+3
01953A 4743 8D 68 47AD          BSR     UNPACK
01954A 4745 8B 80      A        ADDA    #$80
01955A 4747 97 9D      A        STAA    DSPMIN
01956A 4749 CB 90      A        ADDB    #$90
01957A 474B D7 9E      A        STAB    DSPMIN+1
01958A 474D 20 D6 4725          BRA     DISPSC
01959
01960A 474F 7F 0093    A RTCHR  CLR     CLOCK+3
01961A 4752 96 92      A        LDAA    CLOCK+2   HOURS
01962A 4754 8B 01      A        ADDA    #1
01963A 4756 19                  DAA
01964A 4757 97 92      A        STAA    CLOCK+2
01965
01966A 4759 81 12      A        CMPA    #$12      NOON ?
01967A 475B 26 04 4761          BNE     RTCHRO
01968A 475D C6 FF      A        LDAB    #$FF
01969A 475F D7 2C      A        STAB    TSTFLG
01970
01971A 4761 81 23      A RTCHRO CMPA    #$23
01972A 4763 22 0E 4773          BHI     RTCDAY
01973
01974A 4765 96 92      A DISPHR LDAA    CLOCK+2
01975A 4767 8D 44 47AD          BSR     UNPACK
01976A 4769 8B 50      A        ADDA    #$50
01977A 476B 97 9B      A        STAA    DSPHR
01978A 476D CB 60      A        ADDB    #$60
01979A 476F D7 9C      A        STAB    DSPHR+1
01980A 4771 20 CE 4741          BRA     DISPMN
01981
01982A 4773 7F 0092    A RTCDAY CLR     CLOCK+2
01983A 4776 86 FF      A        LDAA    #$FF
01984A 4778 97 2C      A        STAA    TSTFLG
01985A 477A 96 91      A        LDAA    CLOCK+1   DAY
01986A 477C 8B 01      A        ADDA    #1
01987A 477E 19                  DAA
01988A 477F 97 91      A        STAA    CLOCK+1
01989A 4781 81 07      A        CMPA    #7
01990A 4783 22 08 478D          BHI     RTCWK
01991
01992A 4785 96 91      A DISPDY LDAA    CLOCK+1
01993A 4787 8B 30      A        ADDA    #$30
01994A 4789 97 9A      A        STAA    DSPDAY
01995A 478B 20 D8 4765          BRA     DISPHR
01996
01997A 478D 86 01      A RTCWK  LDAA    #1
01998A 478F 97 91      A        STAA    CLOCK+1
01999A 4791 96 90      A        LDAA    CLOCK     WEEKS
02000A 4793 8B 01      A        ADDA    #1
02001A 4795 19                  DAA
02002A 4796 81 52      A        CMPA    #$52
02003A 4798 23 02 479C          BLS     RTCWKO
02004A 479A 86 01      A        LDAA    #1
02005
02006A 479C 97 90      A RTCWKO STAA    CLOCK
02007
02008A 479E 96 90      A DISPWK LDAA    CLOCK
02009A 47A0 8D 0B 47AD          BSR     UNPACK
02010A 47A2 97 98      A        STAA    DSPWK
02011A 47A4 CB 10      A        ADDB    #$10
02012A 47A6 D7 99      A        STAB    DSPWK+1
02013A 47A8 7F 0031    A        CLR     SECOND
02014A 47AB 20 D8 4785          BRA     DISPDY
```

```
02015                     *
02016                     *   FUNCTION TO UNPACK (A)
02017                     *
02018A 47AD 16            UNPACK   TAB
02019A 47AE C4 OF    A             ANDB     #$F
02020A 47B0 44                     LSRA
02021A 47B1 44                     LSRA
02022A 47B2 44                     LSRA
02023A 47B3 44                     LSRA
02024A 47B4 39                     RTS
02026                     *
02027                     *
02028                     *   FUNCTIONS TO PRINT:
02029                     *
02030                     *       1. PRNCOL
02031                     *       2. PRINTA
02032                     *       3. STRING
02033                     *
02034                     *
02035A 47B5 86 63    A    PRNPAP   LDAA     #$63
02036
02037A 47B7 DF 52    A    PRINTA   STX      SAVEX1
02038
02039A 47B9 37            PRNTAK   PSHB
02040
02041A 47BA D6 2D    A    PRNNAT   LDAB     PRSTOP    OVERFLOW ?
02042A 47BC 27 08 47C6             BEQ      PRNTA3    NO
02043
02044A 47BE DE 37    A             LDX      PRNCNT
02045A 47C0 27 13 47D5             BEQ      PRNTA4    PRINT FINISHED
02046
02047A 47C2 33            PRNTA5   PULB
02048A 47C3 DE 52    A             LDX      SAVEX1
02049A 47C5 39                     RTS
02050                     *
02051                     *  NO OVERFLOW FLAG
02052                     *
02053A 47C6 0F            PRNTA3   SEI
02054A 47C7 DE 37    A             LDX      PRNCNT
02055A 47C9 0E                     CLI
02056A 47CA 8C 0274  A             CPX      #PRNMAX
02057A 47CD 26 09 47D8             BNE      PRNTA6
02058
02059A 47CF C6 FF    A             LDAB     #$FF
02060A 47D1 D7 2D    A             STAB     PRSTOP
02061A 47D3 20 ED 47C2             BRA      PRNTA5
02062
02063                     *
02064                     *  OVERFLOW END
02065                     *
02066A 47D5 7F 002D  A    PRNTA4   CLR      PRSTOP
02067
02068            47D8 A   PRNTA6   EQU      *
02069A 47D8 DE 5A    A             LDX      PRNPNT
02070A 47DA A7 00    A             STAA     X
02071A 47DC 08                     INX
02072A 47DD 8C 0400  A             CPX      #PRBEND
02073A 47E0 26 03 47E5             BNE      PRNTAO
02074A 47E2 CE 018C  A             LDX      #PRNBUF
02075
02076A 47E5 DF 5A    A    PRNTAO   STX      PRNPNT
02077A 47E7 0F                     SEI
02078A 47E8 DE 37    A             LDX      PRNCNT
02079A 47EA 08                     INX
02080A 47EB DF 37    A             STX      PRNCNT
02081A 47ED 0E                     CLI
02082A 47EE DE 52    A             LDX      SAVEX1
02083A 47F0 33                     PULB
02084A 47F1 85 20    A             BITA     #PABIT    PA COMMAND?
02085A 47F3 27 04 47F9             BEQ      PRNTA1    NO
02086A 47F5 86 80    A             LDAA     #PATKUP   PAPER TAKE-UP
02087A 47F7 20 C0 47B9             BRA      PRNTAK
02088
02089A 47F9 81 30    A    PRNTA1   CMPA     #PATKUP
02090A 47FB 27 01 47FE             BEQ      PRNTA2
02091A 47FD 39            PRCLND   RTS
02092
02093A 47FE 96 29    A    PRNTA2   LDAA     RIBBON
02094A 4800 26 B7 47B9             BNE      PRNTAK
```

```
02095A 4802 39                            RTS
02096
02097A 4803 7D 002F  A PRNCOL TST    COLCNT
02098A 4806 26 08 4810         BNE    PRCOLO
02099
02100A 4808 36                  PSHA
02101A 4809 8D AA 47B5          BSR    PRNPAP
02102A 480B 96 46   A           LDAA   COLSAV
02103A 480D 97 2F   A           STAA   COLCNT
02104A 480F 32                  PULA
02105
02106A 4810 8D A5 47B7 PRCOLO BSR    PRINTA
02107A 4812 7A 002F  A          DEC    COLCNT
02108A 4815 39                  RTS
02109
02110                  *
02111                  * TO PRINT A "STRING"
02112                  *  N.B. ALWAYS STARTS WITH PA/COL 0
02113                  *
02114A 4816 86 60   A STRING LDAA   #$60
02115
02116A 4818 8D 9D 47B7 STRNLP BSR    PRINTA
02117A 481A A6 00   A           LDAA   X
02118A 481C 08                  INX
02119A 481D 81 FE   A           CMPA   #$FE
02120A 481F 26 F7 4818          BNE    STRNLP
02121A 4821 39                  RTS
02123
02124                  *
02125                  * EVENT = KBD DIGIT
02126                  *
02127                  * IF (NOT.PROG).TST
02128                  *
02129                  * ELSE PROGRAM (DIGIT)
02130                  *
02131A 4822 17         E.KBDG TBA
02132A 4823 C4 F0   A           ANDB   #$F0
02133A 4825 C1 F0   A           CMPB   #$F0   HI ?
02134A 4827 26 06 482F          BNE    E.KB10 NO
02135
02136A 4829 84 0F   A           ANDA   #$F
02137A 482B 8B 80   A           ADDA   #$80
02138A 482D 20 02 4831          BRA    E.KB11
02139
02140A 482F 84 7F   A E.KB10 ANDA   #$7F
02141
02142A 4831 5F        E.KB11 CLRB
02143A 4832 CE 4844  A          LDX    #KBDTAB
02144
02145A 4835 A1 00   A E.KB12 CMPA   X
02146A 4837 27 08 4841          BEQ    E.KB13
02147A 4839 08                  INX
02148A 483A 6D 00   A           TST    X
02149A 483C 27 10 484E          BEQ    E.KBNO  ILLEGAL
02150A 483E 5C                  INCB
02151A 483F 20 F4 4835          BRA    E.KB12
02152
02153A 4841 17        E.KB13 TBA            DIGIT
02154
02155A 4842 D6 28   A E.KB20 LDAB  PRGFLG  PROGRAM ?
02156A 4844 26 20 4866          BNE   PROGRM
02157                  *
02158                  * NOT PROGRAM MODE...MUST BE TEST COMMAND
02159                  *
02160A 4846 81 03   A           CMPA   #3     TEST?
02161A 4848 26 05 484F          BNE    E.KB01 NO
02162
02163A 484A 86 FF   A           LDAA   #$FF
02164A 484C 97 2C   A           STAA   TSTFLG
02165
02166A 484E 39        E.KBNO RTS
02167
02168A 484F 81 02   A E.KB01 CMPA   #$2    "CLR" ALARM ?
02169A 4851 26 07 485A         BNE    E.KB00 NO
02170
02171A 4853 96 4F   A           LDAA   ONHOOK
02172A 4855 84 BF   A           ANDA   #$BF
02173A 4857 97 4F   A           STAA   ONHOOK
02174A 4859 39                  RTS
02175
```

```
02176
02177A 485A 81 09      A E.KB00 CMPA   #$9       PROG. COMMAND?
02178A 485C 23 F0 484E         BLS    E.KBNO    NOT A-F
02179A 485E 81 0F      A       CMPA   #$F
02180A 4860 27 EC 484E         BEQ    E.KBNO    "F" NOT COMMAND 02181A 4862 97 28              STAA   PRGFLG    SET PROG MODE
02182A 4864 20 50 48B6         BRA    PROG02
02183                   *
02184                   *  PROGRAM MODE
02185                   *
02186A 4866 BD 64 48CC PROGRM BSR     PRGTIM
02187A 4868 C1 0F      A       CMPB   #$F       F-MODE?
02188A 486A 26 39 48A5         BNE    PROG00    NO
02189                   *
02190                   *   "F" MODE
02191                   *  FE = EXECUTE
02192                   *  FC = CLEAR INPUT
02193                   *  FF = DELETE PREVIOUS ENTRY
02194                   *  FD = EXIT PROGRAM MODE
02195                   *
02196A 486C C6 01      A       LDAB   #1
02197A 486E D7 28      A       STAB   PRGFLG    STILL PROG MODE
02198A 4870 81 0C      A       CMPA   #$C
02199A 4872 26 04 4878         BNE    PROGFD
02200A 4874 BD 4A04    A       JSR    CLRKBF
02201A 4877 39                 RTS
02202
02203A 4878 81 0D      A PROGFD CMPA  #$D
02204A 487A 26 07 4883         BNE    PROGFF
02205
02206A 487C 7F 0028    A PROGEX CLR   PRGFLG
02207A 487F 7F 003D    A       CLR    PRGTMR
02208A 4882 39                 RTS
02209
02210A 4883 81 0F      A PROGFF CMPA  #$F       (FF?)
02211A 4885 26 0F 4896         BNE    PROGFE
02212A 4887 DE 58      A       LDX    KBFNXT
02213A 4889 8C 00A1    A       CPX    #KBDBUF
02214A 488C 27 07 4895         BEQ    PROGFN
02215A 488E 09                 DEX
02216A 488F 86 FF      A       LDAA   #$FF
02217A 4891 A7 00      A       STAA   X
02218A 4893 DF 58      A       STX    KBFNXT
02219
02220A 4895 39         PROGFN RTS
02221
02222A 4896 81 0E      A PROGFE CMPA  #$E       EXECUTE?
02223A 4898 26 FB 4895         BNE    PROGFN    NO
02224                   *
02225                   *  EXECUTE INPUT
02226                   *
02227A 489A C6 02      A       LDAB   #2
02228A 489C D7 28      A       STAB   PRGFLG
02229A 489E CE 00A1    A       LDX    #KBDBUF
02230A 48A1 DF 58      A       STX    KBFNXT
02231A 48A3 20 3C 48E1         BRA    KBDCMD
02232                   *
02233                   *
02234                   *  ENTERING DATA:
02235                   *
02236                   *  IF (A) = $F THEN PRGFLG:=$F
02237                   *
02238                   *  IF PRGFLG = 2 THEN CLRKBF (PREVIOUSLY EXECUTE)
02239
02240                   *
02241A 48A5 81 0F      A PROG00 CMPA  #$F
02242A 48A7 26 03 48AC         BNE    PROG01
02243A 48A9 97 28      A       STAA   PRGFLG
02244A 48AB 39                 RTS
02245
02246A 48AC D6 28      A PROG01 LDAB  PRGFLG
02247A 48AE C1 02      A       CMPB   #2        PREV. EXECUTE?
02248A 48B0 27 A8 485A         BEQ    E.KB00
02249
02250A 48B2 C1 03      A       CMPB   #3        (DISPLAY CLOCK)
02251A 48B4 26 09 48BF         BNE    PROG10    NO..INPUT
02252
02253A 48B6 BD 4A04    A PROG02 JSR   CLRKBF
```

```
02254A 48B9 C6 01      A          LDAB    #1
02255A 48BB D7 28      A          STAB    PRGFLG
02256A 48BD 8D 0D 48CC            BSR     PRGTIM
02257
02258A 48BF DE 58      A PROG10   LDX     KBFNXT
02259A 48C1 8C 00B0    A          CPX     #KBFEND
02260A 48C4 27 05 48CB            BEQ     PROG11
02261A 48C6 A7 00      A          STAA    X
02262A 48C8 08                    INX
02263A 48C9 DF 58      A          STX     KBFNXT
02264
02265A 48CB 39           PROG11   RTS
02266
02267
02268                   *
02269                   * RESET PRGFLG TIMER
02270                   *
02271A 48CC 36           PRGTIM   PSHA
02272A 48CD 86 0A      A          LDAA    #PRTMOT
02273A 48CF 97 3D      A          STAA    PRGTMR
02274A 48D1 32                    PULA
02275A 48D2 39                    RTS
02277                   *
02278                   * GET NEXT KBD ENTRY
02279                   *
02280A 48D3 DF 5E      A GETNXT   STX     GETSAV
02281A 48D5 DE 58      A          LDX     KBFNXT
02282
02283A 48D7 A6 00      A          LDAA    X
02284A 48D9 84 0F      A          ANDA    #$F
02285A 48DB 08                    INX
02286
02287A 48DC DF 58      A GETNX1   STX     KBFNXT
02288A 48DE DE 5E      A          LDX     GETSAV
02289A 48E0 39                    RTS
02291
02292                   *
02293                   *  EXECUTE KBD INPUT:
02294                   *
02295                   *     A = SYSTEM PARAMETERS
02296                   *     C = CLOCK
02297                   *     B = IDENT
02298                   *     E = ALARM DISPLAY/ENTER
02299                   *     D = ALARM DELETE
02300                   *
02301                   *
02302A 48E1 BD 48D3   A KBDCMD JSR     GETNXT    FIRST = COMMAND
02303A 48E4 81 0C     A          CMPA    #$C       CLOCK?
02304A 48E6 26 4E 4936           BNE     KBCM10    NO
02305A 48E8 D6 A2     A          LDAB    KBDBUF+1  DATA ENTERED?
02306A 48EA 2B 2E 491A            BMI    KBDCLK    NO..DISPLAY CLOCK
02307
02308A 48EC BD 4928   A          JSR     GETPAK    WEEKS
02309A 48EF 25 2E 491F            BCS     KBDERR
02310A 48F1 81 52     A          CMPA    #$52
02311A 48F3 22 2A 491F            BHI     KBDERR
02312A 48F5 97 90     A          STAA    CLOCK
02313A 48F7 BD 48D3   A          JSR     GETNXT
02314A 48FA 81 07     A          CMPA    #7
02315A 48FC 22 21 491F            BHI     KBDERR
02316A 48FE 97 91     A          STAA    CLOCK+1
02317A 4900 BD 4928   A          JSR     GETPAK
02318A 4903 25 1A 491F            BCS     KBDERR
02319A 4905 81 23     A          CMPA    #$23
02320A 4907 22 16 491F            BHI     KBDERR
02321A 4909 97 92     A          STAA    CLOCK+2
02322A 490B BD 4928   A          JSR     GETPAK
02323A 490E 25 0F 491F            BCS     KBDERR
02324A 4910 81 59     A          CMPA    #$59
02325A 4912 22 0B 491F            BHI     KBDERR
02326A 4914 97 93     A          STAA    CLOCK+3
02327
02328A 4916 BD 479E   A          JSR     DISPWK
02329
02330A 4919 39                   RTS
02331                   *
02332                   * FLAG DISPLAY CLOCK
02333                   *
```

```
02334A 491A C6 03      A KBDCLK LDAB    #3
02335A 491C D7 28      A        STAB    PRGFLG
02336A 491E 39                  RTS
02337
02338                         *
02339                         * INPUT ERROR
02340                         *
02341A 491F BD 4A04    A KBDERR JSR     CLRKBF
02342A 4922 CE 0E0E    A        LDX     #$0E0E
02343A 4925 DF A1      A        STX     KBDBUF
02344A 4927 39                  RTS
02345                         *
02346                         * GET NEXT 2 DIGITS & PACK INTO BCD
02347                         * SEC IF NOT DECIMAL
02348                         *
02349A 4928 BD 48D3    A GETPAK JSR     GETNXT
02350
02351A 492B 16           GETPKO TAB
02352A 492C BD 48D3    A GETIO  JSR     GETNXT
02353A 492F 58                  ASLB
02354A 4930 58                  ASLB
02355A 4931 58                  ASLB
02356A 4932 58                  ASLB
02357A 4933 1B                  ABA
02358A 4934 0C                  CLC
02359A 4935 39                  RTS
02360
02361A 4936 81 0B      A KBCM10 CMPA    #$B        IDENT?
02362A 4938 26 1D 4957          BNE     KBCM20     NO
02363A 493A D6 A2      A        LDAB    KBDBUF+1   DATA ENTERED?
02364A 493C 2A 14 4952          BPL     KBCM12     YES
02365                         *
02366                         * DISPLAY IDENT
02367                         *
02368A 493E CE 00C0    A        LDX     #IDENTB
02369A 4941 DF 58      A        STX     KBFNXT
02370A 4943 CE 00A2    A        LDX     #KBDBUF+1
02371A 4946 C6 0E      A KBCM13 LDAB    #14
02372
02373A 4948 BD 48D3    A KBCM11 JSR     GETNXT
02374A 494B A7 00      A        STAA    X
02375A 494D 08                  INX
02376A 494E 5A                  DECB
02377A 494F 26 F7 4948          BNE     KBCM11
02378A 4951 39                  RTS
02379                         *
02380                         * ENTER IDENT
02381                         *
02382A 4952 CE 00C0    A KBCM12 LDX     #IDENTB
02383A 4955 20 EF 4946          BRA     KBCM13
02385
02386                         * MUST BE ALARMS D/E
02387                         *
02388A 4957 81 0E      A KBCM20 CMPA    #$E        ENTER/DISPLAY ?
02389A 4959 26 45 49A0          BNE     KBCM30     NO...DELETE
02390
02391A 495B BD 48D3    A        JSR     GETNXT
02392A 495E 81 09      A        CMPA    #9
02393A 4960 22 BD 491F          BHI     KBDERR
02394
02395A 4962 8D 5F 49C3          BSR     FNDALM     SET POINTER
02396
02397A 4964 96 A3      A        LDAA    KBDBUF+2
02398A 4966 81 FF      A        CMPA    #$FF       DISPLAY ?
02399A 4968 26 21 498B          BNE     KBCM21     NO..ENTER
02400
02401                         *
02402                         * DISPLAY ALARM ... I.E. E_FE
02403                         *
02404A 496A DF 50      A        STX     SAVEX0     SAVE POINTER
02405A 496C CE 00A3    A        LDX     #KBDBUF+2
02406A 496F C6 07      A        LDAB    #7
02407
02408A 4971 37           DSALOP PSHB               SAVE COUNT
02409A 4972 DF 58      A        STX     KBFNXT     SAVE KBD POINTER
02410
02411A 4974 DE 50      A        LDX     SAVEX0     GET ALARM
02412A 4976 A6 00      A        LDAA    X
02413A 4978 BD 47AD    A        JSR     UNPACK
```

```
02414A 497B 08                          INX
02415A 497C DF 50      A                STX       SAVEX0
02416
02417A 497E DE 58      A                LDX       KBFNXT
02418A 4980 A7 00      A                STAA      X
02419A 4982 08                          INX
02420A 4983 E7 00      A                STAB      X
02421A 4985 08                          INX
02422
02423A 4986 33                          PULB
02424A 4987 5A                          DECB
02425A 4988 26 E7 4971                  BNE       DSALOP
02426A 498A 39                          RTS
02428
02429                          * ENTER ALARMS
02430                          *
02431A 498B C6 07      A KBCM21          LDAB      #7
02432
02433A 498D 37           KBCM22         PSHB
02434A 498E BD 4928   A                 JSR       GETPAK
02435A 4991 A7 00     A                 STAA      X
02436A 4993 08                          INX
02437A 4994 33                          PULB
02438A 4995 5A                          DECB
02439A 4996 26 F5 498D                  BNE       KBCM22
02440
02441A 4998 C6 01     A                 LDAB      #1
02442A 499A E7 00     A                 STAB      X
02443A 499C 39                          RTS
02444
02445A 499D 7E 491F   A KBERJP          JMP       KBDERR
02447                          *
02448                          * DELETE ALARM(S)
02449                          *
02450A 49A0 81 0A     A KBCM30          CMPA      #$A
02451A 49A2 27 2A 49CE                  BEQ       KBCM40
02452
02453A 49A4 BD 43D3   A                 JSR       GETNXT
02454A 49A7 81 09     A                 CMPA      #9
02455A 49A9 23 0B 49B6                  BLS       KBCM31
02456
02457A 49AB 81 0A     A                 CMPA      #$A         ALL ?
02458A 49AD 26 EE 499D                  BNE       KBERJP      NO..ERROR
02459
02460A 49AF CE 00D8   A                 LDX       #ALRMTB
02461A 49B2 C6 50     A                 LDAB      #80
02462A 49B4 20 04 49BA                  BRA       KBCM32
02463
02464A 49B6 8D 0B 49C3 KBCM31           BSR       FNDALM
02465A 49B8 C6 03     A                 LDAB      #3
02466
02467A 49BA 86 FF     A KBCM32          LDAA      #$FF
02468
02469A 49BC A7 00     A KBCM33          STAA      X
02470A 49BE 08                          INX
02471A 49BF 5A                          DECB
02472A 49C0 26 FA 49BC                  BNE       KBCM33
02473A 49C2 39                          RTS
02474
02475                          *
02476                          * FUNCTION TO FIND POINTER TO ALARM ENTRY
02477                          *
02478A 49C3 16        FNDALM            TAB
02479A 49C4 58                          ASLB
02480A 49C5 58                          ASLB
02481A 49C6 58                          ASLB
02482A 49C7 CE 00D8   A                 LDX       #ALRMTB
02483A 49CA BD 49F3   A                 JSR       ADDBX
02484A 49CD 39                          RTS
02486                          *
02487                          * SYSTEM PARAMETERS
02488                          *
02489                          * EACH IS PACKED BCD PAIR
02490                          *
02491A 49CE BD 43D3   A KBCM40          JSR       GETNXT
02492A 49D1 81 09     A                 CMPA      #9          PARAM0-PARAM9 ?
02493A 49D3 22 C8 499D                  BHI       KBERJP      NO
02494
02495
```

```
02496A 49D5 D6 A3      A            LDAB    KBDBUF+2
02497A 49D7 C1 FF      A            CMPB    #$FF        DISPLAY ?
02493A 49D9 27 08 49E3              BEQ     KBCM41      YES
02499
02500A 49DB 8D 12 49EF              BSR     PRMPNT
02501A 49DD BD 4928    A            JSR     GETPAK
02502
02503A 49E0 A7 00      A            STAA    X
02504A 49E2 39                      RTS
02505
02506                       *
02507                       * DISPLAY
02508                       *
02509A 49E3 8D 0A 49EF   KBCM41 BSR  PRMPNT
02510A 49E5 A6 00      A            LDAA    X
02511A 49E7 BD 47AD    A            JSR     UNPACK
02512A 49EA 97 A3      A            STAA    KBDBUF+2
02513A 49EC D7 A4      A            STAB    KBDBUF+3
02514A 49EE 39                      RTS
02516
02517                       * FIND POINTER TO PARAMETER ENTRY
02518                       *
02519A 49EF 16            PRMPNT    TAB
02520A 49F0 CE 00CE    A            LDX     #PARAM0
02521
02522                       *
02523                       * TO ADD B TO X
02524                       *
02525
02526A 49F3 37            ADDBX     PSHB
02527A 49F4 DF 5C      A            STX     ADDIND
02528A 49F6 DB 5D      A            ADDB    ADDIND+1
02529A 49F8 D7 5D      A            STAB    ADDIND+1
02530A 49FA C6 00      A            LDAB    #0
02531A 49FC D9 5C      A            ADCB    ADDIND
02532A 49FE D7 5C      A            STAB    ADDIND
02533A 4A00 DE 5C      A            LDX     ADDIND
02534A 4A02 33                      PULB
02535A 4A03 39                      RTS
02536
02537                       *
02538                       * CLEAR KBD BUFFER
02539                       *
02540
02541A 4A04 36            CLRKBF    PSHA
02542A 4A05 37                      PSHB
02543A 4A06 CE 00A1    A            LDX     #KBDBUF
02544
02545A 4A09 86 0F      A            LDAA    #15
02546A 4A0B 97 84      A            STAA    KBDCNT
02547A 4A0D C6 FF      A            LDAB    #$FF
02548
02549A 4A0F E7 00      A  CLRBF0    STAB    X
02550A 4A11 08                      INX
02551A 4A12 4A                      DECA
02552A 4A13 26 FA 4A0F              BNE     CLRBF0
02553
02554A 4A15 CE 00A1    A            LDX     #KBDBUF
02555A 4A18 DF 58      A            STX     KBFNXT
02556A 4A1A 33                      PULB
02557A 4A1B 32                      PULA
02558A 4A1C 39                      RTS
02560                       *
02561                       * PROCEDURE TO PRINT "TST"
02562                       *
02563A 4A1D CE 4B2C    A  PRNTST    LDX     #MSGTST
02564A 4A20 86 10      A            LDAA    #REDRIB
02565A 4A22 97 29      A            STAA    RIBBON
02566A 4A24 BD 4816    A            JSR     STRING
02567A 4A27 7F 0029    A            CLR     RIBBON
02568
02569A 4A2A 8D 0A 4A36              BSR     PRNTID
02570A 4A2C CE 4B30    A            LDX     #MSGCLK
02571A 4A2F BD 45C0    A            JSR     STRTIM
02572
02573A 4A32 BD 47B5    A            JSR     PRNPAP
02574A 4A35 39                      RTS
02575
02576                       *
```

```
02577                   * PROCEDURE TO PRINT ID
02578                   *
02579A 4A36 CE 4B34   A PRNTID LDX   #MSGID
02580A 4A39 BD 4816   A        JSR   STRING
02581A 4A3C CE 00C0   A        LDX   #IDENTB
02582A 4A3F 86 0D     A        LDAA  #13
02583A 4A41 97 2F     A        STAA  COLCNT
02584A 4A43 97 46     A        STAA  COLSAV
02585
02586A 4A45 C6 0E     A        LDAB  #14
02587
02588A 4A47 A6 00     A PRIDLP LDAA  X
02589A 4A49 84 0F     A        ANDA  #$F
02590A 4A4B 81 0F     A        CMPA  #$F
02591A 4A4D 27 07 4A56         BEQ   PRIDND
02592A 4A4F BD 4803   A        JSR   PRNCOL
02593A 4A52 08                 INX
02594A 4A53 5A                 DECB
02595A 4A54 26 F1 4A47         BNE   PRIDLP
02596
02597A 4A56 39           PRIDND RTS
02598
02599
02600                   *
02601                   * SUBR. TO SET UP CMPDAT , CMPCNT FOR COMPARE
02602                   *   TO ALARM TABLE ... CALLING ROUTINE MUST
02603                   * KEEP TRACK OF WHERE COMPARISON SHOULD BE .
02604                   *
02605
02606A 4A57 DE 72     A SETCMP LDX   CMPNTR
02607A 4A59 96 6F     A        LDAA  CMPCNT
02608A 4A5B 81 0C     A        CMPA  #12      END ?
02609A 4A5D 22 0B 4A6A         BHI   CMPEND   YES
02610A 4A5F A6 00     A        LDAA  X
02611A 4A61 84 0F     A        ANDA  #$F
02612A 4A63 97 70     A        STAA  CMPDAT
02613A 4A65 08                 INX
02614A 4A66 DF 72     A        STX   CMPNTR
02615A 4A68 8D 01 4A6B         BSR   TSTALM
02616A 4A6A 39           CMPEND RTS
02617
02618
02619                   *
02620                   * TEST ALARMS
02621                   *    CMPDAT .... CURRENT COMPARE DIGIT
02622                   *    CMPCNT .... LOCATION OF COMPARE DIGIT
02623                   *                ODD  = LS NIBBLE
02624                   *                EVEN = MS NIBBLE
02625                   *    ALRMCT .... = 10 FOR # OF ENTRIES
02626                   *    ALRMFG .... = THE # OF HE ALARM (0-9)
02627                   *
02628
02629A 4A6B 36           TSTALM PSHA
02630A 4A6C 37                  PSHB
02631A 4A6D DF 69     A         STX   ALMSAV
02632
02633A 4A6F 7F 006B   A         CLR   ALRMCT
02634A 4A72 CE 00D8   A         LDX   #ALRMTB
02635
02636A 4A75 DF 6C     A ALMLOP STX   ALRMPT
02637
02638A 4A77 D6 6F     A         LDAB  CMPCNT
02639A 4A79 26 08 4A83          BNE   SKIPFG
02640
02641A 4A7B A6 07     A         LDAA  7,X
02642A 4A7D 2B 54 4AD3          BMI   TSTNX0  NULL ENTRY
02643A 4A7F 86 01     A         LDAA  #1      START COMPARE
02644A 4A81 A7 07     A         STAA  7,X
02645
02646
02647A 4A83 6D 07     A SKIPFG TST   7,X     STILL COMPARE ?
02648A 4A85 27 48 4ACF          BEQ   TSTNXT  NO
02649
02650A 4A87 D7 71     A ALMTST STAB  CMPNIB
02651A 4A89 57                  ASRB
02652A 4A8A BD 49F3   A         JSR   ADD3X   ADD 3 TO X
02653
02654A 4A8D A6 00     A         LDAA  X       GET PAIR
02655A 4A8F BD 47AD   A         JSR   UNPACK
02656A 4A92 76 0071   A         ROR   CMPNIB
```

```
02657A 4A95 25 01 4A9B           BCS    CMPALM
02658A 4A97 16                   TAB            = LS
02659
02660A 4A98 C4 0F     A CMPALM ANDB  #$F
02661A 4A9A D1 70     A          CMPB   CMPDAT    SAME ?
02662A 4A9C 26 31 4ACF           BNE    TSTNXT    NO
02663
02664                       *
02665                       * COMPARES .... ALRM IF NEXT ALARM DIGIT IS FF
02666                       *     OR AT END OF COMPARE
02667                       * LS STILL IN B
02668                       *
02669
02670A 4A9E D6 6F     A          LDAB   CMPCNT
02671A 4AA0 C1 0D     A          CMPB   #13       LAST ?
02672A 4AA2 27 15 4AB9           BEQ    SETALM
02673A 4AA4 A6 00     A          LDAA   X
02674
02675
02676A 4AA6 57                   ASRB             MS/LS ?
02677A 4AA7 24 06 4AAF           BCC    TSTX1     WAS MS
02678A 4AA9 A6 01     A          LDAA   1,X       LS GET NEXT
02679A 4AAB 47                   ASRA
02680A 4AAC 47                   ASRA
02681A 4AAD 47                   ASRA
02682A 4AAE 47                   ASRA
02683
02684A 4AAF 84 0F     A TSTX1  ANDA   #$F
02685A 4AB1 81 0F     A          CMPA   #$F       END ?
02686A 4AB3 27 04 4AB9           BEQ    SETALM    YES
02687
02688A 4AB5 DE 6C     A          LDX    ALRMPT    NO
02689A 4AB7 20 1A 4AD3           BRA    TSTNXO
02690
02691                       *
02692                       *
02693                       * GOT ALARM ... SET FLAG
02694                       *
02695                       *
02696
02697A 4AB9 0F           SETALM SEI
02698
02699A 4ABA D6 4F     A          LDAB   ONHOOK
02700A 4ABC CA 40     A          ORAB   #$40
02701A 4ABE D7 4F     A          STAB   ONHOOK
02702A 4AC0 0E                   CLI
02703
02704A 4AC1 73 006E  A          COM    ALRMFG    FLAG ALARM
02705
02706A 4AC4 BD 4AE5  A          JSR    PRNALM
02707
02708A 4AC7 DE 69    A TSTEND LDX    ALMSAV
02709A 4AC9 7C 006F  A          INC    CMPCNT
02710A 4ACC 33                  PULB
02711A 4ACD 32                  PULA
02712A 4ACE 39                  RTS
02713
02714A 4ACF DE 6C    A TSTNXT LDX    ALRMPT
02715A 4AD1 6F 07    A          CLR    7,X       DONT COMPARE
02716
02717A 4AD3 D6 6B    A TSTNXO LDAB   ALRMCT
02718A 4AD5 C1 08    A          CMPB   #8        END ?
02719A 4AD7 22 EE 4AC7          BHI    TSTEND    YES
02720
02721A 4AD9 DE 6C    A          LDX    ALRMPT
02722A 4ADB 7C 006B  A          INC    ALRMCT
02723A 4ADE C6 08    A          LDAB   #8        SKIP TO NEXT ALARM
02724A 4AE0 BD 49F3  A          JSR    ADDBX
02725A 4AE3 20 90 4A75          BRA    ALMLOP
02726
02727                       *
02728                       * PRINT ALM + TIME & ID
02729                       *
02730
02731A 4AE5 96 29    A PRNALM LDAA   RIBBON
02732A 4AE7 36                  PSHA
02733
02734A 4AE8 86 10    A          LDAA   #REDRIB
02735A 4AEA 97 29    A          STAA   RIBBON
```

```
02736
02737A 4AEC CE 4B40  A          LDX       #MSGALM
02738
02739A 4AEF BD 45C0  A          JSR       STRTIM
02740
02741A 4AF2 BD 4A36  A          JSR       PRNTID
02742
02743A 4AF5 32                  PULA
02744A 4AF6 97 29    A          STAA      RIBBON
02745
02746A 4AF8 7F 0024  A          CLR       FLAG
02747
02748A 4AFB 39                  RTS
02750                     *
02751                     * STRING MESSAGES
02752                     *
02753A 4AFC    0F     A MSGANS  FCB       $F,6,4,$FE /ANS/
02754A 4B00    0D     A MSGCLR  FCB       $D,3,5,$FE /CLR/
02755A 4B04    41     A MSGDP   FCB       $41,$E,6,$FE /DP/
02756A 4B08    0B     A MSGEND  FCB       $B,6,$E,$FE /END/
02757A 4B0C    0B     A MSGERR  FCB       $B,4,5,$FE /ERR/
02758A 4B10    41     A MSGMF   FCB       $41,7,$C,$FE /MF/
02759A 4B14    05     A MSGMTR  FCB       5,2,5,$FE /MTR/
02760A 4B18    03     A MSGORG  FCB       3,4,$B,$FE /ORG/
02761A 4B1C    02     A MSGRNG  FCB       2,6,$B,$FE /RNG/
02762A 4B20    00     A MSGTIM  FCB       0,$A,8,$FE /TIM/
02763A 4B24    00     A MSGTRM  FCB       0,4,8,$FE /TRM/
02764A 4B28    00     A MSGTTL  FCB       0,2,9,$FE /TTL/
02765A 4B2C    00     A MSGTST  FCB       0,3,3,$FE /TST/
02766A 4B30    0D     A MSGCLK  FCB       $D,3,$A,$FE /CLK/
02767A 4B34    41     A MSGID   FCB       $41,$A,$E,$FE /ID/
02768A 4B38    0A     A MSGPWR  FCB       $A,$C,$C,$FE /FFF/
02769A 4B3C    41     A MSGST   FCB       $41,3,3,$FE /ST/
02770A 4B40    0F     A MSGALM  FCB       $F,8,8,$FE /ALM/
02771
02772                     *
02773                     * KEYPAD DECODE
02774                     *
02775           4B44   A KBDTAB  EQU       *
02776A 4B44    28     A          FCB       $28,$11,$21,$41
02777A 4B48    12     A          FCB       $12,$22,$42,$14
02778A 4B4C    24     A          FCB       $24,$44,$18,$48
02779A 4B50    81     A          FCB       $81,$82,$84,$88
02780A 4B54    00     A          FCB       0          ERROR
02782
02783                     * VECTORS
02784                     *
02785A 4BF8                      ORG       $4BF8
02786A 4BF8   40CE    A          FDB       IRQ
02787A 4BFA   4000    A          FDB       START
02788A 4BFC   4000    A          FDB       START
02789A 4BFE   4000    A          FDB       START
02790A 4C00                      ORG       $4C00
02791
02792           4C00   A PRMEND  EQU       *
02793A 4C00 CE 4000   A          LDX       #START
02794A 4C03 4F                   CLRA
02795A 4C04 AB 00     A CHKLP    ADDA      X
02796A 4C06 08                   INX
02797A 4C07 8C 4C00   A          CPX       #PRMEND
02798A 4C0A 26 F8 4C04           BNE       CHKLP
02799A 4C0C 40                   NEGA
02800
02801A 4C0D 20 FE 4C0D           BRA       *
02802                            END
TOTAL ERRORS 00000--00000

49F3 ADDBX   01235 01851 02483 02526*02652 02724
      005C ADDIND  00227*02527 02528 02529 02531 02532 02533
      44D4 ADDTIM  01412*01611
      44DA ADTMLP  01416*01422
      0040 ALMLED  00113*
      4A75 ALMLOP  02636*02725
      0069 ALMSAV  00240*02631 02703
      4A87 ALMTST  02650*
      006B ALRMCT  00241*02633 02717 02722
      006E ALRMFG  00243*01367 01863 02704
```

```
006C ALRMPT  00242*02636 02683 02714 02721
00D8 ALRMTB  00315*02460 02482 02634
0021 ANSFLG  00152*01306 01314 01363 01482 01487 01589
002E BCDCNT  00171*01711 01727
0040 BIT10M  00081*
0020 BIT2N   00080*00742 00792 00806 00898 01027 01474 01781
4301 BRAK00  00991 00995*
430B BRAK01  00996 01000*
430F BRAK02  00980 00999 01002*01023
4310 BRAK10  00987 01007*
4341 BRAK11  01008 01016 01019 01040*
433C BRAK13  01037*01083
4320 BRAK20  01012 01018*
4324 BRAK30  01022*
4342 BRAK40  01028 01045*
4348 BRAK41  01046 01050*
42DA BREAK   00922 00974*
42E9 BREAK0  00975 00984*
0074 BREAKX  00253*00974 00979 01161 01172
0003 BRHLTM  00124*01160
0075 BRKCNT  00254*00763 00778 00984 00985 01168
0077 BRKCON  00256*00989 00997 01108 01169
0076 BRKFLG  00255*00986 01001 01015 01018 01024 01127 01134 01171
0037 BRKMAX  00127*01022
429F BSYEND  00810 00854 00905*01182
424C BSYNXT  00827*00843 00865
4295 BSYOFF  00825 00897*01062
423B BSYON0  00813 00818*
4233 BSYON1  00807 00812*
4251 BSYOND  00821 00831*00836 00870
0022 BUSY    00153*01207 01373 01506 01521 01900
4229 BUSYON  00805*00864 01184
0088 CALLTM  00286*01393 01412 01452 01694 01902
4C04 CHKLP   02795*02798
46E6 CLDSLP  01883*01886
41E6 CLEARX  01427*01453 01459
00A1 CLKEND  00299*00691
0062 CLKPNT  00231*00389 00687 00694
0090 CLOCK   00288*00353 01639 01945 01948 01952 01960 01961 01964 01974 019
              01988 01992 01998 01999 02006 02003 02312 02316 02321 02326
4A0F CLRBFO  02549*02552
44FE CLRCAL  01312 01358 01452*
46DD CLRDSP  01360 01848 01877*
4008 CLREVN  00338*00354
4A04 CLRKBF  02200 02253 02341 02541*
400B CLRLOP  00336 00340*00357
4503 CLRMTR  01359 01458*
44E8 CLRXLP  01429*01432
4A98 CMPALM  02657 02660*
006F CMPCNT  00245*01365 02607 02638 02670 02709
0070 CMPDAT  00246*02612 02661
4A6A CMPEND  02609 02616*
0071 CMPNIB  00247*02650 02656
0072 CMPNTR  00248*01377 02605 02614
002F COLCNT  00172*01622 01834 02097 02103 02107 02583
0046 COLSAV  00205*01623 01835 02102 02584
0005 CONCNT  00134*00998
000A DASH    00025*01657
40C2 DBNC10  00464 00479*
40A5 DBNCEX  00429 00436 00443 00450 00463*
40CC DBNCND  00466 00469 00471 00480 00482 00485*
42AA DIAL    00899 00901 00914*
42B4 DIAL00  00916 00919*
42BC DIAL10  00920 00925*
0030 DIGCNT  00173*00700 01364 01523 01586 01840
0023 DIGTYP  00154*01817 01822 01824
41D2 DISP00  00708 00714 00713*
41E1 DISP04  00695 00728*
41BC DISP10  00679 00700*
41C0 DISP20  00682 00706*
41CF DISP21  00711 00716*
0066 DISPAD  00233*00707 00724
4735 DISPDY  01992*02014
4765 DISPHR  01974*01995
4741 DISPMN  01952*01980
0064 DISPNT  00232*00706 00725 01376
4725 DISPSC  01936*01958
479E DISPWK  00396 02008*02323
0010 DLDIGT  00051*00052 01813
```

```
007F DPADDR 00273*
0010 DPDIGT 00052*01154
4971 DSALOP 02408*0.   5
41B8 DSCLKO 00692 00694*
0081 DSPADD 00274*
0080 DSPBUF 00307*00716 01375 01850 01880
41A8 DSPCLK 00687*00701
0035 DSPCNT 00179*01370 01522 01846 01854 01861
009A DSPDAY 00295*01994
46CD DSPDG0 01857 01861*
46BD DSPDG1 01847 01850*
46DC DSPDGN 01869 01872*
009B DSPHH  00296*01977 01979
009D DSPMIN 00297*01955 01957
009F DSPSEC 00298*01939 01941
0098 DSPWN  00294*00388 00693 02010 02012
4564 E.CLND 01507 01533*
4531 E.CLR  01243 01506*
4541 E.CLRO 01510 01515*
4573 E.DG00 01782 01789*
4684 E.DG10 01756 01813*
458F E.DG11 01815 01819*
46A3 E.DG12 01826 01830*
45A6 E.DG13 01828 01832*
46AF E.DG20 01823 01837*
444B E.DIG0 01259 01263*
4442 E.DIGT 01230 01258*
463B E.DPDG 01263 01753*
4565 E.FLSH 01247 01544*
435A E.KB00 02169 02177*02243
434F E.KB01 02161 02168*
432F E.KB10 02134 02140*
4831 E.KB11 02138 02142*
4335 E.KB12 02145*02151
4341 E.KB13 02146 02153*
4342 E.KB20 02155*
4822 E.KBDG 01260 02131*
484E E.KBNO 02149 02166*02173 02180
456A E.METR 01245 01578*
463B E.MFDG 01754*
4588 E.MTR0 01590 01594*
4593 E.MTR1 01588 01600*
45A0 E.MTRF 01598 01604 01603*
45AA E.MTRN 01609 01613*
459E E.MTRP 01583 01585 01606*
451B E.OF00 01478 01482*
4527 E.OF2N 01475 01490*
4508 E.OFHK 01250 01469*
4526 E.OFND 01483 01488*
4531 E.ONHK 01251 01505*
4482 E.ORG  01248 01336*
4404 E.PR00 01216*
4413 E.PR01 01221 01224*
4400 E.PR10 01205 01208 01213*
43F2 E.PROC 00403 01204*01214 01238 01261 01264
4450 E.PTRU 01253 01269*
4462 E.REV  01246 01306*
4478 E.REVN 01307 01318*
4451 E.RING 01252 01284*
445B E.RNGO 01285 01289*
46EF E.RTC  01244 01900
46F9 E.RTC0 01901 01905*
470E E.RTC1 01906 01909 01917*
442C E.TAB  01234 01243*
4479 E.THM  01249 01326*
008C ELPSAV 00287*01688
4040 ERRLOP 00374*00375
4045 ERRORE 00342 00347 00377*
403D ERRSET 00372*00378
43DF EVENT  00475 00518 00662 00824 00863 00906 00937 01039 01155 01139*
0047 EVENTA 00206*01819 01837
43EC EVENTN 01193 01197*
013C EVNBFN 00318*01192 01220
0128 EVNBUF 00317*00338 00384 01195 01222
0033 EVNCNT 00176*01198 01213 01217
0047 EVNSAV 00207*01228
0060 EVNTIN 00229*00385 01189 01197
0048 EVNTNM 00208*00426 00433 00440 00447 00474
0024 FLAG   00155*01316 01366 01524 01581 01597 01603 01796 01814 01316 02746
```

```
0025 FLASH   00156*01368 01477 01545 01608 01610 01755 01795
0005 FLSHST  00041*01034
49C3 FNDALM  02395 02464 02473*
492C GETIO   02352*
43DC GETNXI  02287*
43D3 GETNXT  02280*02302 02313 02349 02352 02373 02391 02453 02491
4928 GETPAK  02308 02317 02322 02349*02434 02501
492B GETPKO  02351*
005E GETSAV  00228*02280 02283
00CE GNDFLG  00311*00856
4209 GNDLV   00756 00771*
4214 GNDLV0  00772 00778*
421B GNDLV1  00779 00783*
0032 GNDORG  00133*00759 00783
41F6 GNDSTR  00753*00857
007E GNDTIM  00267*00753 00839
000A GNDTRM  00137*00762
0032 GNDWAT  00139*00838
4208 GNSTND  00754 00765*
430C I.FL00  01181 01184*
43D5 I.FLSH  01036 01180*
00C0 IDENTB  00309*02368 02382 02581
4220 IDLE    00391 00791*00907 01081
4226 IDLE2W  00798*
4252 IDLE3W  00793 00835*
44EF INCRMX  01437*01614 01903
40ED INCSEC  00507 00511*
44F2 INCXLP  01440*01446
40CE IRQ     00491*02786
40FB IRQ00   00504 00515 00526*
40FB IRQ01   00527*
4156 IRQ02   00528 00575 00583 00616*
41A0 IRQ03   00630 00665 00678*
412F IRQ11   00536 00554 00574*
410F IRQ12   00539 00547*
4129 IRQ13   00545 00565*
4133 IRQ14   00582*
4124 IRQ20   00548 00562*
411C IRQ21   00551 00556*
4117 IRQ22   00553*00560
4107 IRQ23   00541*00558
41E6 IRQSTA  00740*
4936 KBCM10  02304 02361*
4948 KBCM11  02373*02377
4952 KBCM12  02364 02382*
4946 KBCM13  02371*02383
4957 KBCM20  02362 02388*
498B KBCM21  02399 02431*
498D KBCM22  02433*02439
49A0 KBCM30  02389 02450*
49B6 KBCM31  02455 02464*
49BA KBCM32  02462 02467*
49BC KBCM33  02469*02472
49CE KBCM40  02451 02491*
49E3 KBCM41  02498 02509*
4167 KBD00   00622 00629*
4174 KBD02   00633 00638*
4181 KBD03   00639 00648*
4193 KBD04   00649 00652 00661*
4198 KBD05   00655 00659 00664*
0082 KBDATA  00276*00550 00633
00A1 KBDBUF  00304*00713 02213 02229 02305 02343 02363 02370 02397 02405 02496
             02512 02513 02543 02554
491A KBDCLK  02306 02334*
43E1 KBDCMD  02231 02302*
0083 KBDCMP  00277*00621 00624
0084 KBDCNT  00278*02546
419D KBDEND  00619 00627 00635 00644 00667*
491F KBDERR  02309 02311 02315 02318 02320 02323 02325 02341*02393 02445
0080 KBDIGT  00054*01258
0085 KBDSTR  00279*00550 00629 00664 00667
4844 KBDTAB  02143 02775*
0086 KBDTIM  00280*00626 00632 00635
499D KBERJP  02445*02458 02493
00B0 KBFEND  00305*02259
0058 KBFNXT  00224*02212 02213 02230 02258 02263 02281 02287 02369 02409 02417 02551
004E LNSTAT  00215*00463 00859 00877 01010
0002 LVBIT   00088*00860 00873
0078 LVCNTR  00258*01031
```

```
0004 LVCOIN 00089*01011
000F LVMAX  00141*01030
0079 LVSTAT 00259*01032
4376 MAKE   00927 01108*
4382 MAKE0  01110 01115*
4389 MAKE00 01117 01119*
43A0 MAKE01 01135*01137
439D MAKE02 01134*01139 01157
4388 MAKE03 01113 01118*
439B MAKE04 01128 01132*
43A1 MAKE10 01125 01136*
43BA MAKE11 01141 01147 01150 01154*
43C4 MAKE20 01122 01160*
4334 MAKE30 01144 01149*
007A MAKEX  00261*00915 00917 00925 00993 01109 01112 01170
0096 MAKMAX 00128*01116 01136
0008 MAKMIN 00130*01124
007B MAKTIM 00262*00760 00774 00784 00815 00818 00819 00841 00867 00963 00977 00982
              00988 01115 01120
000B MAXEVN 00049*01229
039  MCOUNT 00183*01691
026  MCTFLG 00158*01369 01502 01579
071  METER  00424*00740
027  MF4FLG 00159*00931 00933 00940
020  MFDIGT 00053*00936 01825
2D6  MFRX00 00930 00940*
2D9  MFRXND 00932 00941*
04B  MFRXSV 00211*00929
02D  MNCOIN 00131*01007
014  MRHLTM 00125*00992
B40  MSGALM 02737 02770*
AFC  MSGANS 01309 01591 02753*
B30  MSGCLK 02570 02766*
B00  MSGCLR 01518 01771 02754*
B04  MSGDP  01830 02755*
B08  MSGEND 01913 02756*
B0C  MSGERR 01600 02757*
B34  MSGID  02579 02767*
B10  MSGIF  01827 02758*
B14  MSGNTR 01594 02759*
B18  MSGORG 01337 01783 02760*
B38  MSGPWR 00398 02768*
B1C  MSGRNG 01286 02761*
B3C  MSGST  01345 01786 02769*
B20  MSGTIM 01515 01768 02762*
B24  MSGTRM 01328 02763*
B2C  MSGTST 02563 02765*
B28  MSGTTL 01511 01765 02764*
040  MTRBIT 00094*00427
044  MTRCNT 00199*00424
045  MTRFLG 00200*
019  MTRMAX 00065*00428
003  MTRSTR 00039*00425
049  NXSTAT 00210*00392 00746 00757 00827 00908 01037 01052 01063
056  NXTEVN 00223*00386 01217 01226
246  NXTOFF 00824*00872
080  OFFLED 00112*
032  OFHKTM 00066*00820
008  OFHOOK 00044*00822
07D  ON2WTM 00266*01050 01070 01073
009  ONHK2W 00045*01082
096  ONHKTM 00067*
04F  ONHOOK 00213*00728 01340 01341 01470 01471 01526 01528 02171 02173 02699 02701
032  ORGTIM 00061*00869
020  PABIT  00106*02084
02A  PAFLAG 00162*00535 00542 00553 00562 00654 00658
0CE  PARAM0 00312*02520
0CF  PARAM1 00313*01045
030  PATKUP 00107*02086 02089
030  PBIT   00095*00448
03E  PCNT   00190*00445
001  PFALSE 00037*00905
03F  PFLAG  00191*00809 00835 00853 00900 01130
283  PLDORG 00775 00871*
098  PLEAD  00445*00744
00F  PMAX   00062*00449
006  PORG   00042*00871
30E  PRBCD0 01698*01702
```

```
4517 PRBCD1 01699 01710*
4530 PRBCD2 01718 01723*01723
4634 PRBCD3 01721 01726*
450C PRBCDX 01689 01692 01695*
0400 PRBFND 00322*00324 00356 00603 02072
47FD PRCLND 02091*
4810 PRCOLO 02098 02106*
45E5 PRDASH 01645 01649 01652 01657*01674 01791
0028 PRGFLG 00160*00651 00673 00710 01923 02155 02181 02197 02206 02228 02243 02246
              02255 02335
48CC PRGTIM 02186 02256 02271*
003D PRGTMR 00185*01917 01920 02207 02273
4A47 PRIDLP 02588*02595
4A36 PRIDND 02591 02597*
47B7 PRINTA 01648 01658 01664 01665 01720 02037*02106 02116
4C00 PRMEND 00365 02792*02797
49EF PRMPNT 02500 02509 02519*
4AE5 PRNALM 02706 02731*
4462 PRNANS 01305*01485 01592
45EB PRNBCD 01644 01651 01654 01663*01676 01724 01793
013C PRNBUF 00320*00324 00380 00605 02074
4609 PRNCAL 01311 01517 01694*
0037 PRNCNT 00181*00582 00585 02044 02054 02078 02080
4803 PRNCOL 01626 01865 02097*02592
45FF PRNELP 01688*01770
4151 PRNFIN 00604 00607*
4153 PRNFNO 00568 00608*
0274 PRNMAX 00324*02050
4604 PRNMCT 01513 01691*01767
4142 PRNOTI 00597*
47B5 PRNPAP 00401 01530 01774 01915 02035*02101 02573
005A PRNPNT 00226*00381 02069 02076
0030 PRNRDY 00082*
45C3 PRNRTC 01639*
45CB PRNSAV 01642*01773 01789
45BA PRNT10 01606 01625*
47E5 PRNTA0 02073 02076*
47F9 PRNTA1 02085 02089*
47FE PRNTA2 02090 02093*
47C6 PRNTA3 02042 02053*
4705 PRNTA4 02045 02066*
47C2 PRNTA5 02047*02061
47C8 PRNTA6 02057 02068*
47B9 PRNTAK 02039*02087 02094
4148 PRNTER 00591 00599 00602*
4A36 PRNTID 02569 02579*02741
45CB PRNTIM 01640 01643*
4A1D PRNTST 01210 02563*
478A PRNWAT 02041*
48A5 PROG00 02188 02241*
48AC PROG01 02242 02246*
48B6 PROG02 02182 02253*
48BF PROG10 02251 02258*
48CB PROG11 02260 02265*
487C PROGEX 02206*
4878 PROGFD 02199 02203*
4896 PROGFE 02211 02222*
4883 PROGFF 02204 02210*
4895 PROGFN 02214 02220*02223
4866 PROGRM 02156 02186*
0067 PROTPT 00234*00382 00583 00607
002D PRSTOP 00166*02041 02060 02066
000A PRTMOT 00071*02272
0034 PRTWAIT 00178*00506 00509 00527 00566 00598
0007 PTERM  00043*00362
4270 PTRMLD 00781 00362*
000B PTRUE  00047*00049 00445
007C PULCNT 00264*01130 01133 01156
0010 RBIT   00092*00881
0010 REDRIB 00105*01326 02564 02734
2000 REG0   00029*00491
004B REG0SV 00212*00492
2100 REG1   00030*00500 00603
004C REG1SV 00213*00501 00571 00741 00791 00805 00897 01026 01066 01473 01780
2200 REG2   00031*00372 00494 00618 00689 00721
004D REG2SV 00214*00495
2300 REG3   00032*00350 00363 00374 00497 00729
004E REG3SV 00216*00498
```

```
,0020 REVBIT 00093*00434
 0040 REVCNT 00193*00431
 0041 REVFLG 00194*
 0019 REVMAX 00063*00435
 0004 REVRSE 00040*00432
 0029 RIBBON 00161*01327 01335 01531 01775 02093 02565 02567 02731 02735 02744
 0043 RNGCNT 00197*
 002B RNGFLG 00164*01284 01291 01491 01911
 000A RNGING 00046*00439
 0005 RNGTIM 00069*01289
 0002 ROGMTH 00119*01582 01602
 43C9 RSTBRK 0082Y 01053 01132 01167*
 0002 RTC    00038*00517
 4773 RTCDAY 01972 01982*
 474F RTCIR  01950 01960*
 4761 RTCHRO 01967 01971*
 471A RTCLK  01918 01921 01923*
 4733 RTCMIN 01934 01944*
 0087 RTCSEC 00285*00511 00514
 478D RTCWK  01990 01997*
 479C RTCWKO 02003 02006*
 0001 RVBIT  00087*00441
 0042 RVCNT  00196*00438
 0096 RVMAX  00064*00442
 0036 RVTIMR 00180*01290 01492 01905 01908
 44BC SAVCAL 01393*01480
 0050 SAVEX0 00220*01710 01714 02404 02411 02415
 0052 SAVEX1 00221*02037 02043 02082
 0094 SAVTIM 00289*01642
 0031 SECOND 00174*01405 01675 01929 01932 01936 01944 02013
 0032 SECSAV 00175*01406 01792
 4A89 SETALM 02672 02686 02691*
 4A57 SETCAP 01871 02606*
 1293 SETLV  00879 00882 00885*
 1049 SETPNT 00369 00380*
 4A83 SKIPFG 02639 02647*
 0020 STACK  00147*00333
 41F2 STAJMP 00743 00746*
 4000 START  00333*00360 02787 02788 02789 02793
 4497 STCLR  01358*01776
 45F6 STMSEC 01287 01346 01673*01914
 4491 STPRNT 01345*01490
 4816 STRING 01343 01620 01637 01713 01772 01784 01787 01832 02114*02566 02580
 4818 STRNLP 02116*02120
 4831 STRNMT 01595 01601 01620*
 0054 STRPNT 00222*01310 01512 01516 01712 01766 01769
 45C0 STRTIM 00399 01519 01637*01673 02571 02739
 000A SUMCNT 00133*00995
 402D SUMLOP 00362*00366
 44C1 SVCALP 01396*01403
 0008 TBIT   00090*00881
 4287 TESTLV 00771 00812 00877*00919 01059
 4353 TESTON 01051 01059*
 0002 TICK   00059*00061 00062 00063 00064 00065 00066 00067 00124 00125 00127 00128
                    00130 00131 00133 00134 00137 00138 00139 00141
 4204 TRMGND 00762*00776
 443E TRMORG 01329 01343*
 0001 TRUMTH 00118*01584 01595
 42C3 TSMFRX 00926 00929*
 427A TSORGO 00861 00867*
 4A6B TSTALM 02615 02629*
 4AC7 TSTEND 02708*02719
 002C TSTFLG 00165*01204 01211 01969 01984 02164
 4A03 TSTNX0 02642 02689 02717*
 4ACF TSTNXT 02648 02662 02714*
 435E TSTON0 01060 01066*
 436D TSTON1 01068 01076*
 436E TSTON2 01074 01081*
 4262 TSTORG 00842 00853*
 407E TSTREV 00431*00914
 408B TSTRV  00438*00798
 4AAF TSTX1  02677 02684*
 0039 TTLMTH 00182*01458 01613
 47AD UNPACK 01663 01716 01937 01953 01975 02009 02018*02413 02511 02655
```

We claim:

1. A telephone line monitoring system for connection to a telephone line in which a telephone set is connected comprising:

(a) receiver means for connection to the telephone line, for receiving and translating called subscriber identifying dialed digit signals which may be carried by the telephone line into binary signals, (b) sensing means connected to the telephone line for sensing and translating the on or off hook status of the telephone line into binary signals, (c) data bus means for receiving and carrying said binary signals from the sensing means and the receiver means, (d) a central processing unit connected to the data bus means for receiving said binary signal, said central processing unit having address terminals, (e) first random access memory means connected to the data bus means and to said address terminals for storing said binary signals appearing on the data bus, (f) a printer control circuit connected to the data bus means for operating a printer in response to predetermined forms of binary signals which may appear on the data bus means, (g) an alphanumeric display connected to the data bus means for displaying alphanumeric symbols in response to at least a portion of said predetermined forms of binary signals which correspond to a predetermined portion of a complete telephone number, (h) translating means connected to the data bus means and to said address terminals comprising an interconnection matrix for translating binary signals appearing on the data bus from the receiver means and sensing means into signals for controlling the central processing unit for causing it to responsively generate said predetermined forms of binary signals for operating the printer control circuit and the display in accordance with the form of its interconnection matrix, and applying said predetermined forms of binary signals to the data bus means, (i) said printer control circuit including means for causing the printer to print alphanumeric symbols across a line corresponding to the time and/or said status and/or said dialed digits as said dialed digit and status signals are received by the receiver means and the sensing means from the telephone line, upon receipt of said predetermined forms of said binary signals, wherein the printed alphanumeric symbols are not visible until the paper is advanced, and (j) further means for causing the alphanumeric display to display said alphanumeric symbols as said dialed digit signals are received by the receiver means upon receipt of said predetermined forms of said binary signals wherein the displaying of the alphanumeric symbols by the alphanumeric display is prior to display thereof by the printer.

2. A telephone line monitoring system as defined in claim 1, in which the printer control circuit includes means for stepping paper in the printer forward under control of the central processing unit upon receipt of particular predetermined forms of said binary signals to effect said display of alphanumeric symbols after a line of said symbols relating to a telephone call has been printed.

3. A telephone line monitoring system as defined in claim 1, including means for recognizing binary signals on the data bus corresponding to a predetermined sequence of signals carried by the telephone line, by matching said latter binary signals with signals stored in the first random access memory and for causing generation and application to the data bus means of an alarm operate binary signal upon recognition of said sequence for reception by an alarm circuit which may be connected to the data bus means.

4. A telephone line monitoring system as defined in claim 3, in which said predetermined sequence of signals is a sequence of dialed digits.

5. A telephone line monitoring system as defined in claim 3 or 4, in which the printer control circuit includes means for stepping paper in the printer forward under control of the central processing unit to effect said display of alphanumeric symbols after a line of said symbols relating to a complete telephone call has been printed.

6. A telephone line monitoring system as defined in claim 2 in which the receiver means includes parallel filter means for providing individual output signals corresponding to predetermined frequency signals appearing on the telephone line, and encoder means connected to the output of the filter means for generating individual binary signals in response to said individual output signals and for applying said binary signals to the data bus.

7. A telephone line monitoring system as defined in claim 6 in which the sensing means includes a line voltage detector for sensing the on-hook or off-hook voltage level of the telephone line and for applying predetermined signals to the data bus corresponding to said on-hook and off-hook levels for reception and translation by the central processing unit, the central processing unit being adapted to cause the printer to print alphanumeric symbols upon sensing.

8. A telephone line monitoring system as defined in claim 7 in which the line voltage detector includes threshold setting means comprising a comparator circuit including means for setting a d.c. threshold level for said comparator, whereby the line voltage level may be compared against the d.c. threshold level and an output signal generated in accordance therewith.

9. A telephone line monitoring system as defined in claim 6 or 7 in which the sensing means includes ringing voltage detection means for detecting the presence of ringing voltage on the telephone line and for applying a predetermined signal to the data bus in response to the detection thereof for reception and translation by the central processing unit.

10. A telephone line monitoring system as defined in claim 8 in which the printer control means includes means for controlling the printing of alphanumeric signals on a single line of the printer in response to the detection of an off-hook voltage level on the telephone line, the printing of alphanumeric digits on a second line upon the detection of dialed digits, and further alphanumeric digits on a further line upon the detection of an on-hook voltage level following the off-hook voltage level, relating to a single telephone call.

11. A telephone line monitoring system as defined in claim 10, including means for recognizing binary signals on the data bus corresponding to a predetermined sequence of signals carried by the telephone line, by matching said latter binary signals with signals stored in the first random access memory and for causing generation and application to the data bus means of an alarm operate binary signal upon recognition of said sequence for reception by an alarm circuit which may be connected to the data bus means.

* * * * *